(12) United States Patent
Miyazawa et al.

(10) Patent No.: US 8,760,418 B2
(45) Date of Patent: Jun. 24, 2014

(54) DISPLAY CONTROL APPARATUS, DISPLAY CONTROL METHOD AND DISPLAY CONTROL PROGRAM

(75) Inventors: Yusuke Miyazawa, Tokyo (JP); Fuminori Homma, Tokyo (JP); Junichiro Sakata, Tokyo (JP); Tatsushi Nashida, Kanagawa (JP)

(73) Assignee: Sony Corporation (JP)

( * ) Notice: Subject to any disclaimer, the term of this patent is extended or adjusted under 35 U.S.C. 154(b) by 60 days.

(21) Appl. No.: 12/930,610

(22) Filed: Jan. 11, 2011

(65) Prior Publication Data

US 2011/0175830 A1 Jul. 21, 2011

(30) Foreign Application Priority Data

Jan. 19, 2010 (JP) ................ P2010-009182

(51) Int. Cl.
*G06F 3/041* (2006.01)

(52) U.S. Cl.
USPC ............ 345/173; 178/18.06; 178/18.07

(58) Field of Classification Search
USPC ............ 345/173–178; 178/18.01–19.04
See application file for complete search history.

(56) References Cited

U.S. PATENT DOCUMENTS

| | | | |
|---|---|---|---|
| 7,786,980 B2 * | 8/2010 | Lashina | 345/173 |
| 2003/0189211 A1 * | 10/2003 | Dietz | 257/79 |
| 2006/0267953 A1 * | 11/2006 | Peterson et al. | 345/173 |
| 2008/0012835 A1 * | 1/2008 | Rimon et al. | 345/173 |
| 2008/0018604 A1 * | 1/2008 | Paun et al. | 345/168 |
| 2008/0036743 A1 * | 2/2008 | Westerman et al. | 345/173 |
| 2008/0100572 A1 | 5/2008 | Boillot | |
| 2008/0165138 A1 * | 7/2008 | Li | 345/173 |
| 2008/0211783 A1 * | 9/2008 | Hotelling et al. | 345/173 |
| 2008/0211784 A1 * | 9/2008 | Hotelling et al. | 345/173 |
| 2008/0231610 A1 * | 9/2008 | Hotelling et al. | 345/173 |
| 2008/0278450 A1 * | 11/2008 | Lashina | 345/173 |
| 2009/0174684 A1 * | 7/2009 | Ryu et al. | 345/173 |
| 2009/0237372 A1 * | 9/2009 | Kim et al. | 345/173 |
| 2009/0244019 A1 * | 10/2009 | Choi | 345/173 |
| 2009/0256818 A1 * | 10/2009 | Noguchi et al. | 345/174 |
| 2009/0295715 A1 * | 12/2009 | Seo et al. | 345/156 |
| 2009/0312101 A1 * | 12/2009 | Pope | 463/36 |
| 2010/0020035 A1 * | 1/2010 | Ryu et al. | 345/173 |
| 2010/0026723 A1 * | 2/2010 | Nishihara et al. | 345/671 |
| 2010/0083111 A1 * | 4/2010 | de Los Reyes | 715/702 |

(Continued)

FOREIGN PATENT DOCUMENTS

| | | |
|---|---|---|
| EP | 1241557 A2 | 9/2002 |
| EP | 2104019 A2 | 9/2009 |

(Continued)

OTHER PUBLICATIONS

European Search Report EP 11150627, dated Jun. 7, 2011.

*Primary Examiner* — Dmitriy Bolotin
(74) *Attorney, Agent, or Firm* — Lerner, David, Littenberg, Krumholz & Mentlik, LLP

(57) ABSTRACT

A display control apparatus may include a proximity detector to detect proximity of an indicator to a display surface, and a touch detector to detect touch of the indicator against the display surface. A control unit may control display of an indicant on the display surface when the proximity detector detects that the indicator is in proximity to the display surface, and may determine whether the indicant is selected based on detection of the touch of the indicator against the display surface by the touch detector.

18 Claims, 46 Drawing Sheets

(56) References Cited

U.S. PATENT DOCUMENTS

| | | | |
|---|---|---|---|
| 2010/0095240 A1* | 4/2010 | Shiplacoff et al. | 715/784 |
| 2010/0097342 A1* | 4/2010 | Simmons et al. | 345/174 |
| 2010/0107099 A1* | 4/2010 | Frazier et al. | 715/765 |
| 2010/0117970 A1* | 5/2010 | Burstrom et al. | 345/173 |
| 2010/0169772 A1* | 7/2010 | Stallings et al. | 715/702 |
| 2010/0193258 A1* | 8/2010 | Simmons et al. | 178/18.06 |
| 2010/0309148 A1* | 12/2010 | Fleizach et al. | 345/173 |
| 2010/0313125 A1* | 12/2010 | Fleizach et al. | 715/702 |
| 2011/0018811 A1* | 1/2011 | Miernik | 345/173 |
| 2011/0022393 A1* | 1/2011 | Waller et al. | 704/270 |
| 2011/0148770 A1* | 6/2011 | Adamson et al. | 345/173 |
| 2011/0164029 A1* | 7/2011 | King et al. | 345/419 |
| 2011/0179368 A1* | 7/2011 | King et al. | 715/769 |

FOREIGN PATENT DOCUMENTS

| | | |
|---|---|---|
| JP | 2002-281406 A | 9/2002 |
| WO | 2006003588 A2 | 1/2006 |
| WO | WO 2009007704 A1 * | 1/2009 |

* cited by examiner

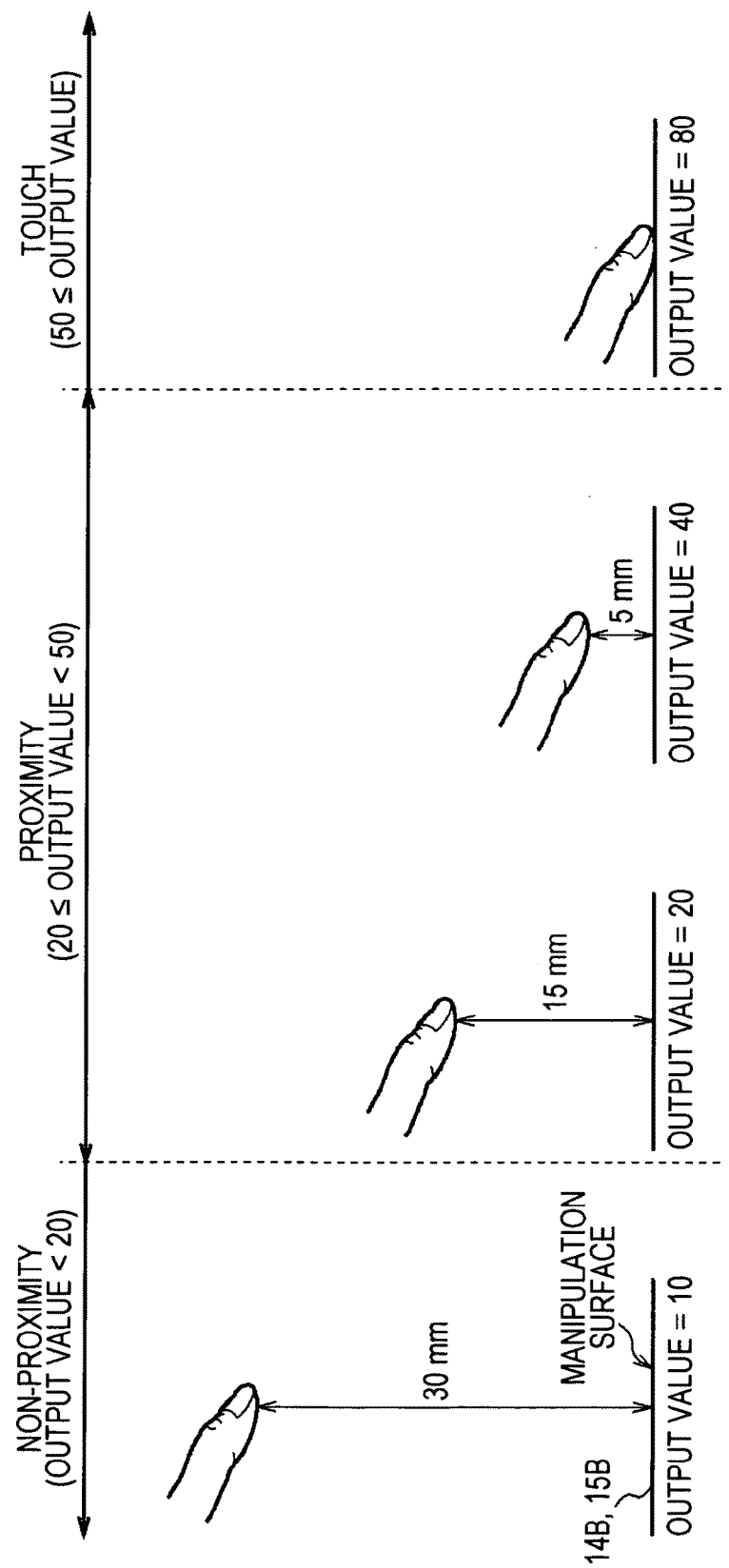

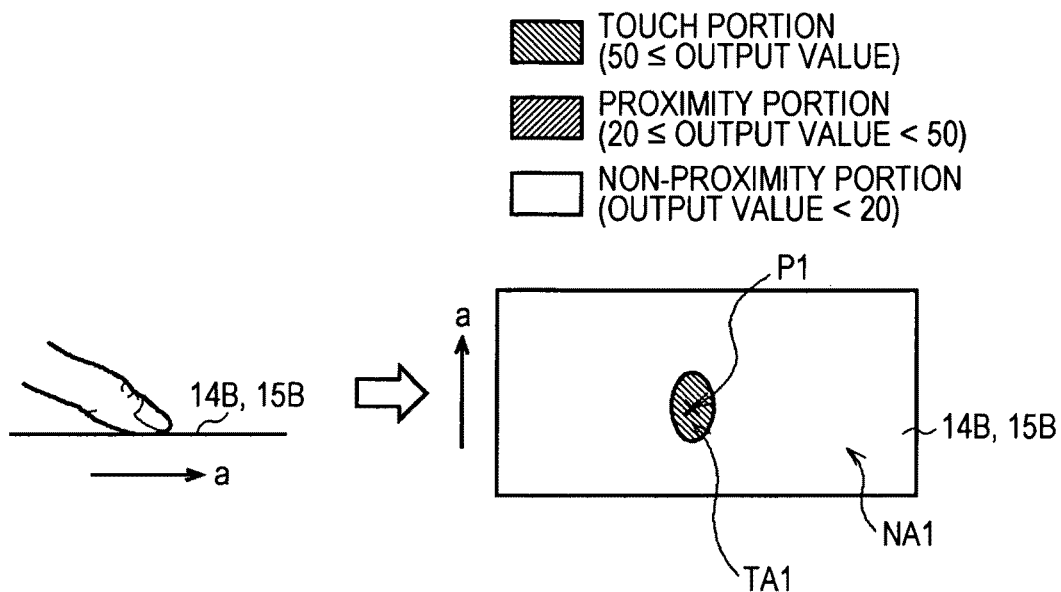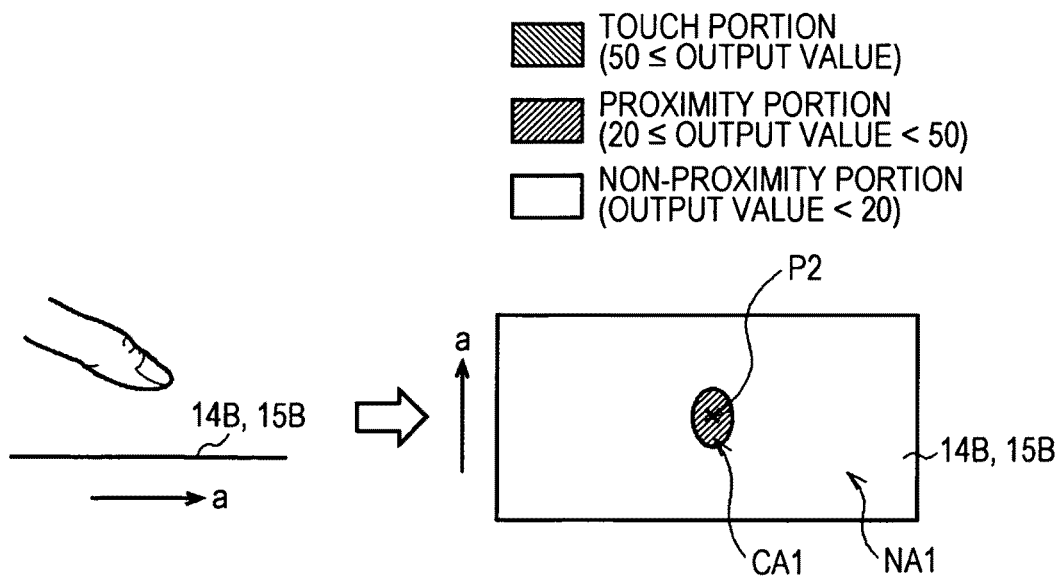

DISPLAY CONTROL APPARATUS, DISPLAY CONTROL METHOD AND DISPLAY CONTROL PROGRAM

CROSS-REFERENCE TO RELATED APPLICATION

This application claims priority from Japanese Patent Application No. JP 2010-009182 filed in the Japan Patent Office filed on Jan. 19, 2010, the entire contents of which is hereby incorporated by reference.

BACKGROUND OF THE INVENTION

1. Field of the Invention

The present invention relates to a display control apparatus, a display control method and a display control program which are appropriately applied to a mobile terminal with a touch panel installed in it, for example.

2. Description of the Related Art

In the related art, a receiver receives an image signal for services generated by synthesizing image signals of a plurality of channels. Further, when an instruction for switching a display into a multi-screen is given through a remote controller, the receiver displays a multi-screen in which images of a plurality of channels are arranged in a matrix format on the basis of the image signal for services.

In a state where the images of the plurality of channels are list-displayed as the multi-screen in this manner, if a focus movement for designating one image is instructed through the remote controller, the receiver changes the position of a focus in the multi-screen according to the instruction.

Further, if the designation of the image is settled through the remote controller, the receiver selects one image focused in the multi-screen at this time and displays the selected image across the entire screen.

In this way, the receiver allows a user to confirm broadcast contents of the plurality of channels, to select a desired channel from among the plurality of channels, and to view a broadcast program of the selected channel (for example, refer to Japanese Unexamined Patent Application Publication No. 2002-281406 (page 5 and FIGS. 3 and 4)).

However, the receiver with such a configuration is provided, on a surface of the remote controller, with a switch key for instructing the display to switch to the multi-screen, up, down, right and left arrow keys for instructing the focus movement and a finalizing key for instructing the finalization of the image designation.

Thus, whenever the display switches to the multi-screen, the focus movement or the finalization of the image designation is instructed, the receiver allows a user to perform a manipulation for selecting and pressing the switch key, the up, down, right or left arrow key, or the finalizing key on the surface of the remote controller.

For this reason, the receiver has a problem that the manipulation for selecting a desired image from the plurality of images which is list-displayed becomes complicated to thereby lower usability.

SUMMARY OF THE INVENTION

In accordance with an aspect of the invention, a display control apparatus may include a proximity detector to detect proximity of an indicator to a display surface; a touch detector to detect touch of the indicator against the display surface; and a control unit to control display of an indicant on the display surface when the proximity detector detects that the indicator is in proximity to the display surface and to determine whether the indicant is selected based on detection of the touch of the indicator against the display surface by the touch detector.

In accordance with another aspect of the invention, a method for display control may include detecting proximity of an indicator to a display surface; detecting touch of the indicator against the display surface; controlling display of an indicant on the display surface when the indicator is detected to be in proximity to the display surface; and determining whether the indicant is selected based on detection of the touch of the indicator against the display surface.

In accordance with another aspect of the invention, a non-transitory recording medium may be recorded with a computer-readable program executable by a computer for enabling the computer to perform display control. The program may comprise the steps of detecting proximity of an indicator to a display surface; detecting touch of the indicator against the display surface; controlling display of an indicant on the display surface when the indicator is detected to be in proximity to the display surface; and determining whether the indicant is selected based on detection of the touch of the indicator against the display surface.

BRIEF DESCRIPTION OF THE DRAWINGS

FIG. 4 is a diagram schematically illustrating a change in an output value of an electrostatic sensor according to a change in the distance between a finger and a manipulation surface;

FIGS. 5A and 5B are diagrams schematically illustrating detections of a touch area, a proximity area, and a non-proximity area;

DESCRIPTION OF THE PREFERRED EMBODIMENTS

Hereinafter, preferred exemplary embodiments for carrying out the present invention will be described with reference to the accompanying drawings. The description will be made in the following order:

1. Embodiment
2. Modified examples

1. Embodiment 1-1. Outline of Embodiment

Firstly, an outline of an embodiment will be described. That is, after describing the outline, specific examples according to the present embodiment will be described.

Figure 1:
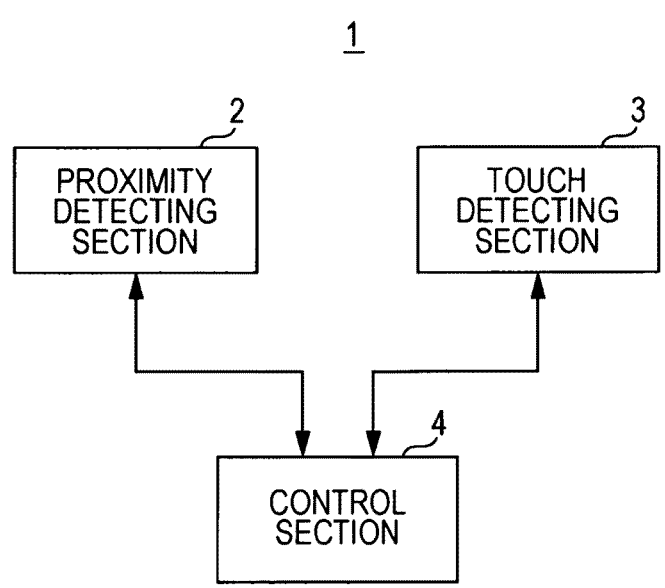
FIG. 1 is a block diagram illustrating a circuit configuration of a display control apparatus according to an embodiment of the present invention.

In FIG. 1, reference numeral 1 generally represents a display control apparatus according to an embodiment. A proximity detecting section 2 in the display control apparatus detects proximity of an indicator to a display surface. Further, a touch detecting section 3 in the display control apparatus 1 detects the touch of the indicator against the display surface.

Further, if the proximity detecting section 2 detects the proximity of the indicator to the display surface, a control section 4 in the display control apparatus 1 enables a plurality of indicants to be displayed on the display surface. Further, if it is determined that one indicant among the plurality of indicants is selected, on the basis of the touch of the indicator against the display surface detected by the touch detecting section 3, the control section 4 in the display control apparatus 1 displays an image corresponding to one indicant on the display surface.

The display control apparatus 1 with such a configuration displays the plurality of indicants, with such a simple manipulation of only sequentially performing a proximity manipulation and a touch manipulation on the display surface, so that the indicator moves close to or comes in touch with the display surface, without particularly manipulating a manipulation key, to thereby select a desired image as the indicant. Thus, the display control apparatus 1 can improve usability.

Figure 2:
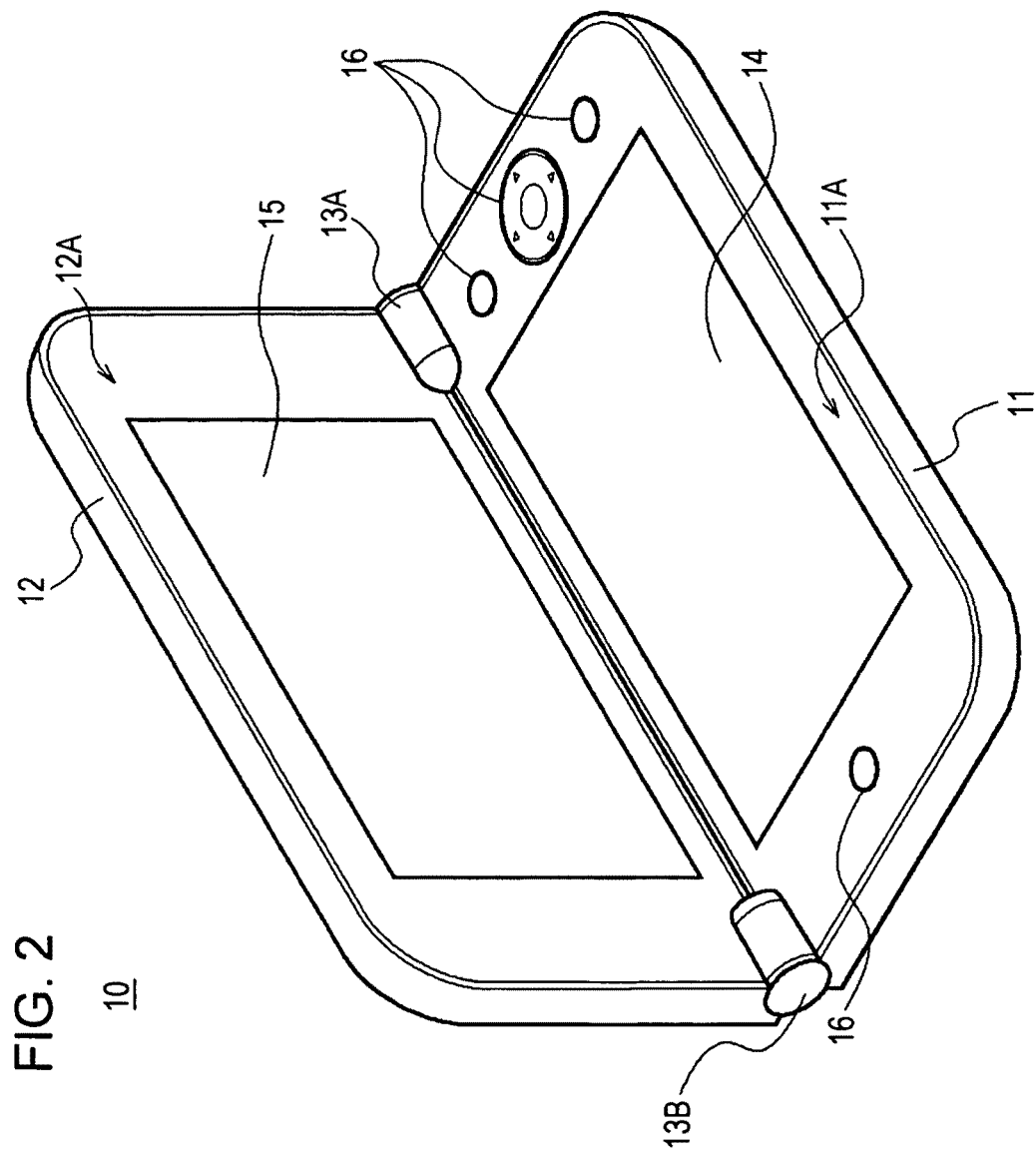
FIG. 2 is a diagram schematically illustrating an external configuration of a mobile terminal according to an embodiment.

1-2. Specific Example According to Embodiment 1-2-1. External Configuration of Mobile Terminal Next, an external configuration of a mobile terminal 10 which is a specific example of the display control apparatus 1 will be described with reference to FIG. 2. The mobile terminal 10 has a configuration in which a first casing 11 with a second casing 12 which are approximately flat and rectangular are connected through hinge sections 13A and 13B to be able to be opened or closed, and has a size such as to be gripped with one hand as a whole.

In the mid portion of a front surface 11A of the first casing 11 is installed a first touch screen 14 of a rectangular shape. Further, in the mid portion of a front surface 12A of the second casing 12 is installed a second touch screen 15 having the same shape and the same size as the first touch screen 14.

The first touch screen 14 includes a first liquid crystal display panel, and a first touch panel of an electrostatic capacitance type which is arranged to cover a display surface of the first liquid crystal display panel.

Further, the first touch panel has a transparent thin sheet shape, so that an image displayed on the display surface of the first liquid crystal display panel can be seen from a front side of the first touch screen 14.

In a similar way to the first touch screen 14, the second touch screen 15 includes a second liquid crystal display panel, and a second touch panel of an electrostatic capacitance type which is arranged to cover a display surface of the second liquid crystal display panel.

Further, in a similar way to the first touch panel, the second touch panel has a transparent thin sheet shape, so that an image displayed on the display surface of the second liquid crystal display panel can be seen from a front side of the second touch screen 15.

Further, in the first touch panel and the second touch panel, the touch manipulation and the proximity manipulation are performed by a finger (a touch pen or the like) of the user, for example, with respect to their manipulation surfaces.

Hereinafter, the manipulation surface of the first touch panel is referred to as "first manipulation surface", and the manipulation surface of the second touch panel is referred to as "second manipulation surface".

Here, the touch manipulation is a manipulation performed by bringing a finger in touch with the first manipulation surface of the first touch panel or the second manipulation surface of the second touch panel (hereinafter, referred to as "touch manipulation").

Further, the proximity manipulation is a manipulation performed by moving a finger close to the first manipulation surface or the second manipulation surface, without being in touch with the first manipulation surface of the first touch panel or the second manipulation surface of the second touch panel. The first touch panel and the second touch panel correspond to a multi-touch.

Further, the mobile terminal 10 receives the touch manipulation and the proximity manipulation by means of the finger for the surfaces of the first touch screen 14 and the second touch screen 15 (that is, the first manipulation surface and the second manipulation surface) as a manipulation input.

Further, on the front surface 11A of the first casing 11, a variety of manipulation buttons 16 such as a power button is also installed at sides of the first touch screen 14.

Generally, the mobile terminal 10 with such a configuration is used in a posture for positioning the front surface 11A of the first casing 11 below the eyeline, in a state where the first casing 11 and the second casing 12 are opened at a desired angle, and for positioning the front surface 12A of the second casing 12 above the eyeline.

Accordingly, the mobile terminal 10 uses the first touch screen 14 as a down screen, and uses the second touch screen 15 as an up screen, according to such a general usage position, to thereby display a variety of images on these screens (display surfaces of the first liquid crystal display panel and the second liquid crystal display panel).

Hereinafter, on the surface (a display surface of a first liquid crystal display panel 14A and a first manipulation surface of a first touch panel 14B) of the first touch screen 14, the side of the hinge sections 13A and 13B which is one vertical direction side of a screen is referred to as "up".

Further, hereinafter, on the surface (the display surface of the first liquid crystal display panel 14A and the first manipulation surface of the first touch panel 14B) of the first touch screen 14, the other vertical direction side of the screen is referred to as "down".

Further, hereinafter, on the surface (the display surface of the first liquid crystal display panel 14A and the first manipulation surface of the first touch panel 14B) of the first touch screen 14, one horizontal direction side of the screen is referred to as "left", and the other horizontal direction side of the screen is referred to as "right".

On the other hand, hereinafter, on the surface (a display surface of a second liquid crystal display panel 15A and a second manipulation surface of a second touch panel 15B) of the second touch screen 15, one vertical direction side of the screen is referred to as "up".

Further, hereinafter, on the surface (the display surface of the second liquid crystal display panel 15A and the second manipulation surface of the second touch panel 15B) of the second touch screen 15, the side of the hinge sections 13A and 13B which is the other vertical direction side of the screen is referred to as "down".

Further, hereinafter, on the surface (the display surface of the second liquid crystal display panel 15A and the second manipulation surface of the second touch panel 15B) of the second touch screen 15, one horizontal direction side of the screen is referred to as "left", and the other horizontal direction side of the screen is referred to as "right".

However, the first touch screen 14 and the second touch screen 15 are installed in the mobile terminal 10, so that the upper side of the first touch screen 14 and the lower side of the second touch screen 15 are disposed in proximity to each other and are aligned from the downside to the upside in the general usage posture.

Further, the mobile terminal 10 may display different images on the first touch screen 14 and the second touch screen 15, respectively, in the general usage posture.

Further, the mobile terminal 10 may determine the first touch screen 14 and the second touch screen 15 to be one screen to display one image across the second touch screen 15 to the first touch screen 14, in the general usage posture.

1-2-2. Hardware Configuration of Mobile Terminal

Figure 3:
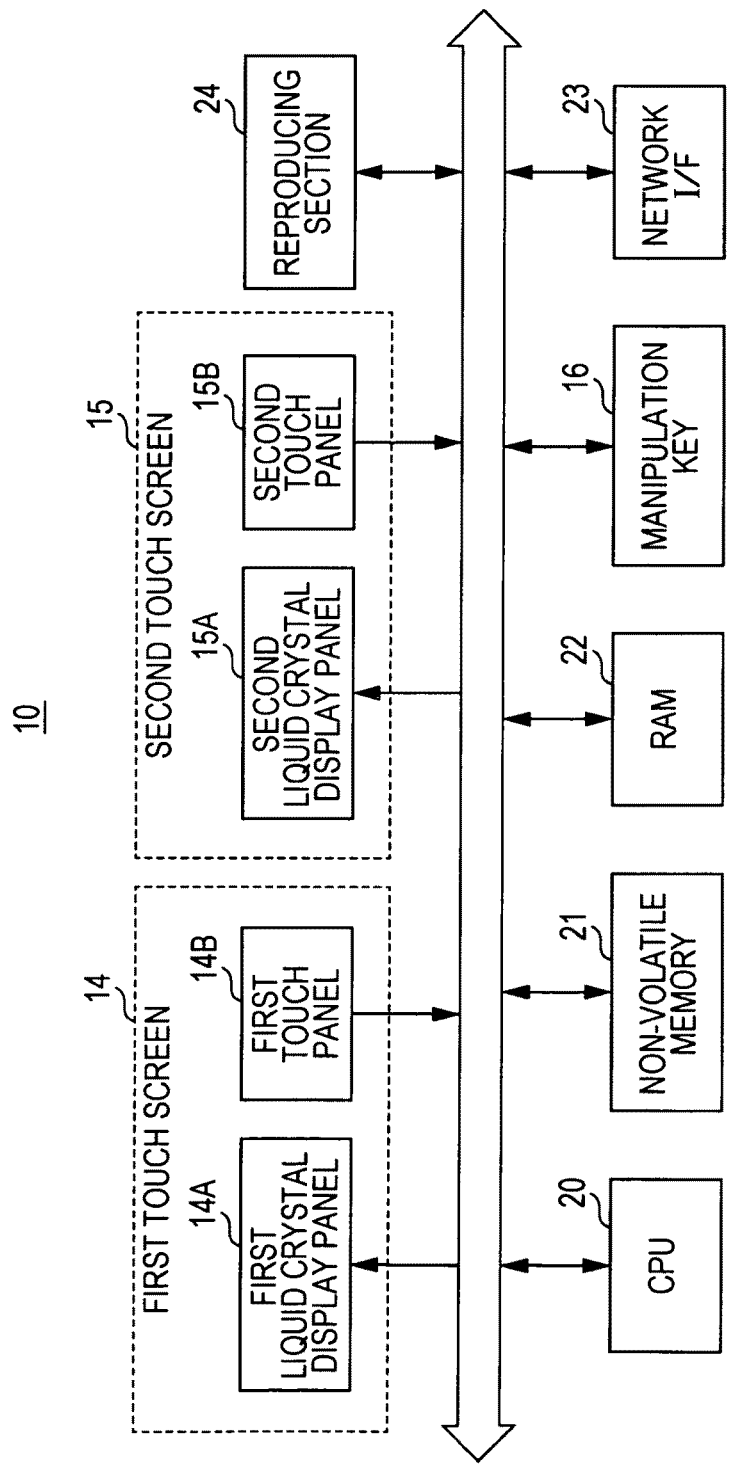
FIG. 3 is a block diagram illustrating a circuit configuration through hardware circuit blocks of a mobile terminal.

Next, a hardware configuration of the mobile terminal 10 will be described with reference to FIG. 3. A control section 20 including a CPU (central processing unit) is installed in the mobile terminal 10.

The control section 20 read outs a program stored in a non-volatile memory 21 in advance from the non-volatile memory 21 and expands it to a RAM (random access memory) 22. Further, the control section 20 performs a variety of processes according to the program and controls the respective sections.

Thus, the control section 20 detects whether the touch manipulation or the proximity manipulation is performed for the surfaces of the first touch screen 14 and the second touch screen 15.

Further, if it is detected that the touch manipulation or the proximity manipulation is performed for the surfaces of the first touch screen 14 and the second touch screen 15, the control section 20 performs a process instructed according to the touch manipulation or the proximity manipulation.

Actually, the first touch screen 14 includes the first liquid crystal display panel 14A which displays an image as described above, and the first touch panel 14B of the electrostatic capacitance type.

The first touch panel 14B has, for example, a plurality of electrostatic sensors (not shown) which is arranged in a matrix format inside of the first manipulation surface, which faces a plurality of pixels of the first liquid crystal display panel 14A.

In the plurality of electrostatic sensors, if a conductor such as a finger moves close thereto, electrostatic capacitances are changed, and output values are also changed according to the change in the electrostatic capacitances.

As shown in FIG. 4, for example, if a fingertip moves close to the first manipulation surface of the first touch panel 14B by the distance of 30 mm, an output value of the electrostatic sensor which is positioned directly under the fingertip in the first manipulation surface becomes "10".

Further, for example, if the fingertip moves close to the first manipulation surface of the first touch panel 14B by the distance of 15 mm, an output value of the electrostatic sensor which is positioned directly under the fingertip in the first manipulation surface becomes "20".

Furthermore, for example, if the fingertip moves close to the first manipulation surface of the first touch panel 14B by the distance of 5 mm, an output value of the electrostatic sensor which is positioned directly under the fingertip in the first manipulation surface becomes "40".

In addition, for example, if the fingertip is in touch with the first manipulation surface of the first touch panel 14B, an output value of the electrostatic sensor which is positioned in a portion which is in touch with the fingertip in the first manipulation surface becomes "80" at maximum.

Accordingly, the control section 20 performs an area detection process at a predetermined time interval such as several msec or several μsec, which are significantly short.

When performing the area detection process, the control section 20 acquires an output value of each electrostatic sensor from the first touch panel 14B and position information indicating an arrangement position of the electrostatic sensor, as a panel output signal.

The arrangement position of the electrostatic sensor is indicated by coordinates (that is, two-dimensional coordinates indicating a position where a pixel facing the electrostatic sensor is arranged in the first liquid crystal display panel 14A) of a pixel position of the first liquid crystal display panel 14A facing the electrostatic sensor, for example.

Further, as shown in FIGS. 5A and 5B, the control section 20 sequentially compares an output value of each electrostatic sensor included in the panel output signal with a predetermined first threshold value, for example, "50" and a predetermined second threshold value, for example, "20" which are selected in advance.

Further, the control section 20 detects an area TA1 with which the finger is in touch on the first manipulation surface, an area CA1 which becomes shaded due to the proximity of the finger, and an area NA1 which the finger is neither in touch with nor moves close to, on the basis of the comparison result and the position information included in the panel output signal.

Hereinafter, on the first manipulation surface of the first touch panel 14B and the second manipulation surface of the second touch panel 15B, the area TA1 with which the finger is in touch is referred to as "touch area TA1".

Further, hereinafter, on the first manipulation surface or the second manipulation surface, the area CA1 (that is, area CA1 in which a proximity portion of the finger is projected on the first manipulation surface or the second manipulation surface) which becomes shaded by moving the finger close is referred to as "proximity area CA1".

In addition, hereinafter, on the first manipulation surface or the second manipulation surface, the area NA1 which the finger is neither in touch with nor moves close to is referred to as "non-proximity area NA1".

Even in a case where a plurality of fingers is in touch with or moves close to the first manipulation surface, for example, in a state where the plurality of fingers are in touch with each other, the first and second threshold values are appropriately selected so that the touch area or the proximity area can be detected for each finger, using the fact that portions between pads and tips of the fingers are disengaged from the first manipulation surface compared with the pads or tips of the fingers.

Accordingly, when performing the area detection process, the control section 20 detects one or plural areas TA1 in which the electrostatic sensors which obtain output values equal to or higher than the first threshold value are collected on the first manipulation surface, as the touch area TA1, respectively.

At this time, the control section 20 detects one or plural touch areas TA1 on the first manipulation surface as coordinates of pixel positions facing the electrostatic sensors which obtain the output values equal to or higher than the first threshold value, respectively.

Further, if one or plural touch areas TA1 are detected, the control section 20 detects, for example, each center position P1 of the detected one or plural touch areas TA1 as the coordinates of the facing pixel position.

Further, at this time, the control section 20 detects one or plural areas CA1 in which the electrostatic sensors which obtain output values which are equal to or higher than the second threshold value and are lower than the first threshold value are collected on the first manipulation surface, as the proximity area CA1, respectively.

Hereinafter, a range of the distance to the finger from the first manipulation surface or the second manipulation surface in which the proximity area CA1 can be detected in which the output values of the electrostatic sensors are equal to or higher than the second threshold value and are lower than the first threshold value is referred to as "proximity detection distance range".

At this time, the control section 20 detects one or plural touch areas TA1 on the first manipulation surface, as coordinates of the pixel positions facing the electrostatic sensors which obtain the output values which are equal to or higher than the second threshold value and are lower than the first threshold value, respectively.

Further, even when one or plural proximity areas CA1 are detected in this way, the control section 20 detects, for example, each center position P2 of the detected one or plural proximity areas CA1, as the coordinates of the facing pixel position.

However, in a case where the touch manipulation is performed on the first manipulation surface of the first touch panel 14B, only the fingertip may be in touch with the first manipulation surface in a state where the finger is obliquely inclined.

In this case, in the first touch panel 14B, an output value of the electrostatic sensor which is disposed in the touch portion of the finger on the first manipulation surface becomes the maximum value (for example, "80") as described above.

Further, in the first touch panel 14B, an output value of the electrostatic sensor which is disposed in the portion (non-touch portion which is directly under the finger) which becomes shaded by the finger on the first manipulation surface decreases as it becomes distant from the touch portion of the finger, for example.

Thus, when simply using comparison results between the output value of the electrostatic sensor and the first and second threshold values, the control section 20 detects the fingertip side among the portion which becomes shaded by the finger being in touch with the first manipulation surface and the touch portion of the finger, as the touch area TA1.

Further, at this time, the control section 20 may detect the base side of the finger among the portion which becomes shaded by the finger being in touch with the first manipulation surface, as the proximity area CA1 which is connected to the touch area TA1, according to the angle of the finger with respect to the first manipulation surface.

Here, the control section 20 employs the touch manipulation and the proximity manipulation as a manipulation for instruction of performing different processes, and detects the touch area TA1 or the proximity area CA1 in order to individually detect that the touch manipulation or the proximity manipulation is performed.

Thus, if the touch area TA1 and the proximity area CA1 which is connected to the touch area TA1 are simultaneously detected, the control section 20 validates only the detection of one touch area TA1 and negates the detection of the other proximity area CA1 on the basis of the comparison results between the output value of the electrostatic sensor and the first and second threshold values.

That is, if the touch area TA1 and the proximity area CA1 which is connected to the touch area TA1 are simultaneously detected, the control section 20 determines that the touch area TA1 through the touch manipulation performed on the first manipulation surface is detected and cancels the detection of the proximity area CA1 as a false detection.

Thus, when the touch manipulation is performed on the first manipulation surface, the control section 20 prevents a false operation (that is, performing a false process) due to the false determination that the proximity area CA1 is detected and the proximity manipulation is performed.

Further, at this time, the control section 20 detects one or plural areas NA1 in which the electrostatic sensors which obtain output values lower than the second threshold value are collected on the first manipulation surface, as a non-proximity area NA1, respectively.

Also, at this time, the control section 20 detects one or plural non-proximity areas NA1 on the first manipulation surface as coordinates of the pixel positions facing the electrostatic sensors which obtain the output values lower than the second threshold value, respectively.

In this way, whenever performing the area detection process, the control section 20 performs the detection so that one or plural touch areas TA1, one or plural proximity areas CA1, or one or plural non-proximity areas NA1 are distinguished from each other on the first manipulation surface of the first touch panel 14B.

Further, the control section 20 may recognize whether the finger is in touch with or moves close to the first manipulation surface, by performing the detection so that the touch area TA1, the proximity area CA1 and the non-proximity area NA1 are distinguished from each other on the first manipulation surface of the first touch panel 14B.

Further, at this time, the control section 20 may recognize which position the finger is in touch with or moves close to, on the first manipulation surface of the first touch panel 14B.

Furthermore, the control section 20 may recognize the shape or size of the touch area TA1 of the finger on the first manipulation surface of the first touch panel 14B, the shape or size of the proximity area CA1 of the finger on the first manipulation surface, or the like.

The control section 20 obtains a panel output signal from the first touch panel 14B at predetermined time intervals in this way, and detects the touch area TA1, the proximity area CA1 and the non-proximity area NA1 on the first manipulation surface, to thereby detect their displacements.

Further, the control section 20 specifies the movement of the finger on the first manipulation surface of the first touch panel 14B according to the displacements, and recognizes the touch manipulation and the proximity manipulation performed for the first manipulation surface according to the specified movement of the finger.

Further, the control section 20 performs the process instructed by the recognized touch manipulation and proximity manipulation. In this way, if the touch manipulation or the proximity manipulation is performed for the first manipulation surface of the first touch screen 14, the control section 20 receives it as a manipulation input, and performs the process according to the manipulation input.

On the other hand, the second touch screen 15 includes the second liquid crystal display panel 15A which displays an image, and the second touch panel 15B of the electrostatic capacitance type, as described above.

The second touch panel 15B is configured in a similar way to the first touch panel 14B, and has a plurality of electrostatic sensors (not shown) which are arranged inside the second manipulation surface in a matrix format, facing the plurality of pixels of the second liquid crystal display panel 15A, for example.

Further, if the finger moves close to the plurality of electrostatic sensors of the second touch panel 15B, electrostatic capacitances are changed in a similar way to the case of the plurality of electrostatic sensors of the first touch panel 14B, and output values are also changed according to the change in the electrostatic capacitances.

Thus, when performing the area detection process at predetermined time intervals, the control section 20 obtains an output value of each electrostatic sensor from the second touch panel 15B in a similar way to the case of the first touch panel 14B, and position information indicating the arrangement position of the electrostatic sensor, as the panel output signal.

For example, the arrangement position of the electrostatic sensor is indicated by coordinates of the pixel position of the second liquid crystal display panel 15A facing the electrostatic sensor (that is, two-dimensional coordinates indicating the position in which a pixel facing the electrostatic sensor is arranged in the second liquid crystal display panel 15A).

Further, if the panel output signal is obtained from the second touch panel 15B in the area detection process, the control section 20 appropriately detects one or plural touch areas or one or plural proximity areas and the center positions thereof on the second manipulation surface using the panel output signal.

Further, whenever the area detection process is performed, the control section 20 also detects one or plural non-proximity areas on the second manipulation surface of the second touch panel 15B.

That is, whenever the area detection process is performed, the control section 20 performs the detection so that one or plural touch areas, one or plural proximity areas, and one or plural non-proximity areas are distinguished from each other on the second manipulation surface of the second touch panel 15B.

Accordingly, the control section 20 may recognize whether the finger is in touch with or moves close to the second manipulation surface, on the second manipulation surface of the second touch panel 15B.

Further, at this time, the control section 20 may recognize which position the finger is in touch with or moves close to, on the second manipulation surface of the second touch panel 15B.

Furthermore, the control section 20 may recognize the shape or size of the touch area of the finger on the second manipulation surface of the second touch panel 15B, the shape or size of the proximity area of the finger on the second manipulation surface, or the like.

The control section 20 obtains a panel output signal from the second touch panel 15B at predetermined time intervals in this way, detects the touch area, the proximity area and the non-proximity area on the second manipulation surface, to thereby detect their displacements.

Further, the control section 20 specifies the movement of the finger on the second manipulation surface of the second touch panel 15B according to the displacements, and recognizes the touch manipulation and the proximity manipulation performed for the second manipulation surface according to the specified movement of the finger.

Further, the control section 20 performs the process instructed by the recognized touch manipulation and proximity manipulation. In this way, if the touch manipulation or the proximity manipulation is performed for the second manipulation surface of the second touch screen 15, the control section 20 receives it as a manipulation input, and performs the process according to the manipulation input.

However, as the touch manipulation performed on the first manipulation surface of the first touch panel 14B or the second manipulation surface of the second touch panel 15B, there is such a manipulation that one finger is in touch with approximately one point of the first manipulation surface or the second manipulation surface and then is immediately disengaged, for example.

Hereinafter, the manipulation that one finger is in touch with the first manipulation surface or the second manipulation surface and then is immediately disengaged is referred to as "tap manipulation", in particular.

The tap manipulation is, for example, chosen for performing instruction of an indicant such as an icon or button, a specific image or the like which is arranged in an image being displayed and indicates a variety of information which can be selected by instructions.

Further, as the tap manipulation performed on the first manipulation surface of the first touch panel 14B or the second manipulation surface of the second touch panel 15B, for example, there is a manipulation in which one finger is in touch with the first manipulation surface or the second manipulation surface and then is immediately disengaged while rapidly moving the finger in an arbitrary direction, for example.

Hereinafter, the manipulation in which one finger is in touch with the first manipulation surface or the second manipulation surface and then is immediately disengaged while rapidly moving the finger in an arbitrary direction is referred to as "flick manipulation", in particular.

For example, the flick manipulation is performed for instruction of performing a process of relatively quickly scrolling an image being displayed to thereby change a displayed portion.

Further, as the touch manipulation performed on the first manipulation surface of the first touch panel 14B or the second manipulation surface of the second touch panel 15B, there is a manipulation in which one finger is moved while being in touch with the first manipulation surface or the second manipulation surface.

Hereinafter, the manipulation that one finger is moved while being in touch with the first manipulation surface or the second manipulation surface is referred to as "sliding manipulation", in particular.

For example, the sliding manipulation is performed for instructing a process of scrolling an image being displayed to trace the movement of the finger, to thereby change a displayed portion.

Accordingly, whenever the area detection process is performed, if the touch area and the center position thereof are detected on the basis of the panel output signal obtained from the first touch panel 14B, the control section 20 determines the type of the touch manipulation performed on the first manipulation surface on the basis of the series of detection results.

Actually, the control section 20 retains in advance the maximum movement distance information indicating the maximum movement distance in which the finger which performs the touch manipulation or the proximity manipulation is movable at the above-described predetermined time intervals which are performance intervals of the area detection process.

Further, if the panel output signal is obtained from the first touch panel 14B by performing the area detection process and one touch area and the center position thereof are detected, the control section 20 determines whether the touch area is detected in the previous (one time before) area detection process in each case.

As a result, if the touch area is not detected at all in the previous area detection process, the control section 20 determines that one touch area detected in a current area detection process is a touch area when the touch of the finger on the first manipulation surface is started.

In this respect, if the touch area is detected in the previous area detection process, the control section 20 calculates the distance (hereinafter, referred to as "inter-center distance") between the center position detected in the previous area detection process and the center position detected in the current area detection process in a round-robin manner.

Further, the control section 20 compares the calculated one or plural inter-center distances with the maximum movement distance, respectively. Further, the control section 20 determines whether the center position within the maximum movement distance from the center position detected in the previous area detection process is detected in the current area detection process, on the basis of the comparison result.

As a result, if the center position within the maximum movement distance from the previous center position is detected in the current area detection process, the control section 20 determines that the previous and current touch areas corresponding to the previous and current center positions are the touch areas of the same finger.

That is, if the center position within the maximum movement distance from the previous center position is detected in the current area detection process, the control section 20 determines that the touch area corresponding to the current center position is the touch area of the finger which is in touch with the first manipulation surface from the time of the previous area detection process.

Further, if the center position which is at a distance beyond the maximum movement distance from any previous center position is detected in the current area detection process, the control section 20 determines that the touch area corresponding to the current center position is a touch area when a new (different) finger is initially in touch with the first manipulation surface.

Further, if the center position in which the inter-center distance to any previous center position is equal to or smaller than the maximum movement distance is not detected in the current area detection process, the control section 20 determines that the touch area corresponding to the previous center position is the touch area when the touch of the finger on the first manipulation surface is terminated.

That is, if the touch area of the center position in which the inter-center distance to any previous center position is equal to or smaller than the maximum movement distance is not detected in the current area detection process, the control section 20 determines that the touch area corresponding to the previous center position is the touch area immediately before the finger is disengaged from the first manipulation surface.

Further, if the touch area is not detected at all although the area detection process is performed, the control section 20 also determines whether the touch area is detected in the previous (one time before) area detection process.

As a result, if the touch area is detected in the previous area detection process, the control section 20 determines that the previous touch area is a touch area when the touch of the finger on the first manipulation surface is terminated.

That is, even though the touch area is detected in the previous area detection process, if the touch area is not detected at all in the current area detection process, the control section 20 determines that the previous touch area is a touch area immediately before the finger is disengaged from the first manipulation surface.

In this way, the control section 20 sequentially performs the area detection processes, to thereby detect the touch area whenever the finger is in touch with the first manipulation surface when the touch manipulation is started.

Further, the control section 20 sequentially performs the area detection processes, to thereby sequentially trace one touch area with the finger for detection while the finger is in touch with the first manipulation surface (while the touch manipulation is being performed on the first manipulation surface).

That is, if the area detection process is performed and one touch area when the touch of the finger is started is detected, the control section 20 sequentially performs the area detection processes, to thereby trace the one touch area with the finger until the touch of the finger is terminated.

With such a configuration, for example, if one touch area is detected in a state where the touch manipulation is not performed on the first manipulation surface and it is determined that this is a touch area when the touch of the finger is started, the control section 20 determines that the touch manipulation is started at this time.

At this time, the control section 20 starts measurement of the time (hereinafter, referred to as "touch time") when the finger is in touch with the first manipulation surface by the touch manipulation performed on the first manipulation surface, for example, by a timer (not shown), according to the determination that the touch manipulation is started.

If one touch area is detected when the touch of one finger is started and the measurement of the touch time is started, the control section 20 continues to measure the touch time while performing the detection for sequentially tracing one touch area.

If it is determined that one touch area in which the detection for the sequential trace is performed is a touch area when the touch is terminated, the control section 20 determines whether the touch manipulation is terminated at that time and stops the measurement of the touch time.

Further, the control section 20 also starts the detection of the movement trace of the finger, using the center position of the touch area when the touch of the finger is started as a starting point, according to the start of the touch manipulation.

Whenever the control section 20 detects the touch area and the center position thereof by means of the touch manipulation by performing the area detection process after the touch manipulation is started, the control section 20 sequentially traces the detected center position from the starting point (center position), to thereby detect the movement trace of the finger.

Further, the control section 20 compares the touch time with a predetermined time selected in advance for detection of the type of the touch manipulation, for example, equal to or shorter than 1 sec (hereinafter, referred to as "type detection time").

As a result, if the touch manipulation is terminated before the touch time reaches the type detection time and the measurement of the touch time is terminated, the control section 20 determines whether the movement trace detected thus far falls within a circle of a predetermined radius centering on the starting point (center position).

The circle centering on the starting point is used for detecting the type of the touch manipulation.

Hereinafter, the circle is referred to as "touch manipulation detection circle". Further, the radius of the touch manipulation detection circle is selected in advance with a predetermined length equal to or shorter than 1 mm, for example.

If the movement trace of the finger from the start of the touch manipulation to the end thereof falls within the touch manipulation detection circle, the control section 20 determines that the touch manipulation performed on the first manipulation surface at this time is the tap manipulation.

At this time, the control section 20 uses the center position (that is, the center position indicated by the coordinates of the pixel position) of the touch area at the time when the touch of the finger through the tap manipulation is terminated as a tap instruction position instructed by the tap manipulation on the display surface of the first liquid crystal display panel 14A at this time.

In this respect, if the movement trace of the finger from the start of the touch manipulation to the end thereof extends outside the touch manipulation detection circle from the starting point, for example, the control section 20 determines that the touch manipulation performed on the first manipulation surface at this time is the flick manipulation.

At this time, the control section 20 uses a direction directing to the center position of the touch area at the time when the touch of the finger is terminated from the center position (starting point) of the touch area at the time when the touch of the finger through the flick manipulation is started, as a movement direction of the finger through the flick manipulation. Further, the control section 20 uses the movement direction of the finger through the flick manipulation for image scrolling, for example.

Further, if the touch time measured by a timer is equal to or longer than the type detection time, whenever the movement trace of the finger is sequentially updated according to the detection of the center position, the control section determines whether the updated movement trace extends outside the touch manipulation detection circle.

As a result, if it is detected that the movement trace of the finger extends outside the touch manipulation detection circle in the touch manipulation performed beyond the type detection time, the control section 20 determines that the touch manipulation performed on the first manipulation surface at this time is the sliding manipulation.

In this case, until the sliding manipulation is terminated after the time (hereinafter, referred to as "sliding manipulation detection time") when it is determined that the touch manipulation is the sliding manipulation, the control section 20 sequentially updates the movement trace of the finger according to the detection of the center position.

Further, the control section 20 uses the movement trace of the finger through the sliding manipulation for image scrolling, for example.

If the touch manipulation is terminated in a state where the movement trace of the finger falls within the touch manipulation detection circle in the touch manipulation performed beyond the type detection time, the control section 20 determines that the finger is mistakenly in touch with the first manipulation surface at this time and the touch manipulation is not performed.

In this way, the control section 20 can detect that the tap manipulation is performed using one finger, for example, on the first manipulation surface of the first touch panel 14B.

Further, the control section 20 can detect that the flick manipulation is performed using one finger, for example, on the first manipulation surface of the first touch panel 14B.

Furthermore, the control section 20 can detect that the sliding manipulation is performed using one finger, for example, on the first manipulation surface of the first touch panel 14B.

On the other hand, if the area detection process is performed, and the touch area and the center position thereof are detected on the basis of the panel output signal obtained from the second touch panel 15B, even in this case, the control section 20 performs the same process as the process for detecting the type of the touch manipulation performed on the first manipulation surface.

Accordingly, the control section 20 can detect that the tap manipulation is performed using one finger, for example, on the second manipulation surface of the second touch panel 15B.

Further, the control section 20 can detect that the flick manipulation is performed using one finger, for example, on the second manipulation surface of the second touch panel 15B.

Furthermore, the control section 20 can detect that the sliding manipulation is performed using one finger, for example, on the second manipulation surface of the second touch panel 15B.

However, for example, image data having a variety of images such as menu images in which the indicants indicating a variety of selectable information are arranged is stored in advance in the non-volatile memory 21. Further, an information detection table generated for each image is stored in advance in the non-volatile memory 21.

Arrangement area information indicating positions of arrangement areas of the indicants in the corresponding image as coordinates of pixel positions and selection information indicating information selectable by the instruction of the indicants are correspondingly stored in each information detection table.

Accordingly, in a case where the control section 20 reads the image data from the non-volatile memory 21 and displays the image on at least one of the first liquid crystal display panel 14A and the second liquid crystal display panel 15A, the control section 20 reads out the information detection table corresponding to the image data into the RAM 22 from the non-volatile memory 21.

In this state, if it is detected that the tap manipulation is performed on the first manipulation surface of the first touch panel 14B, the control section 20 detects whether the arrangement area including the tap instruction position through the tap manipulation exists among the plurality of arrangement areas on the basis of the information detection table.

As a result, if the arrangement area including the tap instruction position is detected from the plurality of arrangement areas, the control section 20 detects the selection information corresponding to the arrangement area including the tap instruction position, on the basis of the information detection table.

In this way, the control section 20 detects information selected by the tap manipulation and performs a process according to the detected information.

Further, if an image is displayed on at least one of the first liquid crystal display panel 14A and the second liquid crystal display panel 15A, the control section 20 determines whether the entire image can be displayed on the display surface, and then recognizes whether the image can be scrolled according to the determination result.

Accordingly, if it is detected that the flick manipulation is performed on the first manipulation surface in a state where the image can be scrolled, the control section relatively rapidly scrolls the image which is being displayed in the movement direction of the finger.

Further, if it is detected that the sliding manipulation is performed on the first manipulation surface in a state where the image can be scrolled, the control section 20 scrolls the image which is being displayed so as to trace the movement of the finger on the basis of the movement trace of the finger.

Further, if it is detected that the flick manipulation or the sliding manipulation is performed on the first manipulation surface in a state where the image is unable to be scrolled, the control section 20 negates the detection.

Further, when it is detected that the tap manipulation is performed on the second manipulation surface of the second touch panel 15B, similarly, the control section 20 detects the information selected by the tap manipulation, and performs a process according to the detected information.

Further, if it is detected that the flick manipulation is performed on the second manipulation surface in a state where the image can be scrolled, the control section 20 relatively rapidly scrolls the image which is being displayed in the movement direction of the finger.

Further, if it is detected that the sliding manipulation is performed on the second manipulation surface in a state where the image can be scrolled, the control section 20 scrolls the image which is being displayed so as to trace the movement of the finger on the basis of the movement trace of the finger.

Further, if it is detected that the flick manipulation or the sliding manipulation is performed on the second manipulation surface in a state where the image is unable to be scrolled, the control section 20 negates the detection.

Actually, for example, if a predetermined image, in which an indicant indicating a start-up command of a Web browser which is selectable information is arranged, is displayed on the first liquid crystal display panel 14A, and the indicant is instructed by the tap manipulation, the control section 20 recognizes that the start-up command of the Web browser is selected.

Figure 6:
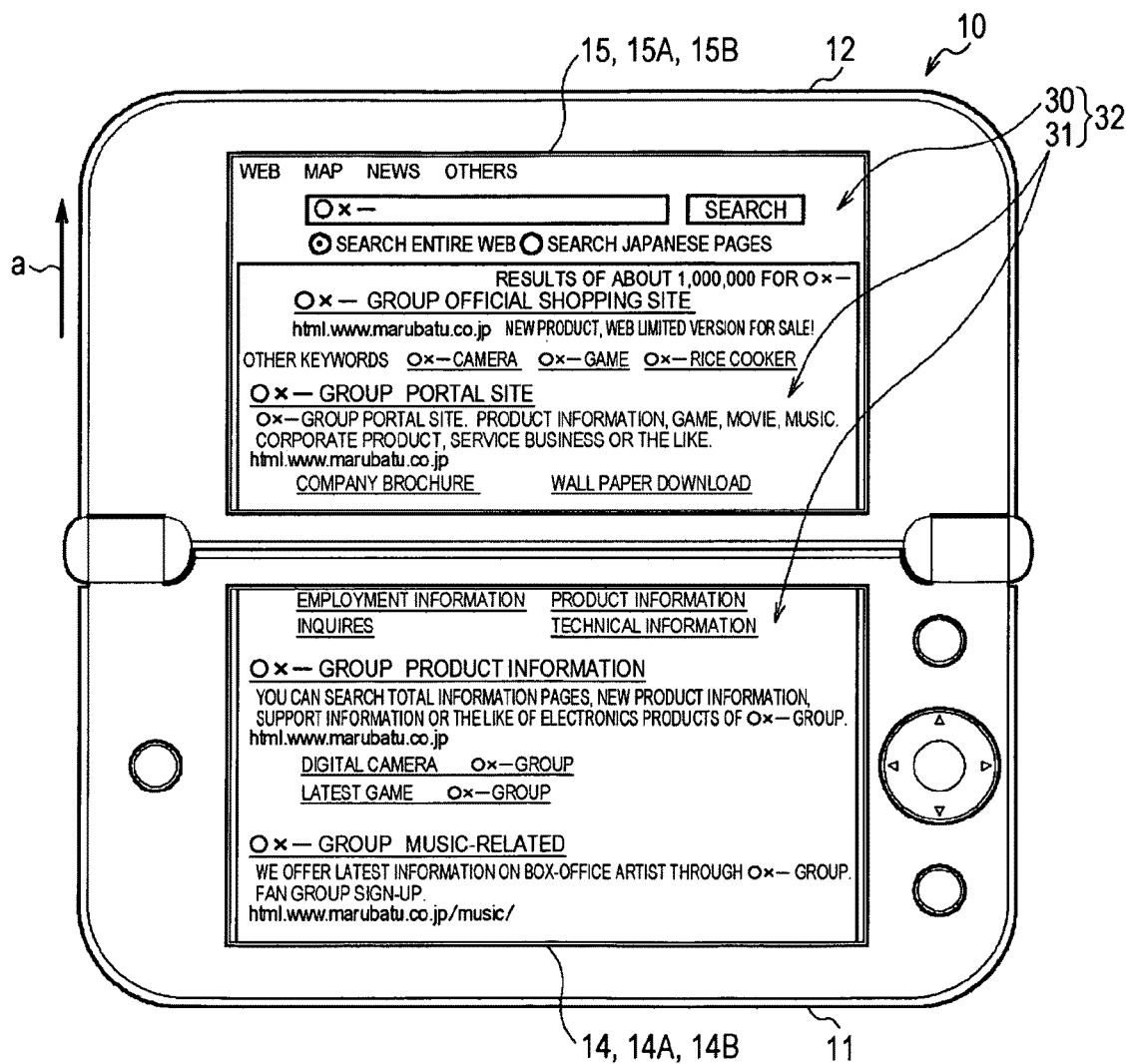
FIG. 6 is a diagram schematically illustrating a display of a Web image according to a tap manipulation.

In this case, as shown in FIG. 6, the control section 20 starts up the Web browser according to the selection of the start-up command of the Web browser, and displays one Web browser image 30 across the second liquid crystal display panel 15A and the first liquid crystal display panel 14A.

That is, at this time, the control section 20 determines both the display surfaces of the second liquid crystal display panel 15A and the first liquid crystal display panel 14A as one display surface, and displays the Web browser image 30 on these display surfaces.

Further, at this time, the control section 20 receives page data on a Web page from a server on a network through a network interface 23 at this time, and displays a page image 31 based on the page data to be inserted in a predetermined portion in the Web browser image 30.

Thus, the control section 20 can allow a user to browse the Web browser image 30 and the Web page (that is, page image 31) through the first liquid crystal display panel 14A and the second liquid crystal display panel 15A.

Hereinafter, the entire Web browser image 30 displayed with the page image 31 being inserted in a predetermined portion thereof is referred to as Web image 32.

At this time, for example if it is detected that a flick manipulation for moving the finger from the downside to the upside indicated by an arrow a is performed on the first manipulation surface of the first touch panel 14B, the control section 20 relatively rapidly scrolls up the Web image 32.

Further, for example, even if it is detected that the flick manipulation for moving the finger from the downside to the upside is performed on the second manipulation surface of the second touch panel 15B at this time, the control section 20 relatively rapidly scrolls up the Web image 32.

For example, if the tap manipulation is performed on the first manipulation surface or the second manipulation surface, in a state where the Web image 32 is relatively rapidly scrolled up according to the flick manipulation in this way, the control section 20 recognizes that the scrolling is instructed to be stopped.

Accordingly, if the tap manipulation is performed in a state where the Web image 32 is relatively rapidly scrolled up according to the flick manipulation, the control section 20 stops the relatively rapid scroll-up of the Web image 32.

Further, for example, if it is detected that a flick manipulation for moving the finger from the upside to the downside of the display surface is performed on the first manipulation surface of the first touch panel 14B, the control section 20 relatively rapidly scrolls down the Web image 32.

Further, for example, even if it is detected that the flick manipulation for moving the finger from the upside to the downside is performed on the second manipulation surface of the second touch panel 15B, the control section 20 relatively rapidly scrolls down the Web image 32.

If the tap manipulation is performed on the first manipulation surface or the second manipulation surface, in a state where the Web image 32 is relatively rapidly scrolled down according to the flick manipulation in this way, the control section 20 also recognizes that the scrolling is instructed to be stopped.

Accordingly, if the tap manipulation is performed in this way, in a state where the Web image 32 is relatively rapidly scrolled down according to the flick manipulation, accordingly, the control section 20 stops the relatively rapid scroll-down of the Web image 32.

In addition, at this time, for example, if it is detected that the sliding manipulation for moving the finger from the downside to the upside is performed on the first manipulation surface of the first touch panel 14B is performed, the control section 20 scrolls up the Web image 32 to trace the movement of the finger.

Further, for example, even if it is detected that the sliding manipulation for moving the finger from the downside to the upside is performed on the second manipulation surface of the second touch panel 15B, the control section 20 scrolls up the Web image 32 to trace the movement of the finger.

Further, at this time, if the sliding manipulation for moving the finger from the upside to the downside is performed on the first manipulation surface or the second manipulation surface, the control section 20 may scroll down the Web image 32 to follow the movement of the finger.

In this way, in the case where the entire Web image 32 is unable to be displayed across both the display surfaces of the second liquid crystal display panel 15A and the first liquid crystal display panel 14A, similarly, the control section 20 may appropriately scroll the Web image 32 to be completely displayed.

However, indicants indicating a variety of selectable information are arranged in the page image 31. Further, in the page image 31, the image position information indicating the positions of the arrangement areas of the indicants as the coordinates in the image and the selection information indicating information which can be selected by the instruction of the indicants are correspondingly added.

If the indicants of the page image 31 are displayed on the first liquid crystal display panel 14A, the control section 20 matches the selection information on the indicants with the display area information indicating the positions of the display areas of the indicants on the first liquid crystal display panel 14A as the coordinates of the pixel positions.

Further, if the indicants of the page image 31 are displayed on the second liquid crystal display panel 15A, the control section 20 matches the selection information on the indicants with the display area information indicating the positions of the display areas of the indicants on the second liquid crystal display panel 15A as the coordinates of the pixel positions.

In a case where the Web image 32 is scrolled to displace the display areas of the indicants, the control section 20 updates the display area information corresponding to the selection information on the indicants into the display area information indicating the positions of the display areas after displacement as the coordinates of the pixel positions.

Further, if it is detected that the tap manipulation is performed on the first manipulation surface in a state where the Web image 32 is not scrolled, the control section 20 detects the display area including the tap instruction position, from the display areas of one or plural indicants which are being displayed on the first liquid crystal display panel 14A.

Thus, the control section 20 detects information (that is, selection information matched with the display area including the tap instruction position) selected by the tap manipulation performed on the page image 31 at this time.

Further, if it is detected that the tap manipulation is performed on the second manipulation surface in a state where the Web image 32 is not scrolled, the control section 20 detects the display area including the tap instruction position, from the display areas of one or plural indicants which are being displayed on the second liquid crystal display panel 15A.

Thus, the control section 20 detects information (that is, selection information matched with the display area including the tap instruction position) selected by the tap manipulation performed on the page image 31 at this time.

Further, if the selected information is detected in this way, the control section 20 receives new page data from the server on the network, for example, through the network interface 23, and performs a process of displaying the page image based on the page data.

In this way, even in the case where the image acquired from the outside such as the page image 31 is displayed, if the tap manipulation is performed on the image, the control section 20 detects the information selected by the tap manipulation and performs the process according to the detected information.

However, in a case where the Web image 32 is displayed across both the display surfaces of the second liquid crystal display panel 15A and the first liquid crystal display panel 14A, the control section 20 may appropriately change the page image 31 to be displayed in the Web browser image 30 in this way.

Further, for example, the control section 20 minimizes the Web image 32 displayed across both the display surfaces of the second liquid crystal display panel 15A and the first liquid crystal display panel 14A and holds the display in a standby mode, and in this state, the control section 20 may perform the same process as described above to thereby display the new Web image 32.

That is, if the Web image 32 is expanded on the RAM 22 to be in a displayable state (that is, launch state), the control section 20 may hold the display in the standby mode without deleting it from the RAM 22, and may display only a new Web image.

Further, for example, the control section 20 may display the new Web image 32 to be overlapped on a front surface of the Web image 32 displayed across both the display surfaces of the second liquid crystal display panel 15A and the first liquid crystal display panel 14A.

That is, the control section 20 may hold the display in the standby mode by hiding the Web image 32 in the new Web image 32 without deleting the Web image 32 which is once launched from the RAM 22, and thus may display only the new Web image.

Further, in a state where a variety of images stored in the non-volatile memory 21, such as a menu image, schedule image, calendar image, or game image, in addition to the Web image 32, is appropriately launched, similarly, the control section 20 may hold the display in the standby mode.

In this way, the control section 20 can appropriately hold the display in the standby mode while sequentially launching the Web image 32 or menu image, schedule image or the like, thereby allowing the plurality of images to be launched at a time.

Hereinafter, the image which is expanded on the RAM 22 to be launched in the displayable state is referred to as "launch image".

In this way, in a case where the display of the plurality of launch images is held in the standby mode, the control section 20 presents the plurality of launch images to the user as a batch as described later, to thereby allow the user to select the launch image to be displayed.

Further, the control section 20 may display the selected one launch image across both the display surfaces of the second liquid crystal display panel 15A and the first liquid crystal display panel 14A, or on one of the first liquid crystal display panel 14A and the second liquid crystal display panel 15A.

However, for example, the control section 20 may receive page data for purchasing music data from the server in the album unit, as the above-described page image, and may display the page image based on the page data in the Web browser image.

Further, for example, if the music data which a user wants to purchase through a tap manipulation on such a page image is selected as an album, and purchasing of the album is selected, the control section 20 accordingly performs a purchasing process of the music data.

In this case, the control section 20 generates purchasing requirement data for requesting purchasing of the music data selected by the user as the album, and transmits the generated purchasing requirement data to the server on the network through the network interface 23.

As a result, if a billing process for the purchasing of the music data in the album unit from the server is completed, and the music data and corresponding music related information are sequentially transmitted by one set, the control section 20 receives them through the network interface 23.

Further, the control section 20 transmits the music data and the music related information which are received to the non-volatile memory 21 by one set, to thereby correspondingly store the music data and the music related information in the non-volatile memory 21.

In this way, the control section 20 may purchase the music data from the server on the network in the album unit and store it in the non-volatile memory 21.

Here, the music related information includes unique identification information on corresponding music data, and information such as a music track title based on the music data, artist name, genre name of the music genre, album title of the album in which the music is recorded.

In addition, the music related information also includes information such as image data of a jacket photo of the album in which the music based on the corresponding music data is recorded (hereinafter, referred to as "jacket image data"), reproduction time of the music data, or data format.

Further, the control section 20 builds in advance a database (hereinafter, referred to as "management database") for registering the music data in the non-volatile memory 21 for management.

Figure 7:
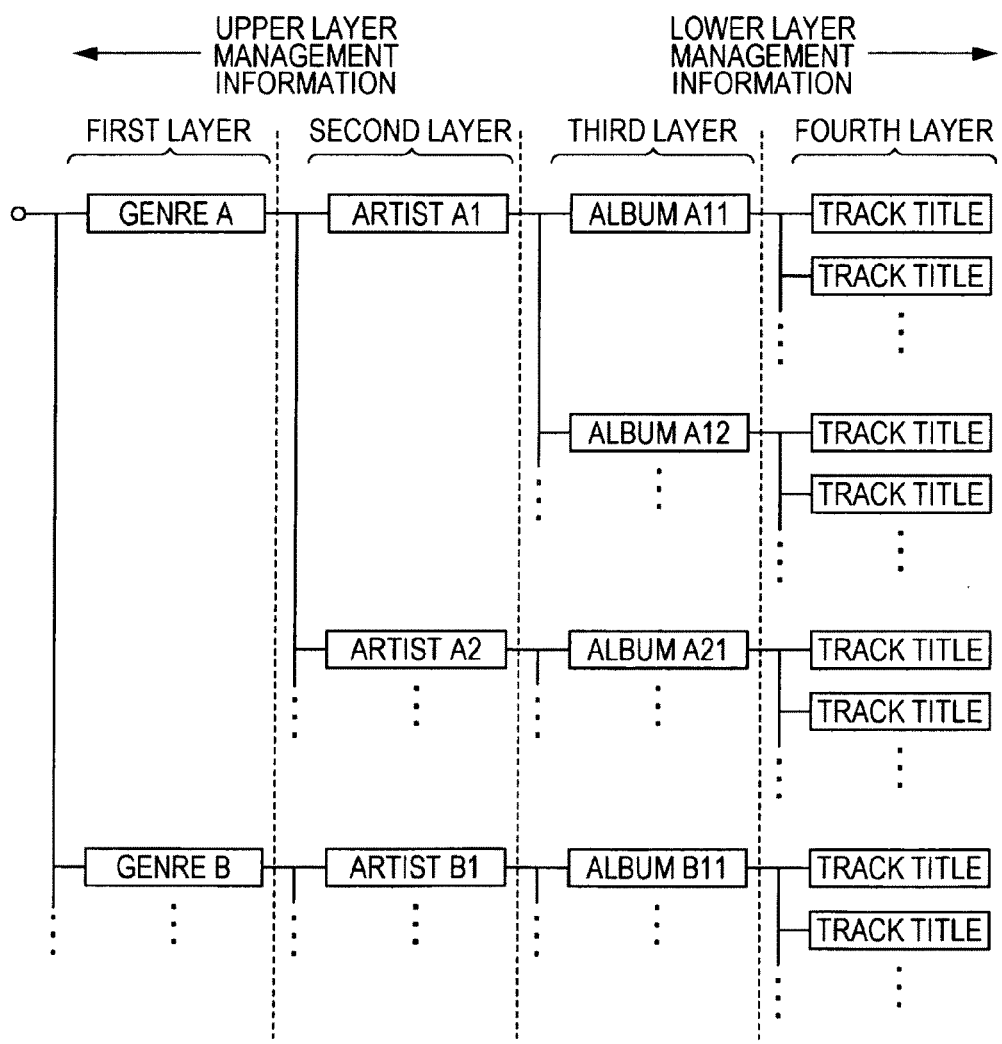
FIG. 7 is a diagram schematically illustrating a configuration of music management information.

Accordingly, as shown in FIG. 7, if the music data and the music related information are stored in the non-volatile memory 21, the control section 20 classifies the music data into genres on the basis of the music related information, classifies each genre into artists, and classifies each artist into albums.

Further, the control section 20 sets a plurality of genre names as management information of a first layer which is also a highest layer, so that the music data is managed through such a hierarchical classification.

Further, the control section 20 matches each of the plurality of genre names which is the first layer management information with one or plural artist names (that is, artists classified according to the music data belonging to the genre) which are the management information of a second layer which is one layer lower than the first layer.

Further, the control section 20 matches each of the artists which are the second layer management information with one or plural album titles (that is, albums classified according to music data of the artist) which are the management information of a third layer which is one layer lower than the second layer.

Further, the control section 20 matches each of the album titles which are the third layer management information with a plurality of track titles (that is, titles recorded on the album) which is management information of a fourth layer which is one layer lower than the third layer.

In this way, the control section 20 generates music management information in which the management information of the first to fourth layers are matched with each other, in order to manage the music data with such a hierarchical classification.

Further, the control section 20 transmits the music management information to the non-volatile memory 21 to be registered in the management database, and stores the music management information in the non-volatile memory 21.

Further, whenever the control section 20 stores the music data purchased from the server and the music related information in the non-volatile memory 21, the control section 20 updates contents of the music management information on the basis of the stored music related information.

Thus, the control section 20 can hierarchically manage a plurality of pieces of music data stored in the non-volatile memory 21, on the basis of the music management information registered in the management database.

If a predetermined image such as a menu image having indicants indicating a reproduction function selection command as the selectable information is displayed on the first liquid crystal display panel 14A and the indicants are instructed by the tap manipulation, the control section 20 recognizes that the reproduction function selection command is selected.

At this time, the control section 20 reads out the music management information from the non-volatile memory 21 and also reads out the jacket image data included in the music related information.

Further, the control section 20 generates a genre list arranging the plurality of genre names in alphabetical order, on the basis of the first layer management information included in the music management information.

Further, the control section 20 also generates an artist list arranging the plurality of artist names corresponding to the genre name for each genre name in alphabetical order, on the basis of the second layer management information included in the music management information.

Further, the control section 20 also generates an album list arranging the plurality of album titles corresponding to the artist name for each artist name in alphabetical order, on the basis of the third layer management information included in the music management information.

Further, the control section 20 also generates a track title list arranging the plurality of track titles corresponding to the album title for each album title on the basis of the fourth layer management information included in the music management information.

At this time, the control section 20 generates the track title list arranging the plurality of track tiles, in reproduction order of the music data predetermined in the album, for each album tile.

Further, the control section 20 generates image data on genre list image for allowing the user to select a desired genre, on the basis of the genre list, the artist list for each genre name and the jacket image data.

Figure 8:
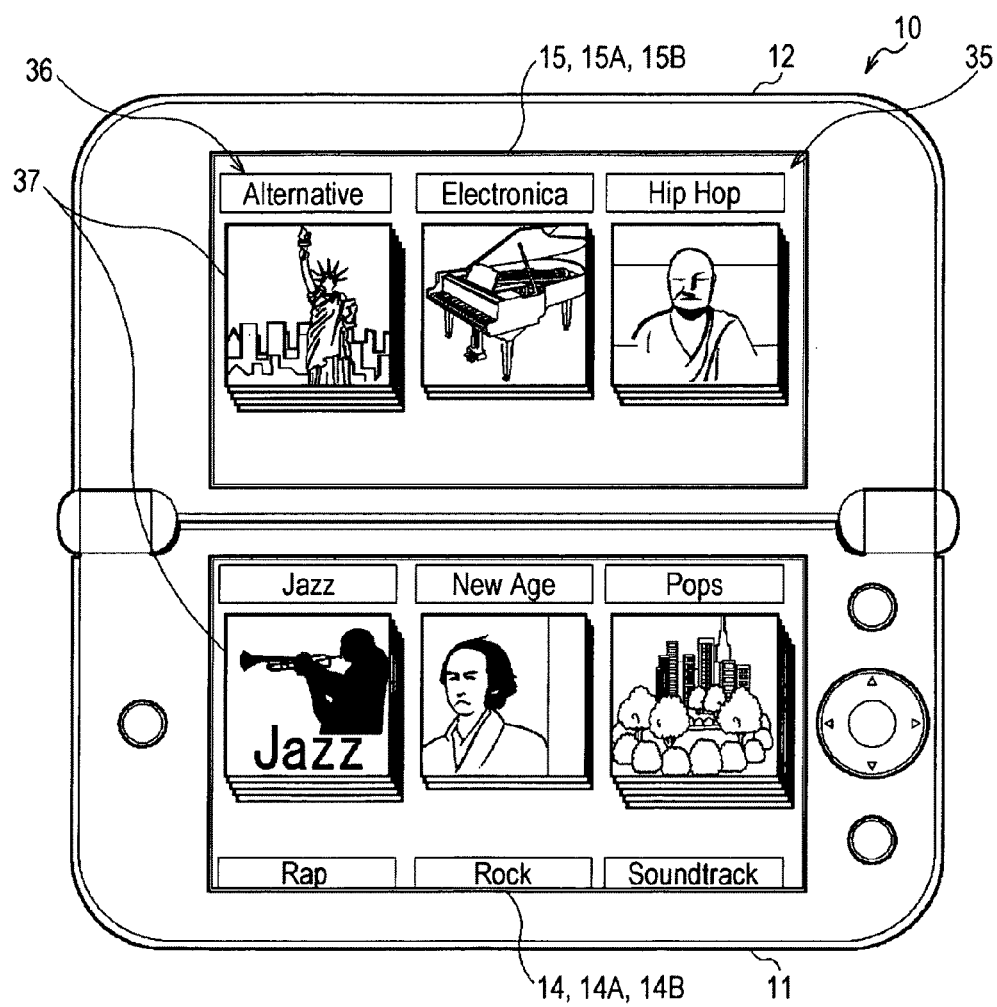
FIG. 8 is a diagram schematically illustrating a display of a genre list image according to a tap manipulation.

Further, as shown in FIG. 8, for example, the control section 20 displays a genre list image 35 indicating the classification (classification according to genres) of the first layer for the plurality of pieces of music data, on the basis of the image data, across the second liquid crystal display panel 15A to the first liquid crystal display panel 14A, for example.

In this case, for example, a plurality of genre icons 36 having different genre names as the indicants is arranged in the genre list image 35 in a matrix format (a plurality of rows and columns).

Further, in the genre list image 35, an image (hereinafter, referred to as "jacket image") 37 of a jacket photo of an album of an artist corresponding to the genre name indicated by the jacket icon 36 is arranged under the individual genre icon 36 as an indicant.

However, for example, in a case where the jacket image 37 of the album of the artist corresponding to the genre name exists in plurality in the jacket list image 35, the plurality of jacket images 37 is arranged to be accumulated while being slightly shifted.

Accordingly, the user can intuitively recognize the number of the albums for each genre in the genre list image 35.

In this way, the control section 20 displays the plurality of genre icons 36 and jacket images 37 as the genre list image 35 across the second liquid crystal display panel 15A to the first liquid crystal display panel 14A.

Accordingly, the control section 20 can present the plurality of genres which can be selected for reproduction of the music data by the genre list image 35, and can present how much (that is, the quantity of) music data for each genre is stored as the album.

Further, if the flick manipulation or the sliding manipulation is performed on the first manipulation surface or the second manipulation surface in a state where the genre list image 35 is displayed across the second liquid crystal display panel 15A to the first liquid crystal display panel 14A, the control section 20 scrolls the genre list image 35 as described above.

Thus, even in the case where the entire genre list image 35 is unable to be displayed across both the display surfaces of the second liquid crystal display panel 15A and the first liquid crystal display panel 14A, the control section 20 may appropriately scroll the genre list image 35 to be completely displayed.

Further, at this time, the control section 20 matches the display area information indicating the position of the display area of the jacket image 37 for each genre name as coordinates of the pixel positions with the genre information indicating the genre name and the jacket image 37 as information which can be selected by the instruction of the jacket image 37.

Further, the control section 20 stores the display area information for each jacket image 37 and the genre information corresponding to the display area information as selection genre detection information in the RAM 22.

If the genre list image 35 is scrolled to displace the display area of the jacket image 37, the control section 20 changes the display area information matched with the genre information into the display area information indicating the position of the display area after displacement as the coordinates of the pixel positions.

If the tap manipulation is performed on the first manipulation surface in a state where the genre list image 35 is not scrolled, the control section 20 detects the display area including the tap instruction position from the display areas of the jacket images 37, on the basis of the selection genre detection information.

Further, even if the tap manipulation is performed on the second manipulation surface in a state where the genre list image 35 is not scrolled, the control section 20 detects the display area including the tap instruction position from the display areas of the jacket images 37, on the basis of the selection genre detection information.

Further, the control section 20 detects the genre name and the jacket image 37 selected by the tap manipulation performed on the genre list image 35 at this time (that is, genre information matched with the display area including the tap instruction position).

In this way, the control section 20 can allow the user to select a desired genre from the plurality of genres for reproduction of the music data as the genre name and the jacket image 37 through the genre list image 35.

At this time, the control section 20 specifies the artist list corresponding to the selected genre name and also specifies the album list for each artist name (artist name included in the artist list) corresponding to the specified artist list.

Further, the control section 20 generates the image data on an artist list image for allowing the user to select a desired artist, on the basis of the specified artist list and album list and the jacket image data on the jacket image 37 selected together with the genre name.

Figure 9:
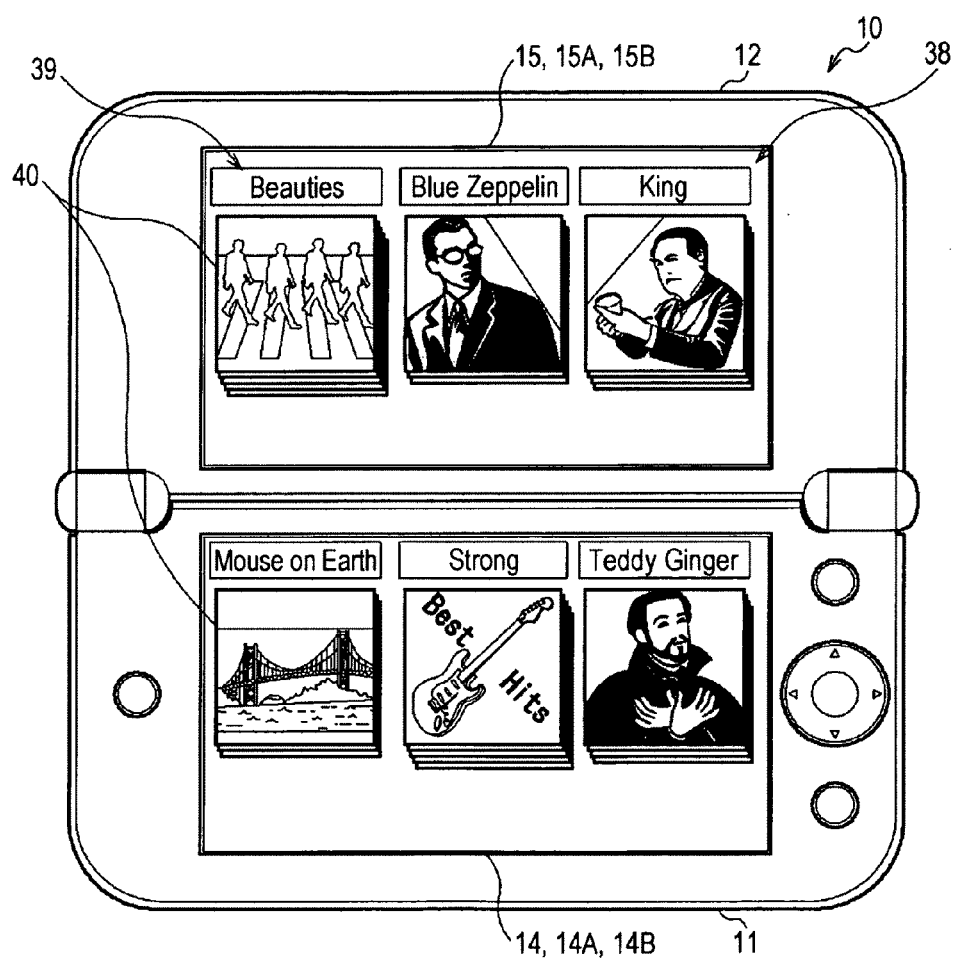
FIG. 9 is a diagram schematically illustrating a display of an artist list image according to a tap manipulation.

Further, as shown in FIG. 9, the control section 20 displays an artist list image 38 indicating classification in the genre selected by the user in the classification of the second layer for the plurality of pieces of music data, on the basis of the image data across the second liquid crystal display panel 15A to the first liquid crystal display panel 14A.

That is, the control section 20 displays the artist list image 38 indicating the classification (classification of the second layer) according to the artists of the plurality of pieces of music data in the genre selected by the user across the second liquid crystal display panel 15A to the first liquid crystal display panel 14A.

In this case, for example, a plurality of artist icons 39 having different artist names (artist names corresponding to the genre selected by the user) as indicants is arranged in the artist list image 38 in a matrix format.

Further, in the artist list image 38, a jacket image 40 of an album (of artist of the artist name) corresponding to the artist name indicated by the artist icon 39 is arranged under the individual icon 39 as an indicant.

That is, in the artist list image 38, the jacket images 40 for each artist are arranged in a matrix format, as if a pile of the jacket images 37 selected as the genre on the genre list image 35 is dividedly arranged to be classified according to each artist.

However, in a case where the plurality of jacket images 40 of the album corresponding to the artist name exists in the artist list image 38, the plurality of jacket images 40 is arranged to be accumulated while being slightly shifted.

Accordingly, the user can intuitively recognize the number of the albums for each artist in the artist list image 38.

In this way, the control section 20 displays the plurality of artist icons 39 and the jacket images 40 as the artist list image 38 across the second liquid crystal display panel 15A to the first liquid crystal display panel 14A.

Thus, the control section 20 can present the plurality of artists which can be selected for reproduction of the music data by the artist list image 38, and can present how much music data for each artist is stored as the album.

Further, if the flick manipulation or the sliding manipulation is performed on the first manipulation surface or the second manipulation surface in a state where the artist list image 38 is displayed across the second liquid crystal display panel 15A to the first liquid crystal display panel 14A, the control section 20 scrolls the artist list image 38 as described above.

Accordingly, even in the case where the entire artist list image 38 is unable to be displayed across the both display surfaces of the second liquid crystal display panel 15A and the first liquid crystal display panel 14A, the control section 20 may appropriately scroll the artist list image 38 to be completely displayed.

Further, the control section 20 matches the display area information indicating the position of the display area of the jacket image 40 for each artist name as coordinates of the pixel positions with the artist information indicating the artist name and the jacket image 40 as information which can be selected by the instruction of the jacket image 40.

Further, the control section 20 stores the display area information for each jacket image 40 and the artist information corresponding to the display area information as selection artist detection information in the RAM 22.

If the artist list image 38 is scrolled to displace the display area of the jacket image 40, the control section changes the display area information matched with the artist information into the display area information indicating the position of the display area after displacement as the coordinates of the pixel positions.

If the tap manipulation is performed on the first manipulation surface in a state where the artist list image 38 is not scrolled, the control section 20 detects the display area including the tap instruction position from the display areas of the jacket images 40, on the basis of the selection artist detection information.

Further, even if the tap manipulation is performed on the second manipulation surface in a state where the artist list image 38 is not scrolled, the control section 20 detects the display area including the tap instruction position from the display areas of the jacket images 40, on the basis of the selection artist detection information.

Further, the control section 20 detects the artist name and the jacket image 40 selected by the tap manipulation performed on the artist list image 38 at this time (that is, artist information matched with the display area including the tap instruction position).

In this way, the control section 20 can allow the user to select a desired artist from the plurality of artists for reproduction of the music data as the artist name and the jacket image 40 through the artist list image 38.

At this time, the control section 20 specifies the album list corresponding to the selected artist name. Further, the control section 20 generates the image data on an album list image for allowing the user to select a desired album, on the basis of the specified album list and the jacket image data on the jacket image 40 selected together with the artist name.

Figure 10:
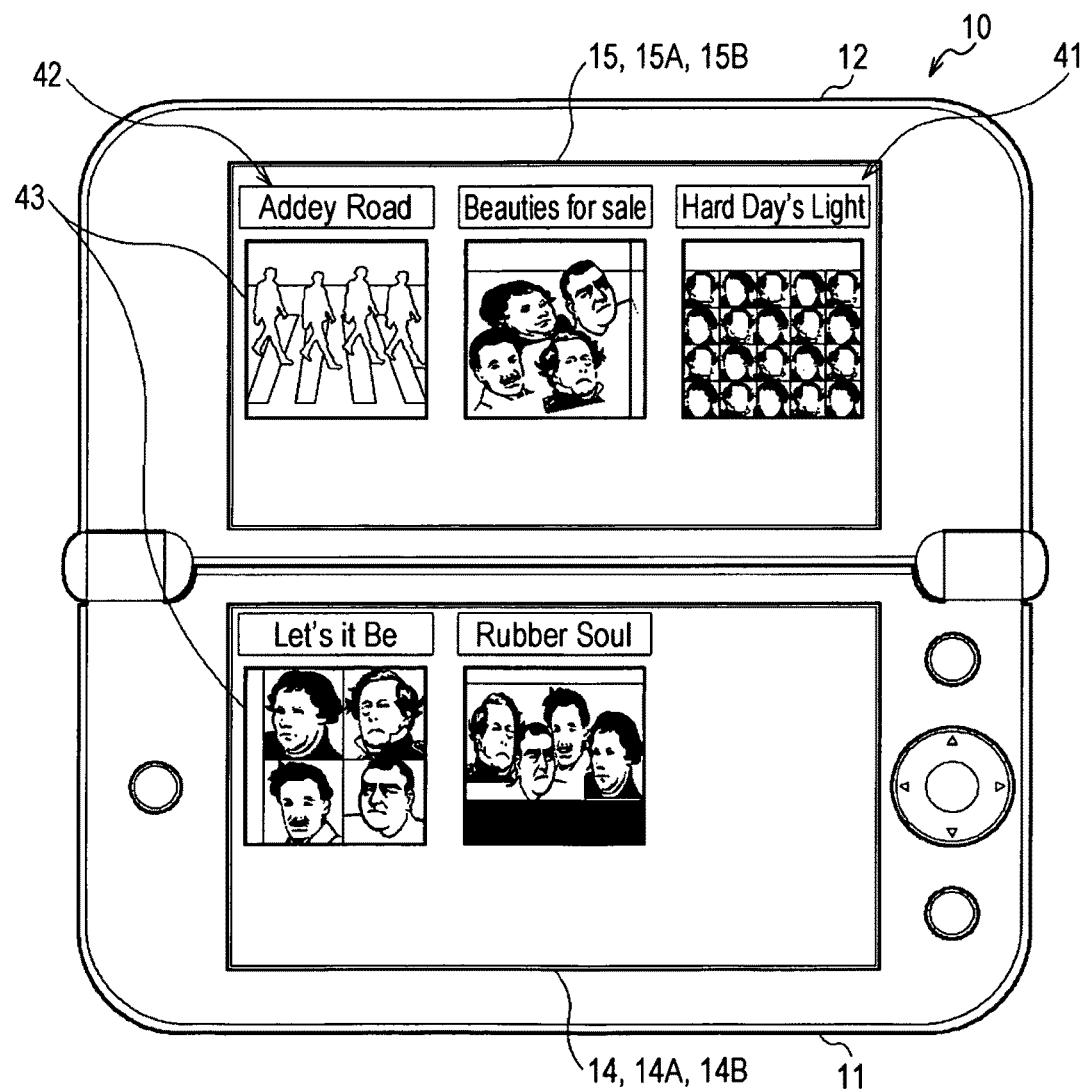
FIG. 10 is a diagram schematically illustrating a display of an album list image according to a tap manipulation.

Accordingly, as shown in FIG. 10, the control section 20 displays an album list image 41 indicating classification in the artist selected by the user in the classification of the third layer for the plurality of pieces of music data, on the basis of the image data across the second liquid crystal display panel 15A to the first liquid crystal display panel 14A.

That is, the control section 20 displays the album list image 41 indicating the classification (classification of the third layer) according to the album of the plurality of pieces of music data in the artist selected by the user across the second liquid crystal display panel 15A to the first liquid crystal display panel 14A.

In this case, for example, a plurality of album icons 42 having different album titles (album titles corresponding to the artist name selected by the user) as indicants is arranged in the album list image 41 in a matrix format.

Further, in the album list image 41, a jacket image (of album of the album title) corresponding to the album title indicated by the album icon 42 is arranged under the individual album icon 42 as an indicant.

That is, in the album list image 41, the jacket images 43 for each album are arranged in a matrix format, as if a pile of the jacket image 40 selected as the artist on the artist list image 38 is dividedly arranged to be classified according to each album.

In this way, the control section 20 displays the plurality of album icons 42 and the jacket images 43 as the album list image 41 across the second liquid crystal display panel 15A to the first liquid crystal display panel 14A.

Thus, the control section 20 can present the plurality of albums which can be selected for reproduction of the music data by the album list image 41.

Further, if the flick manipulation or the sliding manipulation is performed on the first manipulation surface or the second manipulation surface in a state where the album list image 41 is displayed across the second liquid crystal display panel 15A to the first liquid crystal display panel 14A, the control section 20 scrolls the album list image 41 as described above.

Accordingly, even in a case where the entire album list image 41 is not displayed across both display surfaces of the second liquid crystal display panel 15A and the first liquid crystal display panel 14A, the control section 20 may appropriately scroll the album list image 41 to be completely displayed.

Further, the control section 20 matches the display area information indicating the position of the display area of the jacket image 43 for each album title as coordinates of the pixel positions with the album information indicating the album title and the jacket image 43 as information which can be selected by the instruction of the jacket image 43.

Further, the control section 20 stores the display area information for each jacket image 43 and the album information corresponding to the display area information as selection album detection information in the RAM 22.

If the album list image 41 is scrolled to displace the display area of the jacket image 43, the control section 20 changes the display area information matched with the album information into the display area information indicating the position of the display area after displacement as the coordinates of the pixel positions.

Further, if the tap manipulation is performed on the first manipulation surface in a state where the album list image 41 is not scrolled, the control section 20 detects the display area including the tap instruction position from the display areas of the jacket images 43, on the basis of the selection album detection information.

Further, even if the tap manipulation is performed on the second manipulation surface in a state where the album list image 41 is not scrolled, the control section 20 detects the display area including the tap instruction position from the display areas of the jacket images 43, on the basis of the selection album detection information.

Thus, the control section 20 detects the album title and the jacket image 43 selected by the tap manipulation on the album list image 41 at this time (that is, album information matched with the display area including the tap instruction position).

In this way, the control section 20 can allow the user to select a desired album from the plurality of albums for reproduction of the music data as the album title through the album list image 41.

Further, at this time, the control section 20 specifies the track title list corresponding to the selected album title. Further, the control section 20 generates the image data on a track list image for allowing the user to select a desired track, on the basis of the specified track title list.

Figure 11:
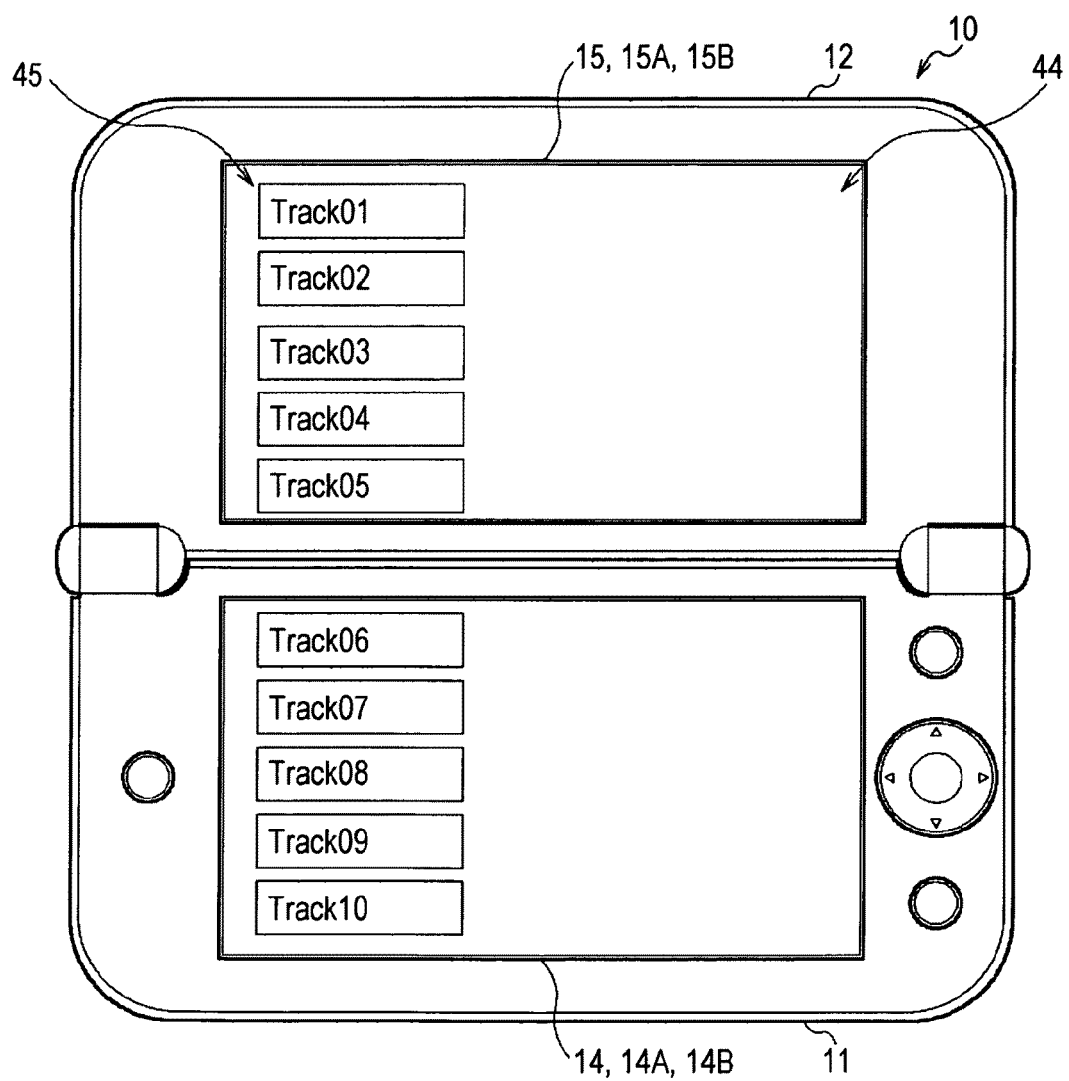
FIG. 11 is a diagram schematically illustrating a display of a track list image according to a tap manipulation.

Accordingly, as shown in FIG. 11, the control section 20 displays a track list image 44 indicating classification in the album selected by the user in the classification of the fourth layer for the plurality of pieces of music data, on the basis of the image data across the second liquid crystal display panel 15A to the first liquid crystal display panel 14A.

That is, the control section 20 displays the track list image 44 indicating the classification (classification of the fourth layer) according to the track title of the plurality of pieces of music data in the album selected by the user across the second liquid crystal display panel 15A to the first liquid crystal display panel 14A.

In this case, for example, in the track list image 44, a plurality of track icons 45 having different track titles is arranged in one column according to the reproduction order (reproduction order predetermined in the album) of the corresponding music data.

In this way, the control section 20 displays the plurality of track icons 45 as the track list image 44 across the second liquid crystal display panel 15A to the first liquid crystal display panel 14A.

Thus, the control section 20 can present the plurality of track titles (that is, a plurality of track titles of music data recorded in the album selected by the user) which can be selected for reproduction of the music data by the track list image 44.

Further, if the flick manipulation or the sliding manipulation is performed on the first manipulation surface or the second manipulation surface in a state where the track list image 44 is displayed across the second liquid crystal display panel 15A to the first liquid crystal display panel 14A, the control section 20 scrolls the track list image 44 as described above.

Accordingly, even in the case where the entire track list image 44 is not displayed across both display surfaces of the second liquid crystal display panel 15A and the first liquid crystal display panel 14A, the control section 20 may appropriately scroll the track list image 44 to be completely displayed.

At this time, the control section 20 matches the arrangement area information indicating the position of the arrangement area for each track icon 45 as coordinates of the pixel positions with the track information indicating the track title as information which can be selected by the instruction of the track icon 45.

Further, the control section 20 stores the arrangement area information for each track icon 45 and the track information corresponding to the arrangement area information as selection track detection information in the RAM 22.

If the track list image 44 is scrolled to displace the arrangement area of the track icon 45, the control section 20 changes the arrangement area information matched with the track information into the arrangement area information indicating the position of the arrangement area after displacement as the coordinates of the pixel positions.

Further, if the tap manipulation is performed on the first manipulation surface in a state where the track list image 44 is not scrolled, the control section 20 detects the arrangement area including the tap instruction position from the arrangement areas of the track icons 45, on the basis of the selection track detection information.

Further, even if the tap manipulation is performed on the second manipulation surface in a state where the track list image 44 is not scrolled, the control section 20 detects the arrangement area including the tap instruction position from the arrangement areas of the track icons 45, on the basis of the selection track detection information.

Further, the control section 20 detects the track title (that is, track information corresponding to the arrangement area including the tap instruction position) selected by the tap manipulation on the track list image 44.

Thus, the control section 20 can select a desired track from the plurality of tracks for reproduction of the music data as the track title through the track list image 44.

On the other hand, the genre list image 35 indicates the classification (classification of the first layer) according to the genres of the plurality of pieces of music data as described above.

Further, the jacket images 37 for each genre in the genre list image 35 are the indicants (selectable for display) indicating the artist list image 38 for presenting the classification (classification of the second layer) according to the artists of the plurality of pieces of the music data which belongs to the genre.

Further, the jacket images 40 for each artist in the artist list image 38 are the indicants (selectable for display) indicating the album list image 41 for presenting the classification (classification of the third layer) according to the albums of the plurality of pieces of the music data of the artist.

Further, the jacket images 40 for each album in the album list image 41 are the indicants (selectable for display) indicating the track list image 44 for presenting the classification (classification of the fourth layer) according to the track titles of the plurality of pieces of the music data of the album.

Thus, the control section 20 sequentially generates the genre list image 35, the artist list image 38, the album list image 41 and the track list image 44 of the hierarchical structure for display, so that the hierarchical classification of the plurality of pieces of music data is traced from higher layer to the lower layer, according to the tap manipulation of the user.

That is, at this time, the control section 20 sequentially generates the artist list image 38, the album list image 41 and the track list image 44 which are sequentially one lower layer from the genre list image 35 of the highest layer, to be displayed, according to the tap manipulation of the user.

Accordingly, the control section 20 can sequentially trace the hierarchical classification from the first layer which is the highest layer to the fourth layer which is the lowest layer for the plurality of pieces of music data, through the genre list image 35, the artist list image 38, the album list image 41 and the track list image 44.

Thus, the control section 20 sequentially narrows the plurality of pieces of music data, to thereby finally select the music data to be reproduced.

Further, if the track title is selected by the tap manipulation in this way, the control section 20 recognizes that a reproduction command of the music data of the track title is input.

In this case, the control section 20 reads out the music data of the selected track title from the non-volatile memory 21 and then transmits it to a reproducing section 24.

The reproducing section 24 performs a reproduction process such as a decoding process, a digital-analog conversion process, an amplification process or the like for the music data under the control of the control section 20, to thereby generate a music signal and output it through a headphone terminal (not shown).

Thus, the control section 20 can allow the user to listen to the track (music) through a headphone connected to the headphone terminal.

If the reproduction process for the music data of the track title selected by the user is terminated, for example, the control section 20 sequentially reads out the music data from the non-volatile memory 21 according to the track title list corresponding to the artist, album or the like selected by the user at that time.

Further, the control section 20 transmits the music data to the reproducing section 24. Thus, the control section can allow the reproducing section 24 to sequentially perform the reproduction process for the music data, and can allow the user to continuously listen to the plurality of tracks through the headphone.

Figure 12:
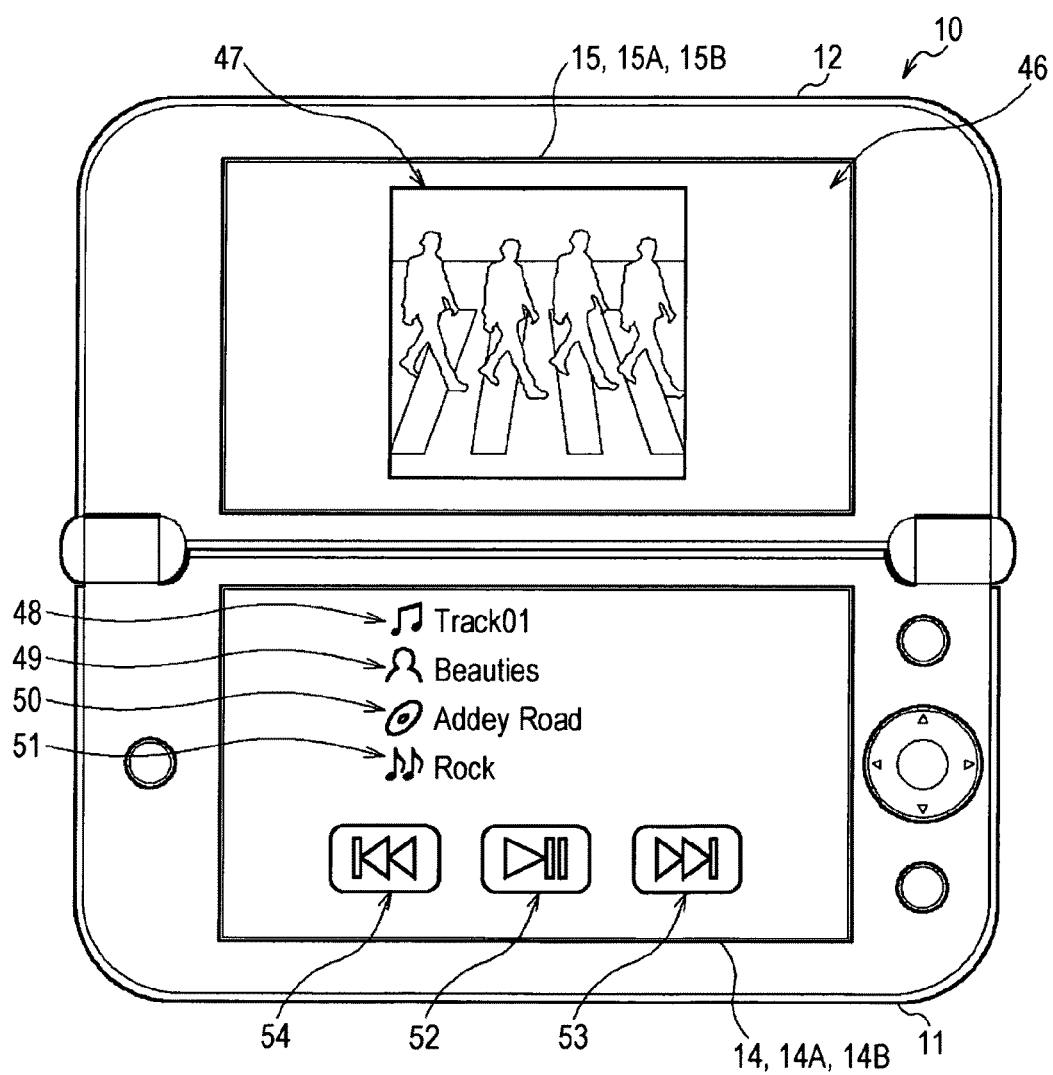
FIG. 12 is a diagram schematically illustrating a display of a reproduced image.

On the other hand, as shown in FIG. 12, if the reproduction of the music data is started, the control section 20 displays a reproduced image 46 indicating the music data to be reproduced, across the second liquid crystal display panel 15A to the first liquid crystal display panel 14A.

At this time, the control section 20 enlarges and displays a jacket image 47 (of the album in which music to be reproduced is recorded) corresponding to the music data to be reproduced, as a part of the reproduced image 46, on the second liquid crystal display panel 15A.

Further, the control section 20 displays a track title 48, an artist name 49, an album title 50 and a genre name 51 corresponding to the music data to be reproduced, as a part of the reproduced image 46, on the first liquid crystal display panel 14A.

That is, the reproduced image 46 is used for presenting a variety of information relating to one piece of music data to be reproduced. Accordingly, the reproduced image 46 may be an image which is one layer lower than the track list image 44 indicating the plurality of track titles in the album as the track icon 45.

Further, the track icon 45 in the track list image also serves as an indicant indicating (selectable for display) the reproduced image 46 for presenting a variety of information relating to the music data of the track title indicated by the track icon 45, in addition to a reproduction instruction of the corresponding music data.

In a case where the music data to be reproduced is switched, the control section 20 appropriately changes the jacket image 47, the track title 48, the artist name 49, the album title 50 and the genre name 51 in the reproduced image 46.

Accordingly, the control section 20 can present information relating to the music data (that is, track) to be reproduced to the user through the reproduced image 46, while the music data is being reproduced or when its reproduction is temporarily stopped.

Further, the control section 20 displays a reproduction icon 52 indicating a reproduction start command and a reproduction stop command, a track fast-forward icon 53 indicating a track fast-forward command and a track fast-rewind icon 54 indicating a track fast-rewind command, as a part of the reproduced image 46, in the first liquid crystal display panel 14A.

Accordingly, at this time, if the reproduction icon 52, the track fast-forward icon 53 and the track fast-rewind icon 54 are instructed by the tap manipulation, the control section 20 can stop or re-start reproduction of the music data and can switch the music data to be reproduced.

On the other hand, if the genre list image 35 is displayed, the control section 20 matches the arrangement area information indicating the position of the arrangement area of the genre icon 36 for each genre name as the coordinates of the pixel positions with the reproduction command for sequentially reproducing the plurality of pieces of music data which belongs to the genre, as selectable information.

If the genre list image 35 is scrolled to displace the arrangement area of the genre icon 36, the control section 20 changes the arrangement area information matched with the reproduction command into the arrangement area information indicating the position of the arrangement area after displacement as the coordinates of the pixel positions.

Further, if the genre icon 36 is instructed by the tap manipulation on the genre list image 35, the control section 20 detects the reproduction command indicated by the instructed genre icon 36.

Accordingly, the control section 20 sequentially reads out the plurality of pieces of music data which belongs to the genre indicated by the instructed genre icon 36 from the non-volatile memory 21, according to the detected reproduction command, and performs the reproduction process by the reproducing section 24.

Further, at this time, the control section 20 displays the reproduced image having the same configuration as described above, across the second liquid crystal display panel 15A to the first liquid crystal display panel 14A.

Accordingly, the genre icon 36 in the genre list image 35 also serves as an indicant indicating (selectable for display) the reproduced image for presenting a variety of information relating to the music data to be displayed, in addition to the reproduction instruction of the plurality of pieces of music data corresponding thereto.

In this way, the control section 20 can allow the user to select the music data to be reproduced in the genre unit.

Further, if the artist list image 38 is displayed, the control section 20 matches the arrangement area information indicating the position of the arrangement area of the artist icon 39 for each artist name as the coordinates of the pixel positions with the reproduction command for sequentially reproducing the plurality of pieces of music data of the artist.

If the artist list image 38 is scrolled to displace the arrangement area of the artist icon 39, the control section 20 changes the arrangement area information matched with the reproduction command into the arrangement area information indicating the position of the arrangement area after displacement as the coordinates of the pixel positions.

Further, if the artist icon 39 is instructed by the tap manipulation on the artist list image 38, the control section 20 detects the reproduction command indicated by the instructed artist icon 39.

Accordingly, the control section 20 sequentially reads out the plurality of pieces of music data of the artist indicated by the instructed artist icon 39 from the non-volatile memory 21, according to the detected reproduction command, and performs the reproduction process by the reproducing section 24.

Further, at this time, the control section 20 displays the reproduced image having the same configuration as described above, across the second liquid crystal display panel 15A to the first liquid crystal display panel 14A.

Accordingly, the artist icon 39 in the artist list image 38 also serves as an indicant indicating (selectable for display) the reproduced image for presenting a variety of information relating to the music data to be displayed, in addition to the reproduction instruction of the plurality of pieces of music data corresponding thereto.

In this way, the control section 20 can allow the user to select the music data to be reproduced in the artist unit.

Further, if the album list image 41 is displayed, the control section 20 matches the arrangement area information indicating the position of the arrangement area of the album icon 42 for each album title as the coordinates of the pixel positions with a reproduction command for sequentially reproducing the plurality of pieces of music data recorded in the album.

If the album list image 41 is scrolled to displace the arrangement area of the album icon 42, the control section 20 changes the arrangement area information matched with the reproduction command into the arrangement area information indicating the position of the arrangement area after displacement as the coordinates of the pixel positions.

Further, if the album icon 42 is instructed by the tap manipulation on the album list image 41, the control section 20 detects the reproduction command indicated by the instructed album icon 42.

Accordingly, the control section 20 sequentially reads out the plurality of pieces of music data of the album indicated by the instructed album icon 42 from the non-volatile memory 21, according to the detected reproduction command, and performs the reproduction process by the reproducing section 24.

Further, at this time, the control section 20 displays the reproduced image having the same configuration as described above, across the second liquid crystal display panel 15A to the first liquid crystal display panel 14A.

Accordingly, the album icon 42 in the album list image 41 serves as an indicant indicating (selectable for display) the reproduced image for presenting a variety of information relating to the music data to be reproduced, in addition to the reproduction instruction of the plurality of pieces of music data corresponding thereto.

In this way, the control section 20 can allow the user to select the music data to be reproduced in the album unit.

1-2-3. Display Control Process According to Proximity Manipulation and Tap Manipulation However, the proximity manipulation is a manipulation which is performed for instructing a process of displaying as a list a plurality of indicants indicating a launch image as selectable information, across the second liquid crystal display panel 15A to the first liquid crystal display panel 14A, when a display of at least one launch image is held in the standby mode.

The proximity manipulation may be performed in any one of a state where displays of the plurality of launch images are all held in the standby mode and a state where any one of the plurality of launch images is displayed to be viewed.

Further, for example, the proximity manipulation is also a manipulation which is performed for instructing a process of switching the display from the state where the reproduced image 46 is displayed across the second liquid crystal display panel 15A to the first liquid crystal display panel 14A into the track list image 44 which is one layer upper than the reproduced image 46.

Further, for example, the proximity manipulation is also a manipulation which is performed for instructing a process of hierarchically displaying as a list the plurality of jacket images in correspondence with the hierarchical classification of the plurality of pieces of music data, across the second liquid crystal display panel 15A to the first liquid crystal display panel 14A.

That is, the proximity manipulation is also a manipulation which is performed for instructing a process of displaying the genre list image 35, the artist list image 38 and the album list image 41 as lists of the plurality of jacket images, respectively, across the second liquid crystal display panel 15A to the first liquid crystal display panel 14A.

Further, the proximity manipulation is also a manipulation which is performed for instructing a process of changing the display state of the image displayed across the second liquid crystal display panel 15A to the first liquid crystal display panel 14A.

Accordingly, when the area detection process is performed, if the panel output signal is obtained from the first touch panel 14B to detect one or plural proximity areas and the center position, the control section 20 detects a process instructed by the proximity manipulation performed for the first manipulation surface on the basis of the detection result.

Further, when the area detection process is performed, even if the panel output signal is obtained from the second touch panel 15B to detect one or plural proximity areas and the center position, the control section 20 detects a process instructed by the proximity manipulation performed for the second manipulation surface on the basis of the detection result.

Here, the control section 20 does not detect the proximity area only when one or plural fingers move close to the first manipulation surface or the second manipulation surface, for the proximity manipulation, but also detects the proximity area immediately before the detection of the touch area even when one or plural fingers move close thereto for the touch manipulation.

For this reason, when one or plural fingers move close to the first manipulation surface or the second manipulation surface for the touch manipulation in this way, even though the proximity area is detected immediately before the detection of the touch area, the control section 20 should not mistakenly detect the proximity area as the proximity area of the proximity manipulation.

Further, if the plurality of fingers is separated from each other when the proximity manipulation is performed by the plurality of fingers on the first manipulation surface or the second manipulation surface, a time difference may occur when each finger moves close to the first manipulation surface and reaches within a proximity detection distance range according to a bending degree of each finger.

That is, if the plurality of fingers is separated from each other when the proximity manipulation is performed, when the plurality of fingers moves close to the first manipulation surface or the second manipulation surface (proximity manipulation is started), the control section 20 may start to detect the plurality of proximity areas to be slightly shifted in terms of time using the plurality of fingers.

For this reason, even though the control section 20 starts to detect the plurality of proximity areas to be slightly shifted in terms of time using the plurality of fingers when the proximity manipulation is started in this way, the control section 20 should not mistakenly detect the plurality of proximity areas as proximity areas of different proximity manipulations.

Accordingly, in the area detection process, for example, if the panel output signal is obtained from the first touch panel 14B to detect one or plural proximity areas and the center position, the control section 20 firstly determines whether the proximity area is detected in the previous (one time before) area detection process.

As a result, if the proximity area is not detected at all in the previous area detection process, the control section 20 determines that one or plural proximity areas detected in the current area detection process is a proximity area at the time when the finger starts to move close to the first manipulation surface, respectively.

In this respect, if one or plural proximity areas are detected in the previous area detection process, the control section 20 calculates the inter-center distance between the center position detected in the previous area detection process and the center position detected in the current area detection process in a round-robin manner.

Further, the control section 20 compares the calculated one or plural inter-center distances with the maximum movement distance, respectively. Further, the control section 20 determines whether the center position within the maximum movement distance from the center position detected in the previous area detection process is detected in the current area detection process, on the basis of the comparison result.

As a result, if the center position within the maximum movement distance from the previous center position is detected in the current area detection process, the control section 20 determines that the previous and current proximity areas corresponding to the previous and current center positions are the proximity areas of the same finger.

That is, if the center position within the maximum movement distance from the previous center position is detected in the current area detection process, the control section 20 determines that the proximity area corresponding to the detected center position is the proximity area of the finger which is close to the first manipulation surface from the time of the previous area detection process.

Here, if one or plural center positions which are at a distance beyond the maximum movement distance from any previous center position are additionally detected in the current area detection process, the control section 20 determines that the proximity areas corresponding to the detected center positions are also the proximity areas at the start time of the proximity manipulation.

That is, when the plurality of fingers moves close to the first manipulation surface as described above, if the control section 20 starts to detect the plurality of proximity areas to be slightly shifted in terms of time using the plurality of fingers, the control section 20 determines that these proximity areas which start to detect to be slightly shifted in terms of time are the proximity areas at a proximity start time.

Further, if the proximity area of the center area in which the distance from the previous center position is equal to or shorter than the maximum movement distance is not detected in the current area detection process, the control section 20 determines that the finger in proximity to the proximity area corresponding to the previous center position deviates from the proximity detection distance range.

That is, if the center position having an inter-center distance from the previous center position equal to or shorter than the maximum movement distance is not detected in the current area detection process, the control section 20 determines that the proximity area corresponding to the previous center position is a proximity area at the time when the proximity of the finger to the first manipulation surface is terminated.

Further, if the proximity area is not detected at all even though the area detection process is performed, the control section 20 determines whether the proximity area is detected in the previous (one time before) area detection process.

As a result, even though the proximity area is detected in the previous area detection process, if the proximity area is not detected at all in the current area detection process, the control section 20 determines that the previous proximity area is a proximity area immediately before the finger deviates from a proximity detection distance range.

That is, if the proximity area is detected in the previous area detection process, the control section 20 determines that the previous proximity area is a proximity area at the time when the proximity of the finger to the first manipulation surface is terminated.

In this way, when the proximity manipulation is started by sequentially performing the area detection process, the control section 20 detects the proximity area whenever one or plural fingers close to the first manipulation surface reaches within the proximity detection distance range.

Further, while one or plural fingers are moving close to the first manipulation surface within the proximity detection distance range (while the proximity manipulation is being performed for the first manipulation surface), the control section 20 performs the detection to sequentially trace one or plural proximity areas through one or plural fingers, by sequentially performing the area detection process.

That is, if the area detection process is performed to detect one or plural proximity areas when the proximity of one or plural fingers is started, the control section 20 traces one or plural proximity areas using one or plural fingers until the proximity of each finger is terminated by sequentially performing the area detection process.

With such a configuration, if one proximity area is detected when the proximity is started in a state where the display of at least one launch image is held in the standby mode and the proximity area and the touch area are not detected at all, the control section 20 starts measurement of the time when the finger moves close to the first manipulation surface, by the timer. Hereinafter, the time when the finger moves close to the first manipulation surface (or the second manipulation surface) is referred to as "proximity time".

Further, even though a plurality of proximity areas is simultaneously detected when the proximity is started in a state where the display of at least one launch image is held in the standby mode and the proximity area and the touch area are not detected at all, the control section 20 starts measurement of the proximity time by the timer.

Further, the control section 20 continues to measure the proximity time until it reaches a predetermined time (hereinafter, referred to as "proximity manipulation detection time") such as several seconds (sec), to the maximum, which is predetermined for detecting whether the proximity manipulation is performed.

Further, if one or plural proximity areas are detected when the proximity is started in this way, the control section 20 also starts detection of the movement trace for each finger using the center position of the proximity area as a starting point of each movement trace.

Furthermore, if one or plural fingers newly move close to the first manipulation surface to additionally detect one or plural proximity areas when the proximity is started until the proximity time reaches the proximity manipulation detection time, the control section 20 also uses the center position of one or plural proximity areas as the starting point of each movement trace.

Further, even in the case where one or plural proximity areas of one or plural fingers are additionally detected, similarly, the control section 20 starts detection of the movement trace of each finger.

Whenever the control section 20 detects the proximity area and the center position by performing the area detection process after one or plural proximity areas are detected when the proximity is started, the control section 20 sequentially traces the detected center position from the starting point (center position), to thereby detect the movement trace of each finger.

Further, even though one or plural fingers are disengaged from the first manipulation surface before the proximity time reaches the proximity manipulation detection time and the proximity area of the finger is not detected (even though the number of the detected proximity areas has decreased), if one or more proximity areas are still detected, the control section 20 continues to measure the proximity time.

Here, if all the proximity areas are unable to be detected before the proximity time reaches the proximity manipulation detection time (that is, if all fingers which are close to the first manipulation surface are deviated from the proximity detection distance range), the control section 20 terminates the measurement of the proximity time.

Further, if one or plural fingers come in touch with the first manipulation surface before the proximity time reaches the proximity manipulation detection time to detect one or plural touch areas, the control section 20 terminates the measurement of the proximity time, regardless of the presence or absence of the detection of the proximity area at that time.

In this way, if the measurement of the proximity time is started, while at least one proximity area is being detected to be sequentially traced in a state where the touch area is not detected, the control section 20 continues to measure the proximity time.

That is, if the measurement of the proximity time is started, other fingers additionally move close to the first manipulation surface thereafter, and even though the finger deviates from the proximity detection distance range, while at least one finger moves close thereto in a state where the finger is not in touch with the first manipulation surface, the control section 20 continues to measure the proximity time.

Further, if the measurement of the proximity time is terminated before the proximity time reaches the proximity manipulation detection time, the control section 20 determines that the proximity manipulation is not performed for the first manipulation surface at this time.

In this respect, if the measured proximity time reaches the proximity manipulation detection time, the control section 20 determines whether all movement traces which are continuously detected thus far falls within a range of the circle of a predetermined radius centering on the corresponding starting point (center position), for example.

The range of the circle centering on the starting point is used for detecting whether the proximity manipulation is performed. Hereinafter, the range of the circle is referred to as "proximity manipulation detection range". Further, the radius of the proximity manipulation detection range is determined in advance as a predetermined length equal to or shorter than 1 mm, for example.

As a result, if all the movement traces detected thus far extends outside the proximity manipulation detection range from the corresponding starting point when the proximity time reaches the proximity manipulation detection time, the control section 20 determines that the proximity manipulation is not performed for the first manipulation surface.

That is, even though the finger is not in touch with the first manipulation surface for the proximity manipulation detection time in a state where displays of the plurality of launch images are held in the standby mode, if one or plural fingers are not significantly displaced, the control section 20 determines that the finger mistakenly moves close to the first manipulation surface, that is, the proximity manipulation is not performed.

Figure 13:
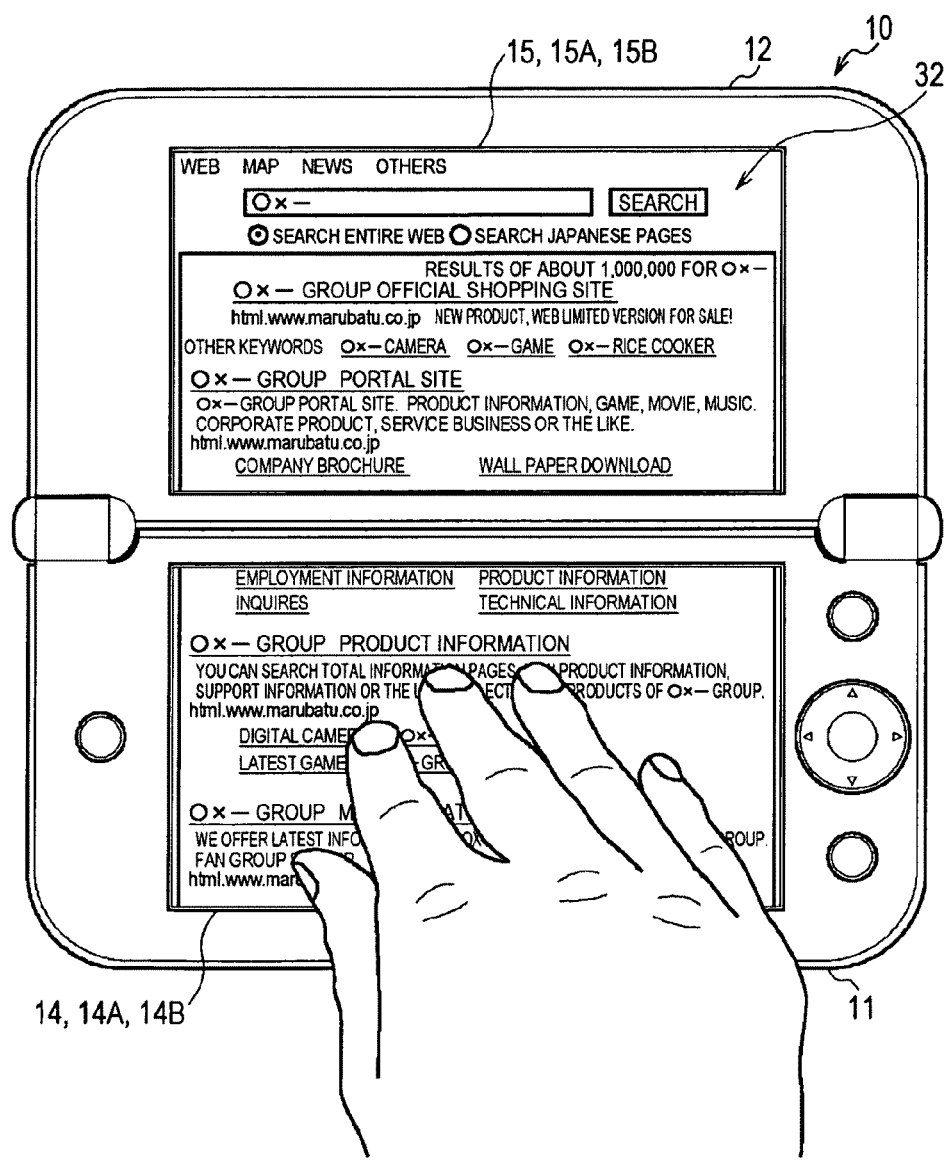
FIG. 13 is a diagram schematically illustrating a proximity manipulation performed by a plurality of fingers when a display of a plurality of launch images is held in a standby state.
Figure 14:
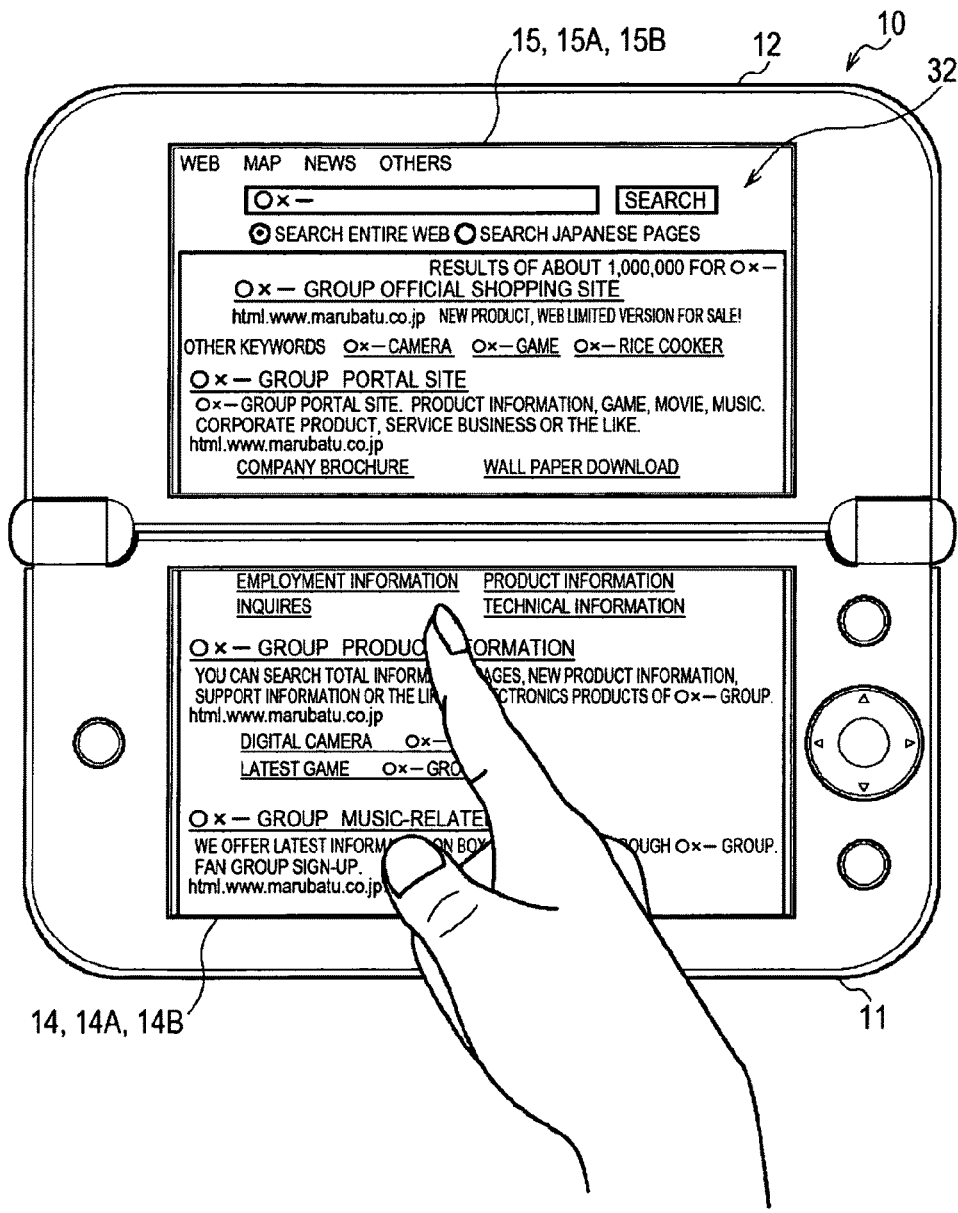
FIG. 14 is a diagram schematically illustrating a proximity manipulation performed by a single finger when a display of a plurality of launch images is held in a standby state.

In this respect, as shown in FIGS. 13 and 14, if at least one movement trace falls within the corresponding proximity manipulation detection range when the proximity time reaches the proximity manipulation detection time, the control section 20 determines that the proximity manipulation is performed for the first manipulation surface.

That is, in a state where the display of the plurality of launch images are held in the standby mode, if it is detected that the finger is not in touch with the first manipulation surface at all for the proximity manipulation detection time and one or plural fingers are barely displaced to be close to the first manipulation surface, the control section 20 determines that the proximity manipulation is performed.

Thus, the control section 20 can obviously distinguish the proximity manipulation from the touch manipulation such as a tap manipulation or sliding manipulation and can detect that the proximity manipulation is performed for the first manipulation surface.

Further, if it is detected that the proximity manipulation is performed in this way, the control section 20 determines that the proximity areas detected at the time of detection (hereinafter, the time when it is detected that the proximity manipulation is performed is referred to as "proximity manipulation detection time") are all based on the current proximity manipulation.

Thus, even though the plurality of proximity areas starts to be detected through the plurality of fingers to be slightly shifted in terms of time until the proximity time reaches the proximity manipulation detection time, the control section 20 can detect the plurality of proximity areas as a proximity area by means of one proximity manipulation at the proximity manipulation detection time.

If it is detected that the proximity manipulation is performed for the first manipulation surface in this way, the control section 20 reduces the plurality of launch images to be smaller than the original display size, and appropriately processes at least the upper edges of the images to be left.

Thus, the control section 20 generates a plurality of images (hereinafter, referred to as "thumbnail") having reduced size and shape.

In this case, each thumbnail has the same display contents (characters or figures in the image and positional relationship thereof) as the original launch image.

Accordingly, each thumbnail is an indicant capable of being used for displaying the original launch image before reduction and processing as selectable information, and for selecting a desired launch image from the plurality of launch images.

The control section 20 performs only the reduction process, for example, for launch images capable of displaying the entire image using only one of the first liquid crystal display panel 14A and the second liquid crystal display panel 15A, to thereby generate the thumbnail indicating the launch image.

Further, the control section 20 performs, for example, the reduction process and a process of leaving the upper edge of the image, for the launch image for displaying all or part of the image across the second liquid crystal display panel 15A to the first liquid crystal display panel 14A, to thereby generate a thumbnail indicating the launch image.

Further, if a plurality of thumbnails having such a size and shape is generated in this way, the control section generates image data on a thumbnail list image for displaying the plurality of thumbnails as a list.

Figure 15:
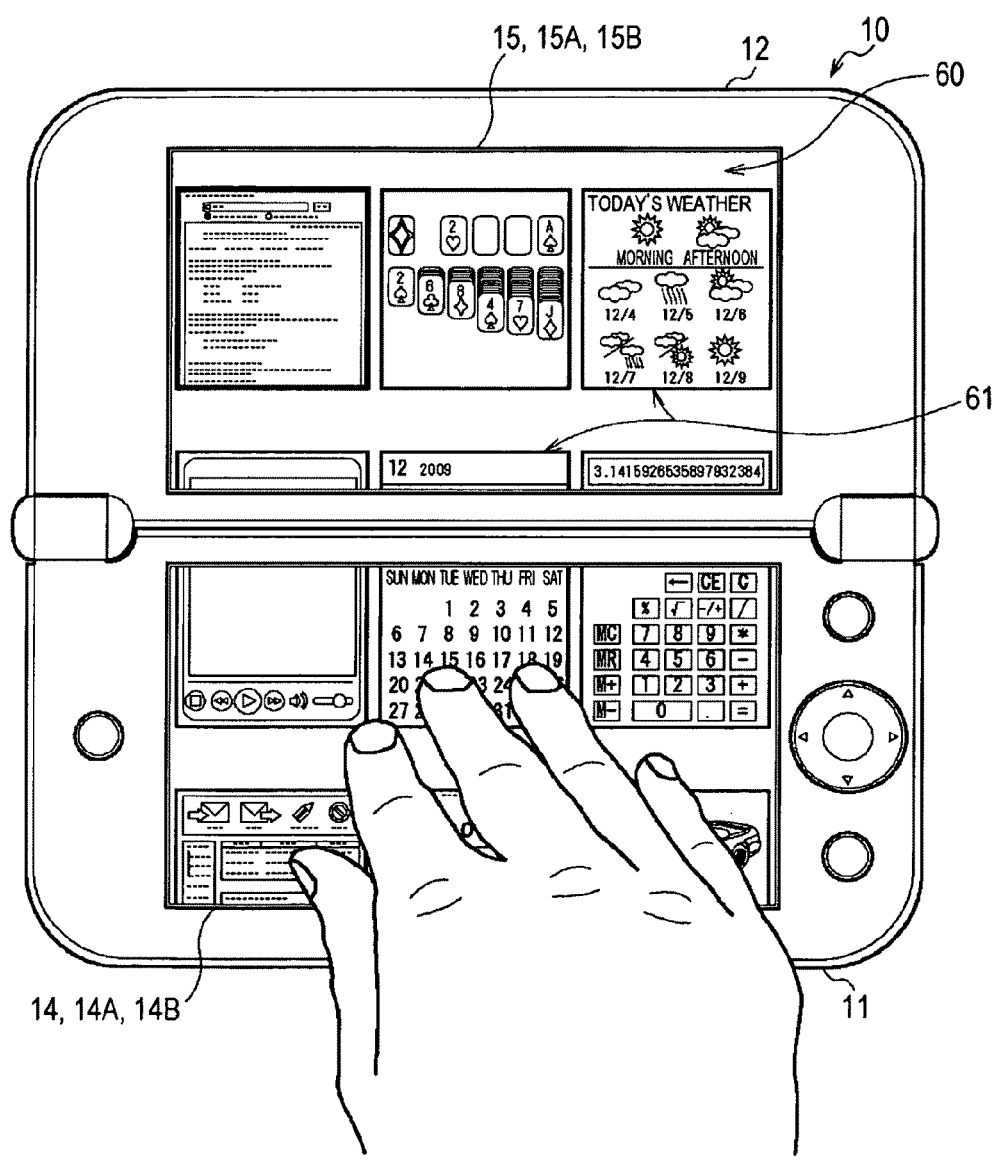
FIG. 15 is a diagram schematically illustrating a display of a thumbnail list image according to a proximity manipulation by means of a plurality of fingers.
Figure 16:
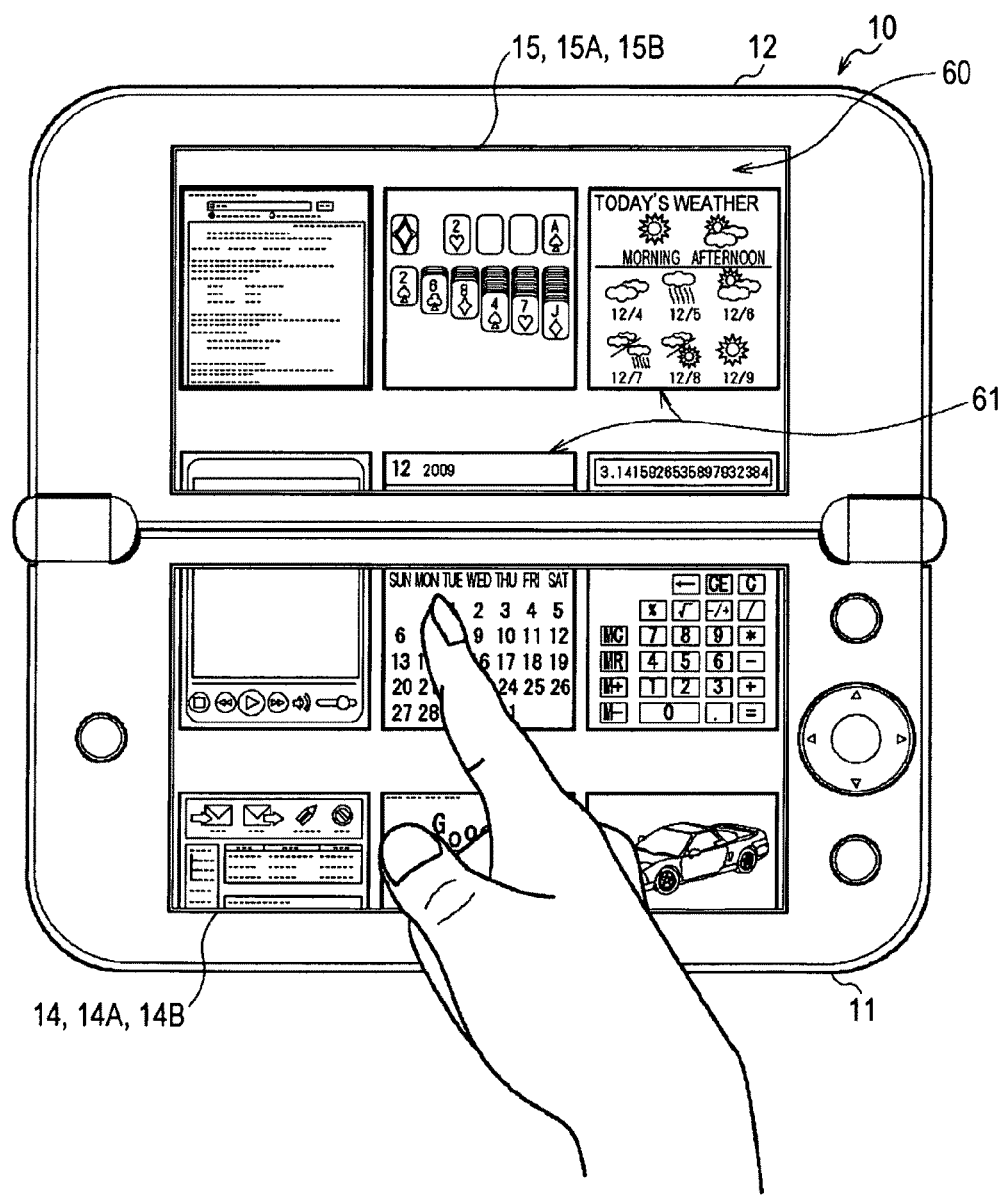
FIG. 16 is a diagram schematically illustrating a display of a thumbnail list image according to a proximity manipulation by means of a single finger.

Thus, as shown in FIGS. 15 and 16, the control section 20 displays a thumbnail list image 60 across the second liquid crystal display panel 15A to the first liquid crystal display panel 14A, on the basis of the image data.

In this case, a plurality of thumbnails 61 is arranged in a matrix format (a plurality of rows and columns) in the thumbnail list image 60.

Accordingly, the control section 20 can present the plurality of launch images through the plurality of thumbnails 61 of the thumbnail list image 60.

Further, if the thumbnail list image 60 is displayed in this way, the control section 20 determines whether the launch image is displayed immediately before the thumbnail list image 60 is displayed.

As a result, when the launch image is displayed immediately before the thumbnail list image 60 is displayed, the control section 20 emphatically displays thumbnail 61 indicating the launch image displayed immediately before among the plurality of thumbnails 61 in the thumbnail list image 60.

Hereinafter, the launch image displayed immediately before the thumbnail list image 60 is displayed is referred to as "immediately-before-displayed launch image".

That is, in the thumbnail list image 60, the control section 20 displays the thumbnail 61 indicating the immediately-before-displayed launch image in a display state different from the other thumbnails 61 such as being covered with a specific frame, being increased in luminance or the like.

Thus, the control section 20 can easily recognize that a display state of any launch image (immediately-before-displayed launch image) is switched into the display of the thumbnail list image 60, by the emphatically displayed thumbnail 61.

On the other hand, if the launch image is not particularly displayed immediately before the thumbnail list image 60 is displayed, the control section 20 does not emphasize any one of the plurality of thumbnails 61 of the thumbnail list image 60.

In this way, if the proximity manipulation is performed through one or plural fingers in a case where the plurality of launch images is held in the standby mode, the control section 20 displays the thumbnail list image 60 across the second liquid crystal display panel 15A to the first liquid crystal display panel 14A, to thereby present the plurality of launch images.

If the thumbnail list image 60 is generated and displayed in this way, the control section 20 matches the display region information indicating the position of the display area of each thumbnail 61 as coordinates of the pixel positions with the image identification information which can individually identify the launch image indicated by the thumbnail 61.

Further, the control section 20 stores the display area information of each thumbnail 61 and the image identification information corresponding to the display area information, as selection image detection information for detecting the launch image selected by the instruction of the thumbnail 61, in the RAM 22.

On the other hand, in the mobile terminal 10, the proximity manipulation may be performed with five fingers from the thumb to the little finger, or may be performed with the two fingers of thumb and index finger, as the plurality of fingers. Further, in the human hand, the thumb among the five fingers tends to be thicker than the other four fingers.

Figure 17A:
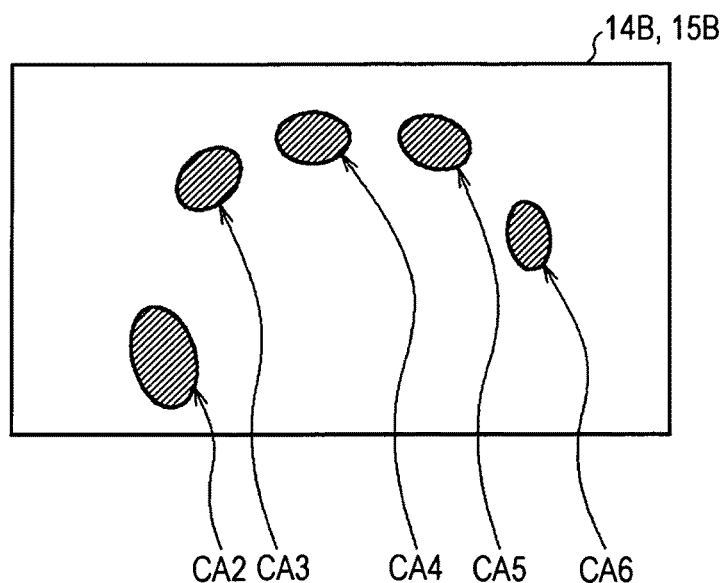
FIGS. 17A and 17B are diagrams schematically illustrating a detection of an attention area.
Figure 17B:
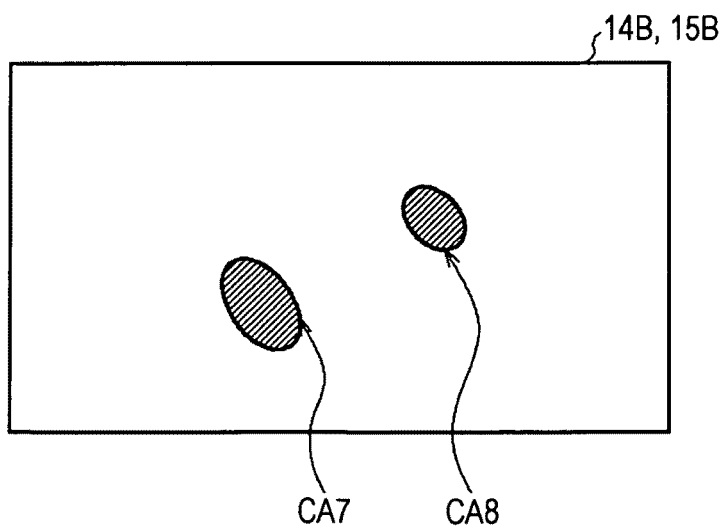

Accordingly, as shown in FIGS. 17A and 17B, in the mobile terminal 10, if the proximity manipulation is performed with the five fingers, a proximity area CA2 of the thumb tends to be larger than proximity areas CA3 to CA6 of the other four fingers.

In particular, in the mobile terminal 10, in the proximity manipulation, only the thumb may move close to the first manipulation surface on its side, and the other four fingers may move close to the first manipulation surface in their tips, according to a bending state of the wrist.

In such a case, in the mobile terminal 10, the proximity area CA2 of the thumb tends to be significantly larger than the proximity areas CA3 to CA6 of the other four fingers.

Further, in the human hand, the thumb extends from the vicinity of the palm heel and the wrist, and the other four fingers extend from the top of the palm of the hand. For this reason, in the mobile terminal 10, if the proximity manipulation is performed with the five fingers, it is likely that only the proximity area CA2 of the thumb is disposed under the first manipulation surface, and the proximity areas CA3 to CA6 of the other four fingers are disposed together above the first manipulation surface.

Further, in the mobile terminal 10, for example, even in a case where the proximity manipulation is performed with the two fingers of thumb and index finger, the sizes or positions in a proximity area CA7 of the thumb and a proximity area CA8 of the index finger tend to be the same each other.

Accordingly, if five or two proximity areas CA2 to CA8 are detected at the proximity manipulation detection time, the control section 20 firstly specifies the proximity areas CA2 and CA7 of the thumb, on the basis of the sizes or positions of the plurality of proximity areas CA2 to CA8.

Next, the control section 20 specifies, for example, the proximity areas CA3 and CA8 of the index finger, from the other proximity areas CA3 to CA6 and CA8, using the specified result of the proximity areas CA2 and CA7 of the thumb.

Actually, if the five proximity areas CA2 to CA6 are detected at the proximity manipulation detection time, the control section 20 specifies the largest proximity area CA2 among the five proximity areas CA2 to CA6, as the proximity area CA2 of the thumb.

Then, the control section 20 specifies one proximity area CA3 which is adjacent to the proximity area CA2 of the thumb and is disposed above the proximity area CA2, as the proximity area CA3 of the index finger.

Further, if two proximity areas CA7 and CA8 are detected at the proximity manipulation detection time, the control section 20 specifies a larger proximity area CA7 among two proximity areas CA7 and CA8 as the proximity area CA7 of the thumb.

Next, the control section 20 specifies the remaining one proximity area CA8 other than the proximity area CA7 of the thumb as the proximity area CA8 of the index finger.

In this way, if the proximity areas CA3 and CA8 of the index finger are specified, the control section 20 sets the proximity areas CA3 and CA8 as attention areas among the plurality of proximity areas CA2 to CA8.

Further, if the plurality of proximity areas of the plurality of fingers and the center positions thereof are detected at the proximity manipulation detection time (if the proximity manipulation is performed with the plurality of fingers), the control section 20 continues to detect the movement trace of each finger.

Further, whenever the area detection process is performed, after the proximity manipulation detection time, the control section 20 determines whether the plurality of fingers move together in a desired direction (approximately the same direction) (that is, whether the hand moves in a desired direction), on the basis of the movement trace of each finger detected up to the time.

At this time, for example, if it is detected that the movement traces of the respective fingers extend in approximately the same direction (that is, if it is detected that the plurality of proximity areas is displaced together in a desired direction (approximately the same direction)), the control section 20 determines that the plurality of fingers moves in the desired direction (that is, approximately the same direction).

Further, if it is detected that the plurality of fingers moves in the desired direction, while the plurality of fingers moves in the desired direction, whenever the area detection process is performed to detect the attention area and the center position, the control section 20 compares the center position with the display area included in the selection image detection information.

That is, while the plurality of fingers moves in the desired direction on the first manipulation surface, the control section 20 determines whether the index finger among the plurality of fingers moves to a specific thumbnail 61 in the thumbnail list image 60.

As a result, if the center position of the attention area is shifted from the display area of the specific thumbnail 61, the control section 20 does not change the display of the thumbnail list image 60.

In this respect, if the center position of the attention area is included within the display area of the specific thumbnail 61, the control section 20 determines that the attention area (index finger) is overlapped with the thumbnail 61 displayed on the display area in which the center position is included.

Figure 18:
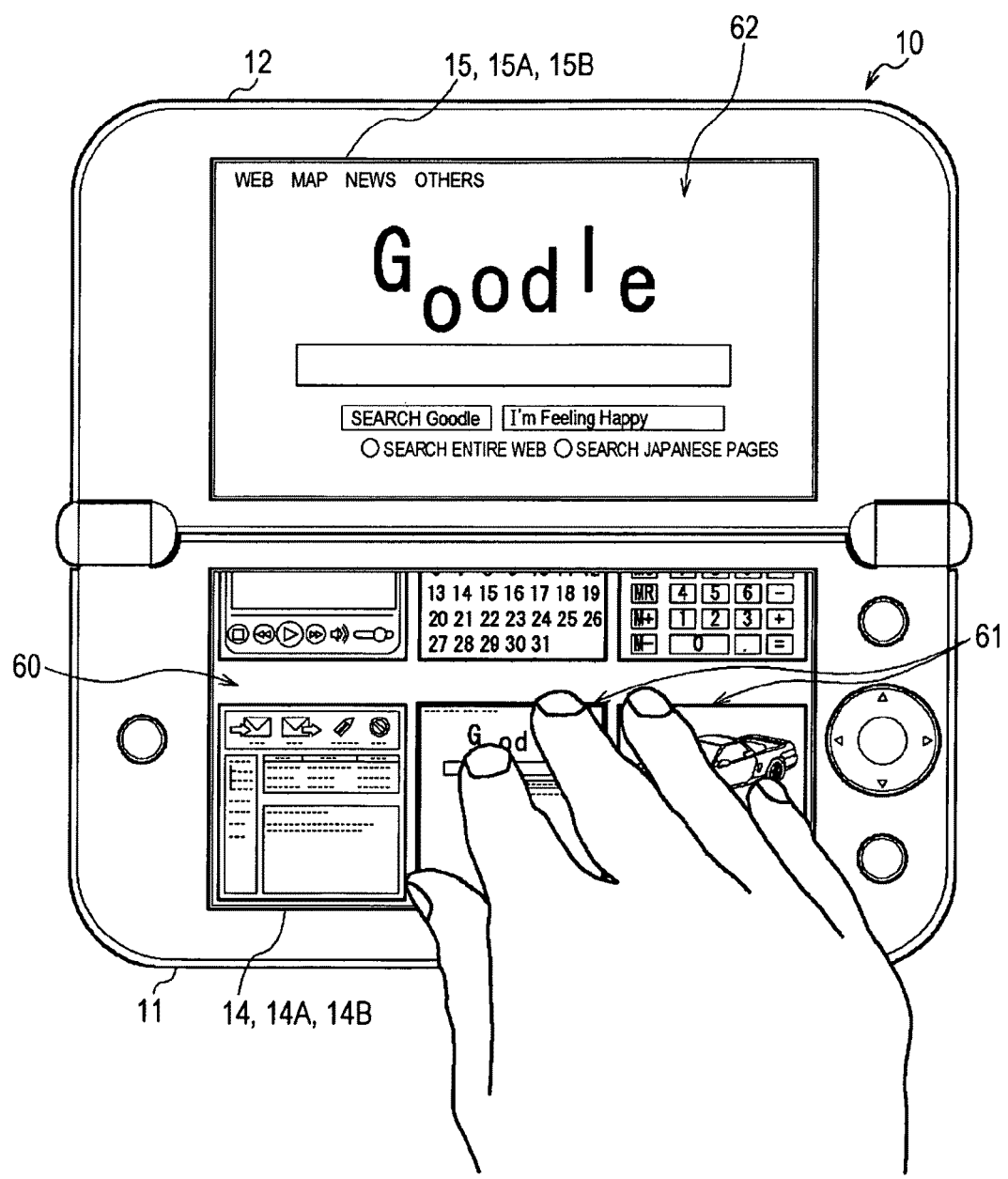
FIG. 18 is a diagram schematically illustrating an emphatic display of a thumbnail according to movement of a plurality of fingers at the time of proximity manipulation.

Further, as shown in FIG. 18, in the thumbnail list image 60, the control section 20 emphatically displays the thumbnail 61 with which the attention area is overlapped as described above.

At this time, if the thumbnail 61 which is already emphatically displayed exists and the thumbnail 61 is different from the thumbnail 61 with which the attention area is overlapped, the control section 20 changes the thumbnail 61 to be emphatically displayed into a thumbnail with which the attention area is overlapped.

Further, at this time, if the thumbnail 61 which is already emphatically displayed exists and the thumbnail 61 is the same as the thumbnail 61 with which the attention area is overlapped, the control section 20 maintains the emphatic display and does not change the thumbnail 61 to be emphatically displayed.

Further, at this time, if the thumbnail 61 which is emphatically displayed does not exist, the control section 20 newly emphatically displays the thumbnail 61 with which the attention area is overlapped.

In addition, the control section 20 enlarges the thumbnail 61 which is emphatically displayed at this time (that is, with which the attention area is overlapped).

Further, at this time, while continuing to display a part of the thumbnail list image 60 on the first liquid crystal display panel 14A, the control section 20 displays at least a part of an enlarged thumbnail 62 on the entire surface of the second liquid crystal display panel 15A.

The thumbnail 61 is substantially the same as the launch image indicated by the thumbnail 61. Accordingly, without enlarging the thumbnail 61 which is emphatically displayed (with which the attention area is overlapped), the control section 20 may display at least a part of the launch image indicated by the thumbnail 61 on the second liquid crystal display panel 15A.

In this way, while the plurality of fingers is moving in a desired direction, the control section 20 emphatically displays one thumbnail 61 with which the index finger is overlapped, and enlarges the thumbnail 61 and displays it on the second liquid crystal display panel 15A.

Further, in a case where the thumbnail 61 with which the index finger is overlapped is changed according to the movements of the plurality of fingers, the control section 20 changes the thumbnail 61 to be emphatically displayed and enlarged.

Accordingly, while the plurality of fingers is moving in a desired direction, the control section 20 can allow the user to easily recognize which launch image is indicated by the thumbnail 61 disposed in a position which can be instructed by the index finger.

Further, if the movement of the plurality of fingers stops, while terminating the enlargement display of the thumbnail 61 on the second liquid crystal display panel 15A and displaying again a part of the thumbnail list image 60 (returning it to the original display), the control section 20 continues the emphatic display of the thumbnail 61 with which the attention area is overlapped.

Accordingly, even if the movement of the plurality of fingers stops, the control section 20 can allow the user to recognize which launch image is indicated by the thumbnail 61, according to the display content of the thumbnail 61 disposed in the position which can be instructed by the index finger.

On the other hand, if only one proximity area is detected at the proximity manipulation detection time, in particular, the control section 20 does not perform a process for specifying the proximity area of the thumb or the proximity area of the index finger as described above, and uses one proximity area which is detected at this time as the attention area.

Further, if only one proximity area of one finger and the center position thereof are detected at the proximity manipulation detection time in this way (if the proximity manipulation is performed by only one finger), the control section 20 continues to detect the movement trace of the finger.

Further, whenever the area detection process is performed after the proximity manipulation detection time, the control section 20 determines whether one finger has moved in a desired direction (that is, whether the hand has moved in the desired direction), on the basis of the movement trace of one finger detected up to the time.

At this time, if it is detected that the movement trace of one finger extends in a specific direction (that is, one proximity area is displaced in the specific direction), the control section 20 determines that one finger has moved in the desired direction.

Figure 19:
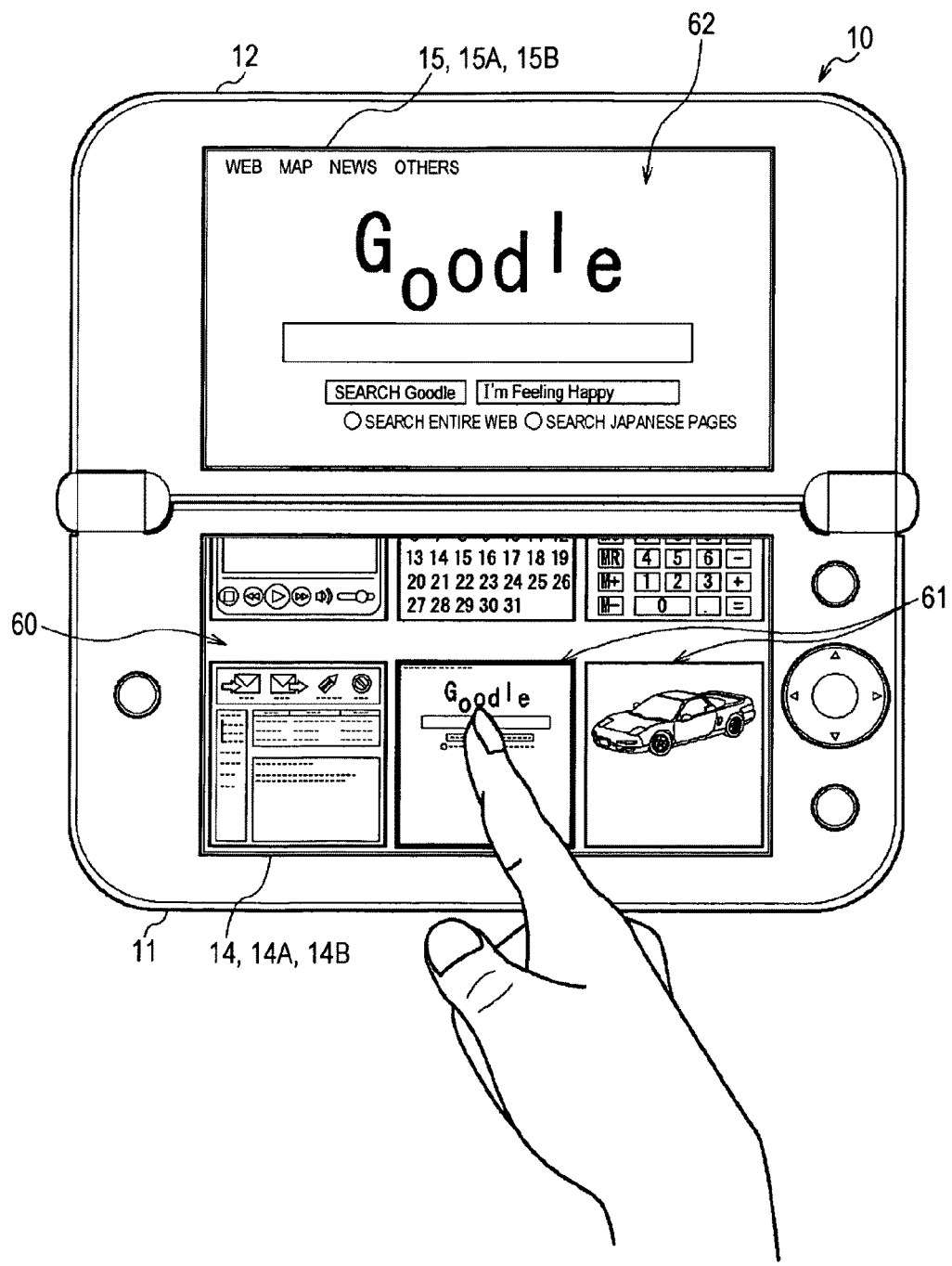
FIG. 19 is a diagram schematically illustrating an emphatic display of a thumbnail according to movement of a single finger at the time of proximity manipulation.

Further, as shown in FIG. 19, if it is detected that one finger has moved in the desired direction, while the finger is moving in the predetermined direction, the control section 20 emphatically displays the thumbnail 61 as described above, and enlarges the thumbnail 61 and displays it on the second liquid crystal display panel 15A.

Further, if the movement of one finger stops, while terminating the enlargement display of the thumbnail 61 on the second liquid crystal display panel 15A and displaying again a part of the thumbnail list image 60 (returning it to the original display), the control section 20 continues the emphatic display of the thumbnail 61 with which the attention area is overlapped.

Figure 20:
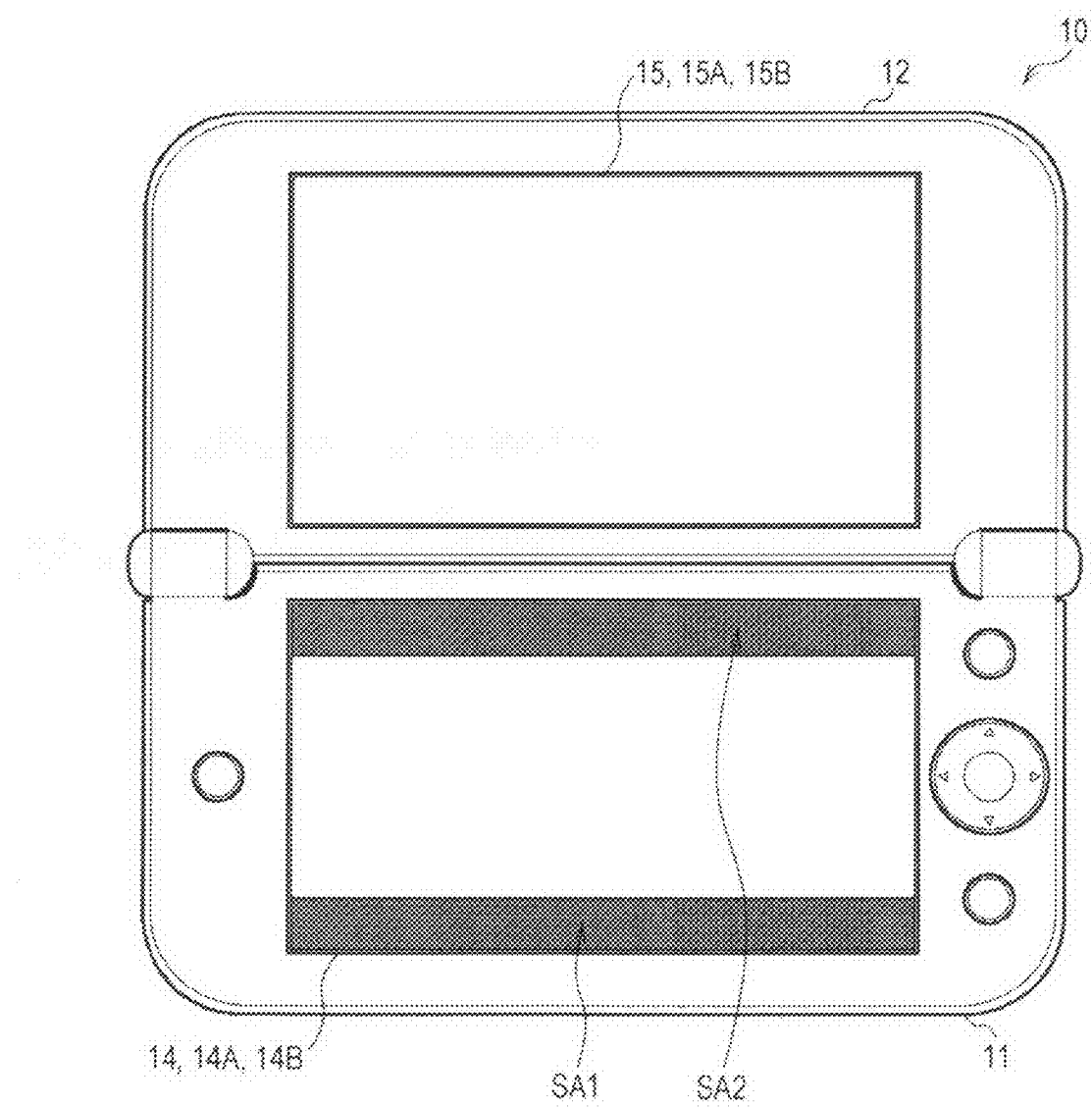
FIG. 20 is a diagram schematically illustrating a setting of a scroll-up instruction area and a scroll-down instruction area on a first touch screen.

On the other hand, as shown in FIG. 20, from the proximity manipulation detection time to the proximity manipulation termination time, the control section 20 sets a belt-like area from the left edge to the right edge in a lower edge section of the first touch panel 14B, as a scroll-up instruction area SA1 for instructing an upward scrolling of the image.

Actually, the control section 20 matches up-instruction display area information indicating the position of the scroll-up instruction area SA1 as coordinates of the pixel positions facing the first liquid crystal display panel 14A with process information indicating the upward scrolling as a process which can be instructed to be performed through the scroll-up instruction area SA1.

Further, the control section 20 stores the up-instruction area information and the process information matched with the up-instruction area information as scroll-up detection information in the RAM 22.

Further, from the proximity manipulation detection time to the proximity manipulation termination time, the control section 20 sets a belt-like area from the left edge to the right edge in an upper edge section of the first touch panel 14A, as a scroll-down instruction area SA2 for instructing a downward scrolling of the image.

Actually, the control section 20 matches down-instruction display area information indicating the position of the scroll-down instruction area SA2 as coordinates of the pixel positions facing the first liquid crystal display panel 14A with process information indicating the downward scrolling as a process which can be instructed to be performed through the scroll-down instruction area SA2.

Further, the control section 20 stores the down-instruction area information and the process information matched with the down-instruction area information as scroll-down detection information in the RAM 22.

Accordingly, while the plurality of fingers is moving in the desired direction, whenever the area detection process is performed to detect the plurality of proximity areas and the center area thereof, the control section 20 compares the detected plurality of center positions with the position of the scroll-up instruction area SA1 and the position of the scroll-down instruction area SA2.

As a result, if the plurality of center positions is included in neither the scroll-up instruction area SA1 nor the scroll-down instruction area SA2, the control section 20 does not detect that the scrolling of the image is instructed.

In this respect, for example, if at least one center position is included in the scroll-up instruction area SA1 (that is, if at least one finger covers the scroll-up instruction area SA1), the control section 20 detects that the upward scrolling for the image is instructed.

Figure 21:
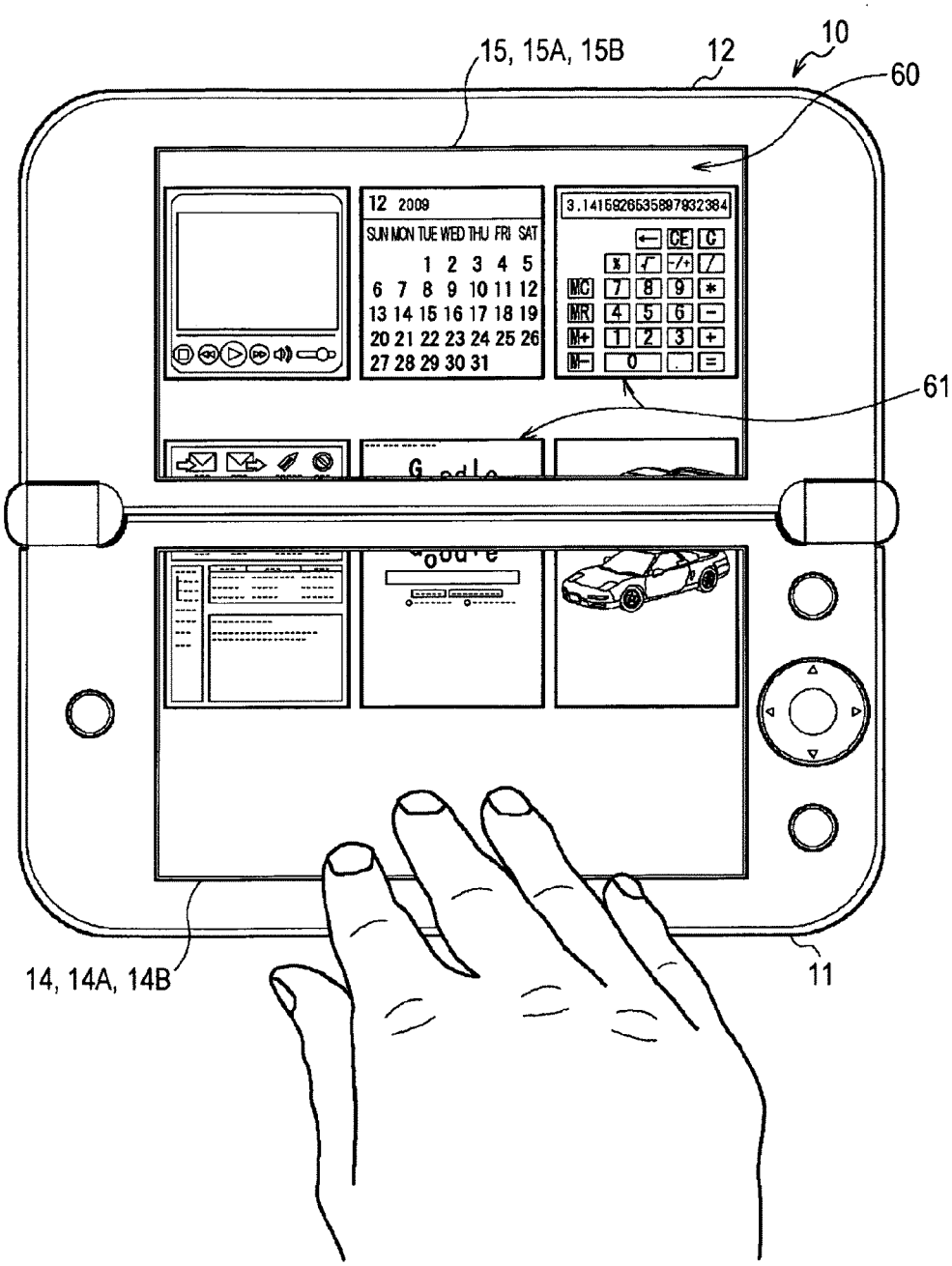
FIG. 21 is a diagram schematically illustrating an upward scrolling of a thumbnail list image.

At this time, for example, as shown in FIG. 21, the control section 20 relatively slowly scrolls up the thumbnail list image 60 which is displayed across the second liquid crystal display panel 15A to the first liquid crystal display panel 14A.

That is, if one or plural fingers move close to the lower edge section on the first manipulation surface of the first touch panel 14A, the control section 20 scrolls up the thumbnail list image 60, to thereby sequentially display the lower edge side of the thumbnail list image 60.

Further, while at least one center position is included in the scroll-up instruction area SA1 (that is, while at least one finger is stationary on the scroll-up instruction area SA1), the control section 20 continues the upward scrolling of the thumbnail list image 60.

Figure 22:
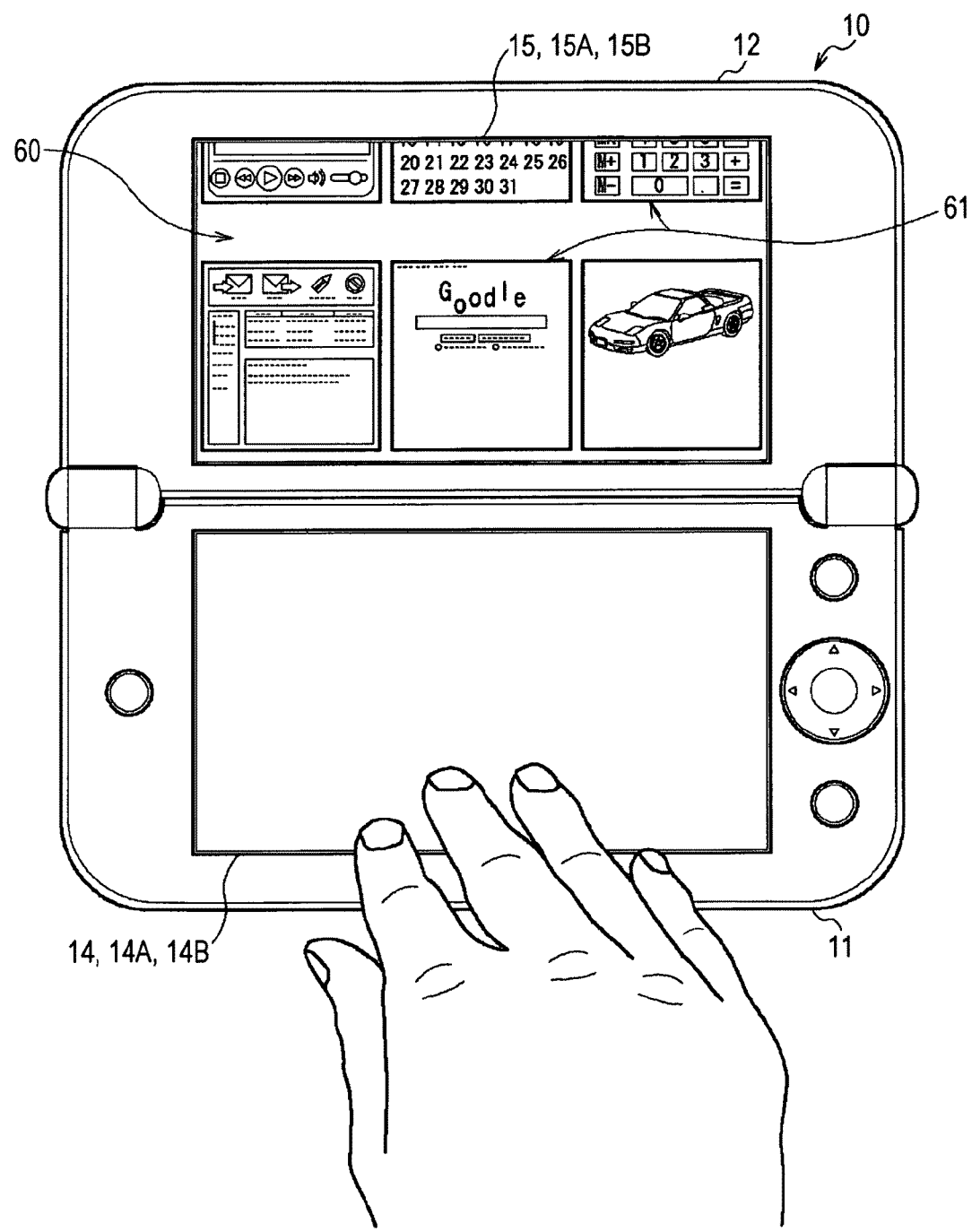
FIG. 22 is a diagram schematically illustrating a scroll-up final display state of a thumbnail list image.

Accordingly, for example, as shown in FIG. 22, the control section 20 finally drives upward all the lower edge section of the thumbnail list image 60 from the first liquid crystal display panel 14A to be empty, and scrolls it to a state where the lower edge section of the thumbnail list image is displayed on the second liquid crystal display panel 15A.

Hereinafter, the state where the first liquid crystal display panel 14A is finally empty through the upward scrolling for the thumbnail list image 60 and the lower edge section of the thumbnail list image 60 is displayed on the second liquid crystal display panel 15A is referred to as "final scroll-up display state".

If the thumbnail list image 60 is scrolled to the final scroll-up display state, even though a finger is stationary on the scroll-up instruction area SA1 thereafter, the control section 20 negates the instruction of the upward scrolling, to thereby forcibly stop the upward scrolling.

Accordingly, if the thumbnail list image 60 is scrolled to the final scroll-up display state, a hand or fingers close to the first manipulation surface become a shield, and thus, the visibility of the thumbnail list image 60 can be prevented from being deteriorated.

Further, for example, if at least one center position is included in the scroll-down instruction area SA2 (that is, if at least one finger covers the scroll-down instruction area SA2), the control section 20 detects that the downward scrolling for the image is instructed.

Figure 23:
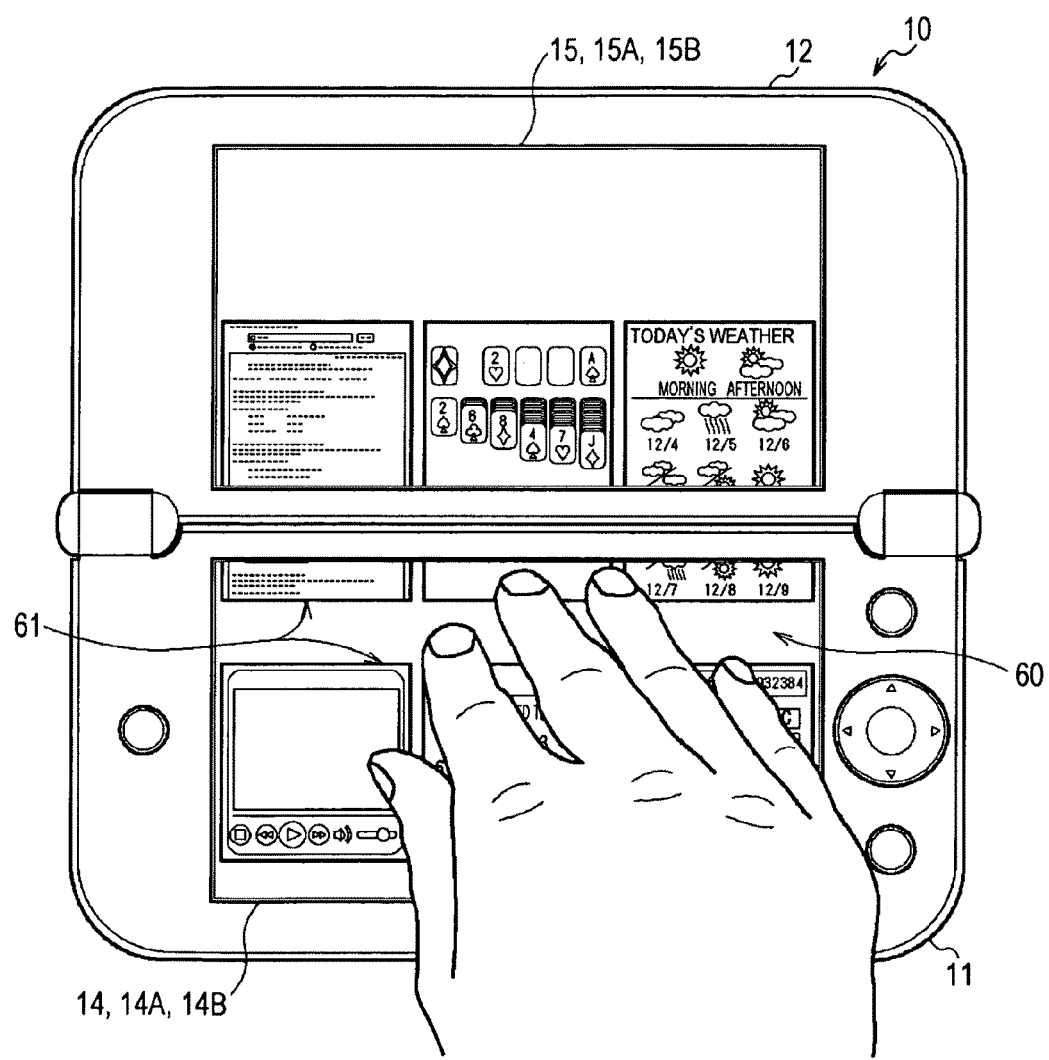
FIG. 23 is a diagram schematically illustrating a downward scrolling of a thumbnail list image.

At this time, for example, as shown in FIG. 23, the control section 20 can relatively slowly scroll down the thumbnail list image 60 which is displayed across the second liquid crystal display panel 15A to the first liquid crystal display panel 14A.

That is, if one or plural fingers move close to the upper edge section on the first manipulation surface of the first touch panel 14A, the control section 20 scrolls down the thumbnail list image 60, to thereby sequentially display the upper edge side of the thumbnail list image 60.

Further, while at least one center position is included in the scroll-down instruction area SA2 (that is, while at least one finger is stationary on the scroll-down instruction area SA2), the control section 20 continues the downward scrolling of the thumbnail list image 60.

Figure 24:
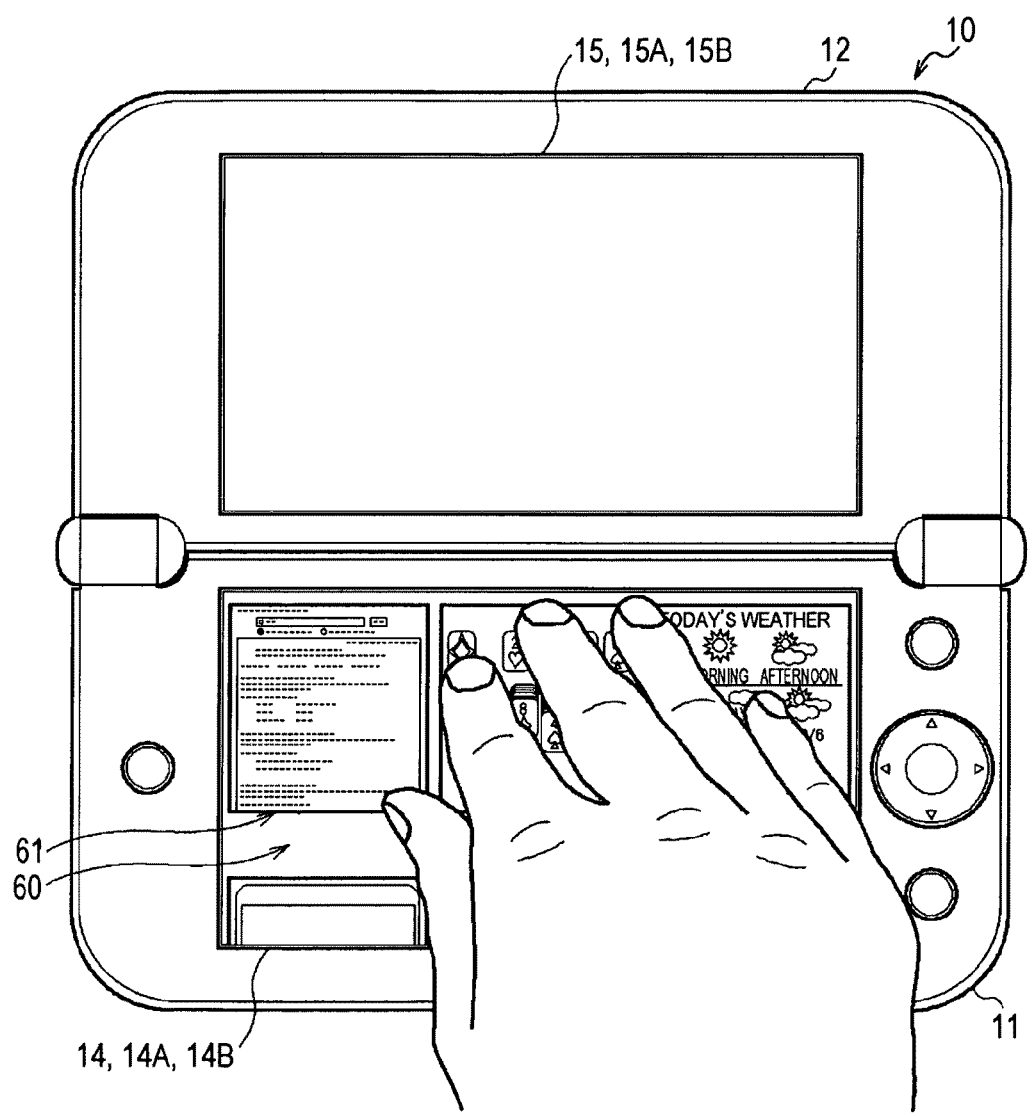
FIG. 24 is a diagram schematically illustrating a scroll-down final display state of a thumbnail list image.

Accordingly, for example, as shown in FIG. 24, the control section 20 finally drives downward all the upper edge section of the thumbnail list image 60 from the second liquid crystal display panel 15A to be empty, and scrolls it to a state where the upper edge section of the thumbnail list image 60 is displayed on the first liquid crystal display panel 14A.

Hereinafter, the state where the second liquid crystal display panel 15A is finally empty through the downward scrolling for the thumbnail list image 60 and the lower edge section of the thumbnail list image 60 is displayed on the first liquid crystal display panel 14A is referred to as "final scroll-down display state".

If the thumbnail list image 60 is scrolled to the final scroll-down display state, even though a finger is stationary on the scroll-down instruction area SA2 thereafter, the control section 20 negates the instruction of the downward scrolling, to thereby forcibly stop the downward scrolling.

Accordingly, if the thumbnail list image 60 is scrolled to the final scroll-down display state, the control section 20 can allow the user to instruct the thumbnail 61 which is arranged near the upper edge of the thumbnail list image 60 by the tap manipulation, on the first manipulation surface of the first touch panel 14B.

Further, for example, while the proximity manipulation is performed with one finger being moved, similarly, the control section 20 compares the proximity area and the center position thereof with the position of the scroll-up instruction area SA1 and the position of the scroll-down instruction area SA2.

Further, if the center position is included in the scroll-up instruction area SA1 (that is, if one finger covers the scroll-up instruction area SA1), the control section 20 scrolls up the thumbnail list image 60, in a similar way to the case described above with reference to FIGS. 21 and 22.

Further, if the center position is included in the scroll-down instruction area SA2 (that is, if one finger covers the scroll-down instruction area SA2), the control section 20 scrolls down the thumbnail list image 60, in a similar way to the case described above with reference to FIGS. 23 and 24.

In this way, even in a case where the entire thumbnail list image 60 is unable to be displayed across the second liquid crystal display panel 15A to the first liquid crystal display panel 14A, the control section 20 can appropriately scroll up or down the thumbnail list image 60 to be completely displayed.

While the finger is covering the scroll-up instruction area SA1 and the scroll-down instruction area SA2 (while the proximity area is being covered), the control section 20 stops the emphatic display of the thumbnail 61.

Further, in a case where the thumbnail list image 60 is scrolled to displace the display area of the thumbnail 61, the control section 20 changes the display area information matched with the image identification information into the display area information indicating the position of the display area after displacement as the coordinates of the pixel positions, in the selection image detection information.

Accordingly, if the finger moves again and deviates from the scroll-up instruction area SA1 and the scroll-down instruction area SA2, the control section 20 compares the center position of the attention area with the display area of the thumbnail 61 as described above, using the changed display area information.

Thus, even if the thumbnail list image 60 is scrolled to change the display range, the control section 20 can accurately detect the thumbnail 61 with which the index finger is overlapped, as described above.

For this reason, even if the thumbnail list image 60 is scrolled to change the display range, the control section 20 can emphasize and display the thumbnail 61 with which the index finger is overlapped, as described above, and can enlarge the thumbnail 61 and display it on the second liquid crystal display panel 15A.

In addition, if the plurality of proximity areas and the center position thereof are particularly detected at the proximity manipulation detection time, the control section 20 detects the distance between the center positions of two neighboring proximity areas (hereinafter, referred to as "inter-area distance").

Figure 25:
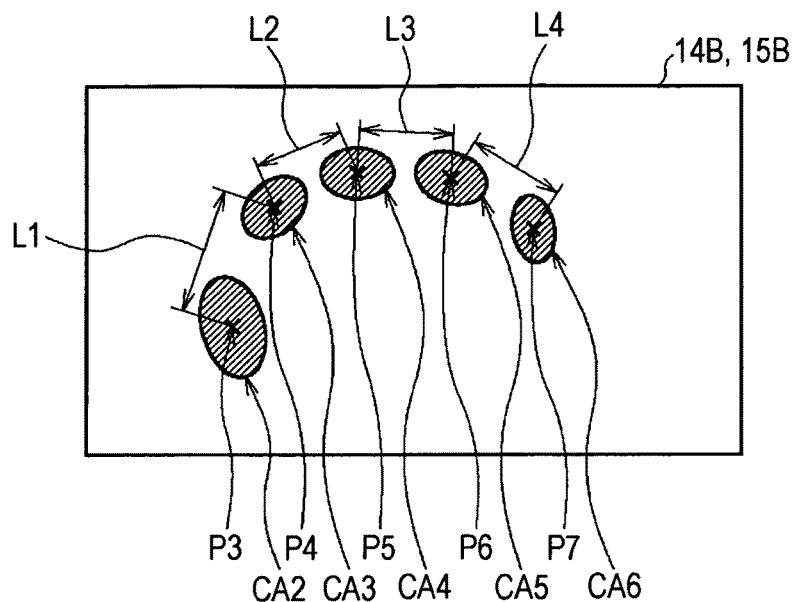
FIG. 25 is a diagram schematically illustrating a detection of an inter-area distance.

As shown in FIG. 25, for example, if five proximity areas CA2 to CA6 and the center positions P3 to P7 thereof are detected, the control section 20 detects the inter-area distances L1 to L4, in the sequentially neighboring two proximity area CA2 to CA6.

Figure 26:
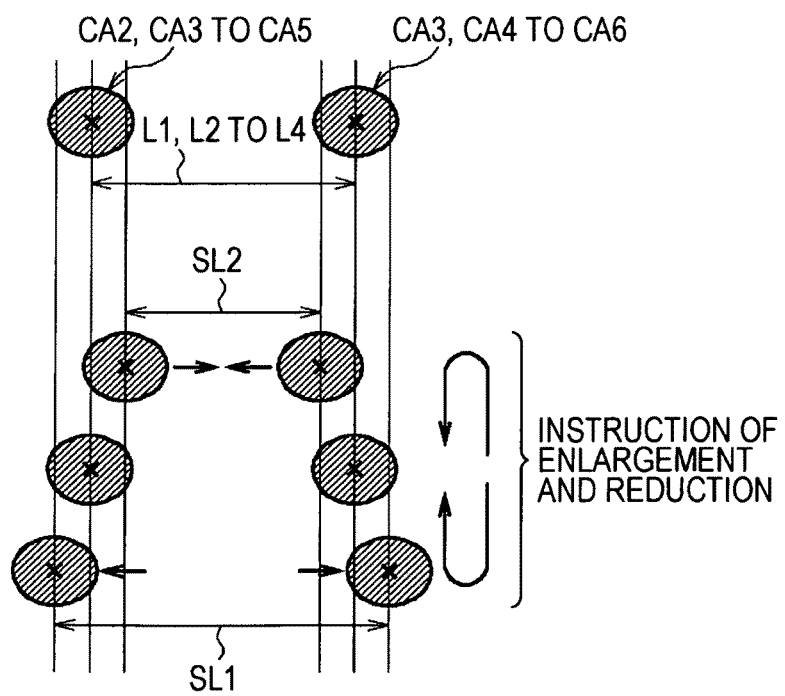
FIG. 26 is a diagram schematically illustrating a detection of an instruction of enlargement and reduction of an image.

Further, as shown in FIG. 26, for each combination of the two neighboring proximity areas among the proximity areas CA2 to CA6, the control section 20 sets an extended interval change detection distance SL1 such that is obtained by extending the inter-area distances L1 to L4 between the two proximity areas among the proximity areas CA2 to CA6, for example, by several tens of percentages.

Further, for each combination of the two neighboring proximity areas among the proximity areas CA2 to CA6, the control section 20 also sets a narrowed interval change detection distance SL2 such that is obtained by narrowing the inter-area distances L1 to L4 between the two proximity areas among the proximity areas CA2 to CA6, for example, by several tens of percentages.

For example, if two proximity areas and the center positions thereof are detected at the proximity manipulation detection time, the control section 20 similarly detects inter-area distances for the two proximity areas.

Further, the control section 20 sets the extended interval change detection distance SL1 and the narrowed interval change detection distance SL2 on the basis of the inter-area distances, as described above.

Further, whenever performing the area detection process after setting the extended interval change detection distance SL1 and the narrowed interval change detection distance SL2, the control section 20 also detects the inter-area distance between two neighboring proximity areas, on the basis of the center positions detected together with the plurality of proximity areas.

Further, whenever performing the area detection process, the control section 20 compares the inter-area distance between two neighboring proximity areas with the corresponding extended interval change detection distance SL1 and narrowed interval change detection distance SL2.

Further, the control section 20 detects whether the inter-area distance between two neighboring proximity areas is equal to or longer than the corresponding extended interval change detection distance SL1, on the basis of the comparison result between the inter-area distance and the extended interval change detection distance SL1 and the narrowed interval change detection distance SL2.

Further, the control section 20 also detects whether the inter-area distance between two neighboring proximity areas is equal to or shorter than the corresponding narrowed interval change detection distance SL2, on the basis of the comparison result between the inter-area distance and the extended interval change detection distance SL1 and the narrowed interval change detection distance SL2.

That is, while the proximity manipulation is being performed by the plurality of fingers, the control section 20 monitors the interval of the plurality of fingers and detects whether the interval is increased or decreased.

As a result, if it is detected that at least one inter-area distance is equal to or longer than the corresponding extended interval change detection distance SL1, the control section 20 recognizes that the enlargement of the image is instructed.

Figure 27A:
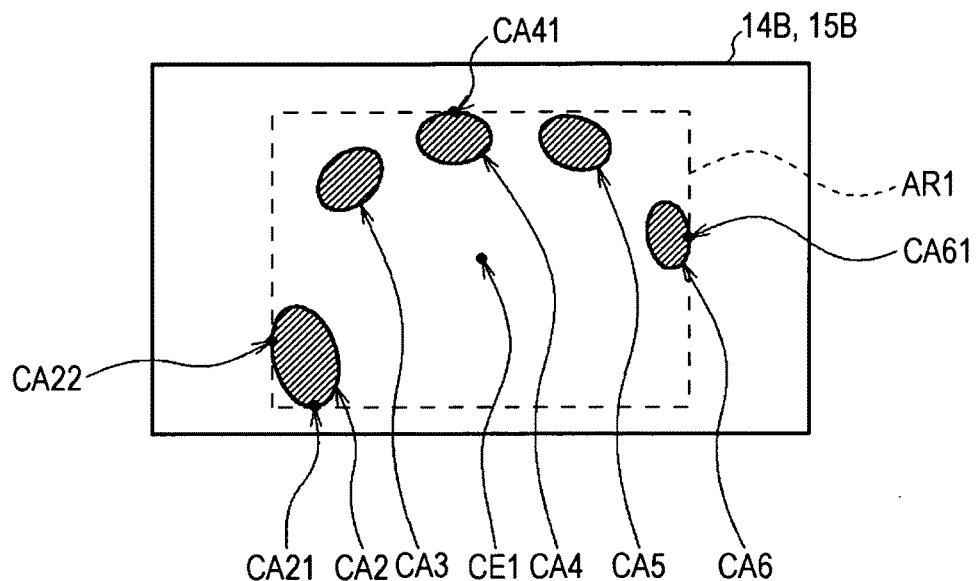
FIGS. 27A and 27B are diagrams schematically illustrating a detection of a display reference position at the time of enlargement and reduction of a thumbnail list image.

As shown in FIG. 27A, at this time, for example, if five proximity areas CA2 to CA6 of five fingers are detected, the control section 20 detects the uppermost end point CA41 among the five proximity areas CA2 to CA6.

Further, for example, the control section 20 also detects the lowermost end point CA21, the leftmost end point CA22, and the rightmost end point CA61 among the five proximity areas CA2 to CA6.

Further, the control section 20 detects a rectangular area AR1 which covers all the five proximity areas CA2 to CA6 and has sides each being in touch with the uppermost, lowermost, leftmost and rightmost end points CA41, CA21, CA22 and CA61 which are detected in the proximity areas CA3 and CA4 among the five proximity areas CA2 to CA6.

Further, the control section 20 detects the pixel position of the first liquid crystal display panel 14A, facing a center position CE1 of the area AR1 as a display reference position for alignment of the display positions before and after enlarging the thumbnail list image 60.

Figure 27B:
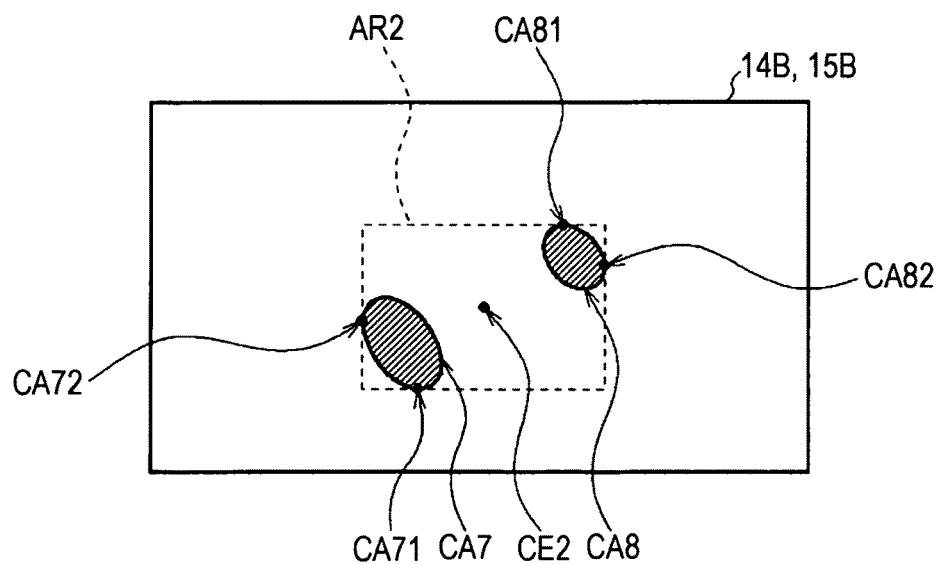

Further, as shown in FIG. 27B, at this time, for example, if two proximity areas CA7 and CA8 of two fingers are detected, the control section 20 detects the uppermost end point CA81 among the two proximity areas CA7 and CA8.

Further, for example, the control section 20 also detects the lowermost end point CA71, the leftmost end point CA72, and the rightmost end point CA82 among the two proximity areas CA7 and CA8.

Further, the control section 20 detects a rectangular area AR2 which covers the two proximity areas CA7 and CA8 and has sides each being in touch with the uppermost, lowermost, leftmost and rightmost end points CA81, CA71, CA72 and CA82 which are detected in the two proximity areas CA7 and CA8.

Further, the control section 20 detects the pixel position of the first liquid crystal display panel 14A, facing a center position CE2 of the area AR2 as a display reference position for alignment of the display positions before and after enlarging the thumbnail list image 60.

That is, if it is recognized that the enlargement of the image is instructed, the control section 20 detects the display reference position when the enlarged thumbnail list image 60 is displayed across the second liquid crystal display panel 15A to the first liquid crystal display panel 14A, on the basis of the proximity areas of five or two fingers.

Further, at this time, the control section 20 detects a reference facing position facing the display reference position (hereinafter, referred to as "pre-enlargement reference facing position"), in the thumbnail list image 60 which is displayed across the second liquid crystal display panel 15A to the first liquid crystal display panel 14A.

In addition, for example, in an enlarged thumbnail list image obtained by enlarging the thumbnail list image 60 by a preset enlargement ratio, the control section 20 specifies a position (hereinafter, referred to as "post-enlargement reference facing position) corresponding to the pre-enlargement reference facing position.

Figure 28:
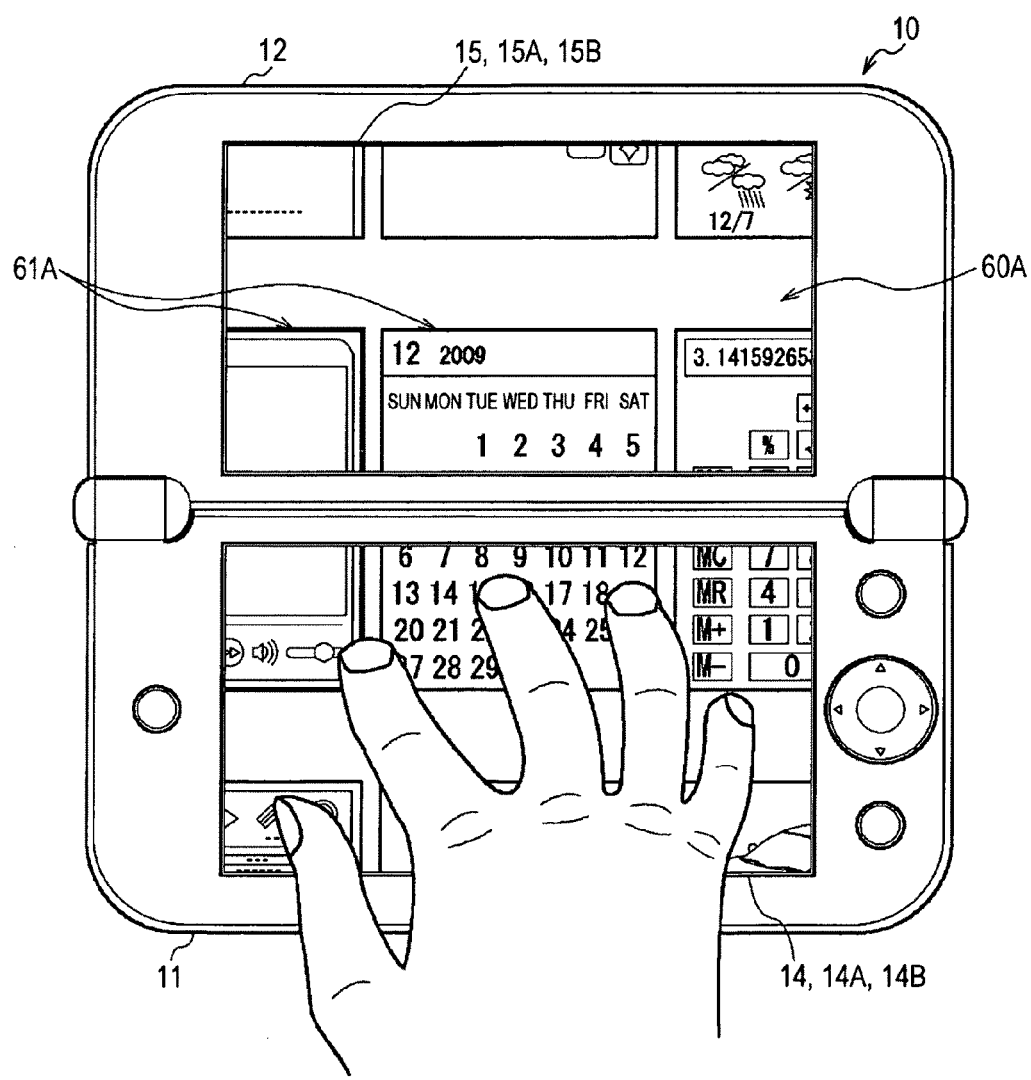
FIG. 28 is a diagram schematically illustrating enlargement of a thumbnail list image.

Further, as shown in FIG. 28, the control section 20 displays an enlarged thumbnail list image 60A, instead of the thumbnail list image 60, across the second liquid crystal display panel 15A to the first liquid crystal display panel 14A so that the post-enlargement reference facing position is matched with the display reference position.

Accordingly, compared with the case where the thumbnail list image 60 before enlargement is displayed across the second liquid crystal display panel 15A to the first liquid crystal display panel 14A, the control section 20 can enhance the visibility of the thumbnail 61A, to thereby easily recognize the contents of the thumbnail 61A.

Further, at this time, the control section 20 enlarges the thumbnail list image 60 as if it is zoomed centering on the proximity portions of the plurality of fingers, by matching the post-enlargement reference facing position with the display reference position.

Accordingly, the display areas can be prevented from being significantly deviated immediately before and immediately after the enlargement of the thumbnail list image 60, and thus, the control section 20 can also continuously display most of the thumbnail 61 which is displayed immediately before the enlargement, immediately after the enlargement.

The control section 20 also emphatically displays the thumbnail 61 which is emphatically displayed immediately before the enlargement when the thumbnail list image 60 is enlarged, after the enlargement.

Here, in a case where the enlarged thumbnail list image 60A is displayed, in the selection image detection information, the control section 20 changes the display area information matched with the image identification information into the display area information indicating the position of the display area of the enlarged thumbnail 61A as the coordinates of the pixel positions.

Accordingly, if the plurality of fingers move in the desired direction in a state where the enlarged thumbnail list image 60A is displayed, the control section 20 can detect the thumbnail 61A with which the attention area is overlapped (with which the index finger is overlapped), as described above.

Further, in a similar way to the case described above in FIG. 19, in a state where the thumbnail 61A with which the attention area is overlapped is emphatically displayed, the control section 20 further enlarges the thumbnail 61A and displays it on the entire display surface of the second liquid crystal display panel 15A while maintaining the display of the first liquid crystal display panel 14A as it is.

Further, in a state where the enlarged thumbnail list image 60A is displayed, even in a case where the movement of the plurality of fingers stops, the control section 20 detects the thumbnail 61A with which the attention area is overlapped (with which the index finger is overlapped), as described above.

Further, while displaying the enlarged thumbnail list image 60A across the first liquid crystal display panel 14A to the second liquid crystal display panel 15A at this time, the control section 20 emphatically displays the thumbnail 61A with which the attention area is overlapped.

Figure 29:
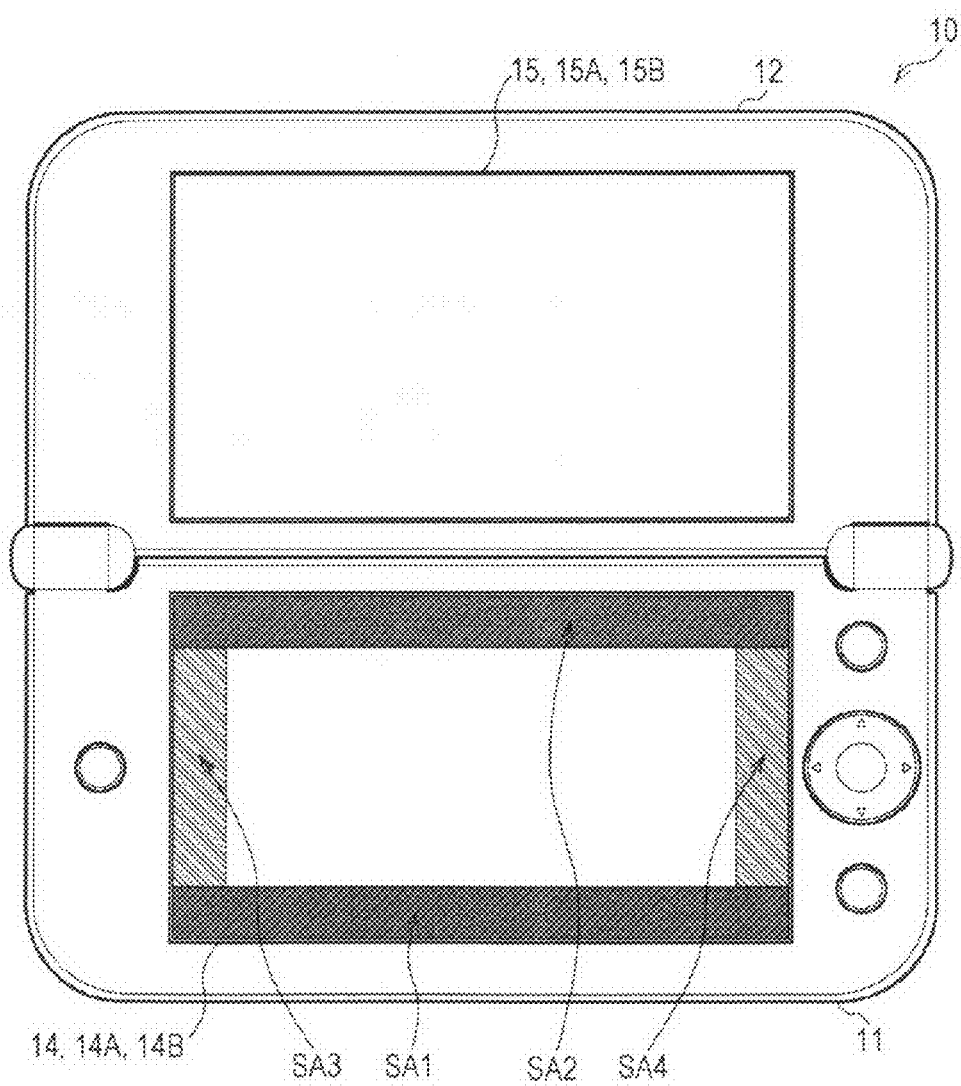
FIG. 29 is a diagram schematically illustrating a setting of a scroll-right instruction area and a scroll-left instruction area on a first touch screen.

On the other hand, as shown in FIG. 29, while displaying the enlarged thumbnail list image 60A, the control section 20 sets a scroll-right instruction area SA3 for instructing the rightward scrolling of the image, in the left edge section of the first touch panel 14B.

At this time, the control section 20 sets a belt-like area from the upper edge of the scroll-up instruction area SA1 to the lower edge of the scroll-down instruction area SA2, as the scroll-right instruction area SA3, in the left edge section of the first touch panel 14B.

Actually, the control section 20 matches right-instruction area information indicating the position of the scroll-right instruction area SA3 as coordinates of the pixel positions facing the first liquid crystal display panel 14A with process information indicating the rightward scrolling as a process which can be instructed to be performed through the scroll-right instruction area SA3.

Further, the control section 20 stores the right-instruction area information and the process information matched with the right-instruction area information as scroll-right detection information in the RAM 22.

Further, while displaying the enlarged thumbnail list image 60A, the control section 20 also sets a scroll-left instruction area SA4 for instructing the leftward scrolling of the image, in the right edge section of the first touch panel 14A.

At this time, the control section 20 sets a belt-like area from the upper edge of the scroll-up instruction area SA1 to the lower edge of the scroll-down instruction area SA2, as the scroll-left instruction area SA4, in the right edge section of the first touch panel 14B.

Actually, the control section 20 matches left-instruction area information indicating the position of the scroll-left instruction area SA4 as coordinates of the pixel positions facing the first liquid crystal display panel 14A with process information indicating the leftward scrolling as a process which can be instructed to be performed through the scroll-left instruction area SA4.

Further, the control section 20 stores the left-instruction area information and the process information matched with the left-instruction area information as scroll-left detection information in the RAM 22.

Further, while displaying the enlarged thumbnail list image 60A, for example, the control section 20 detects whether the plurality of fingers moves in the desired direction.

Further, if it is detected that the plurality of fingers moves in the desired direction, whenever the area detection process is performed to detect the plurality of center positions while the fingers are being moved, the control section 20 compares the detected plurality of center positions with the position of the scroll-right instruction area SA3.

Further, whenever the area detection process is performed to detect the plurality of center positions while the fingers are moving in the desired direction, the control section 20 compares the detected plurality of center positions with the position of the scroll-left instruction area SA4.

As a result, if all the plurality of center positions is not included in any of the scroll-right instruction area SA3 and the scroll-left instruction area SA4, the control section 20 does not determine that the rightward scrolling and the leftward scrolling for the image are instructed.

In this respect, for example, if at least one center position is included in the scroll-right instruction area SA3 (that is, if at least one finger covers the scroll-right instruction SA3), the control section 20 detects that the rightward scrolling for the image is instructed.

Figure 30:
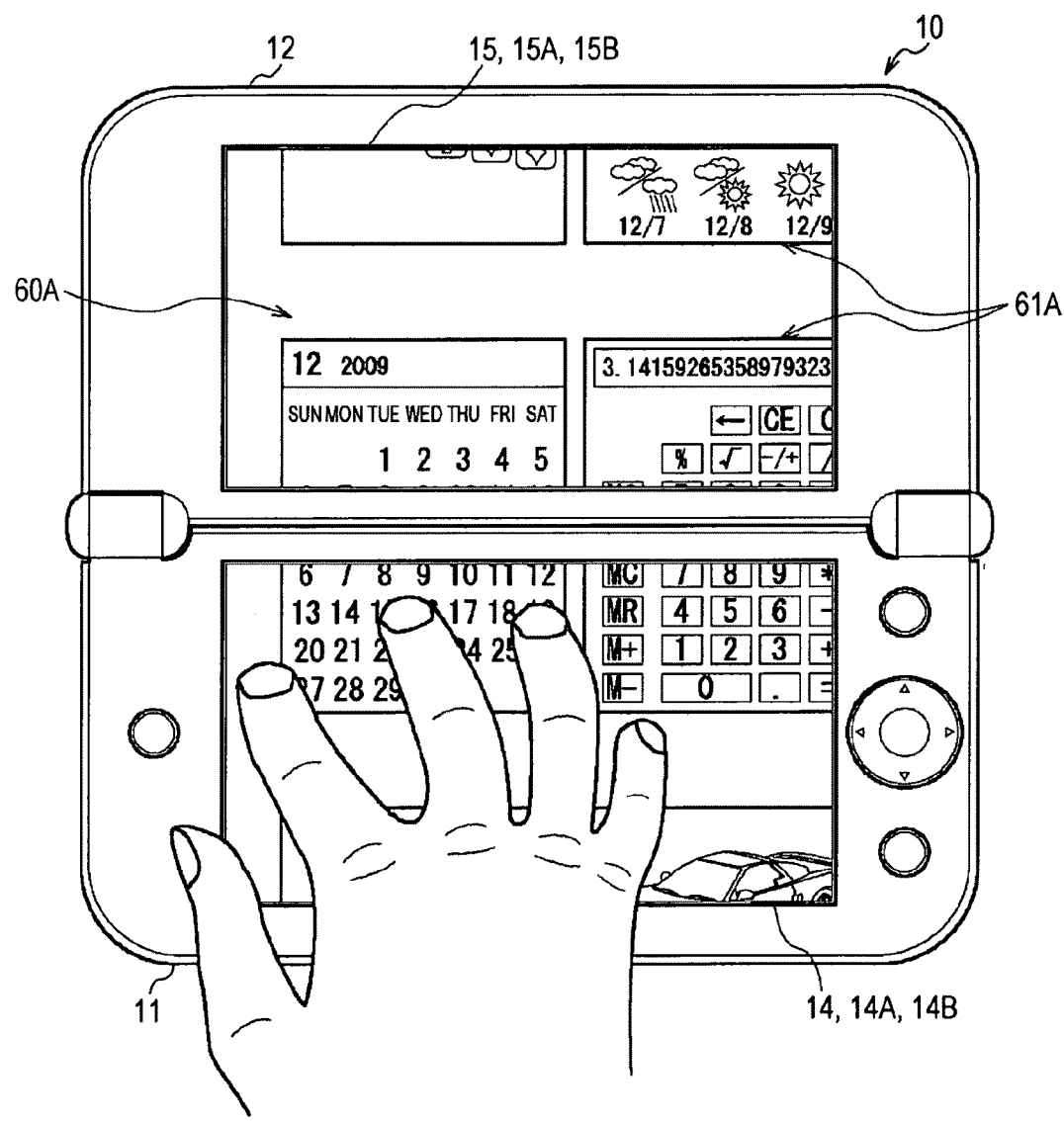
FIG. 30 is a diagram schematically illustrating a rightward scrolling of an enlarged thumbnail list image.

At this time, as shown in FIG. 30, the control section 20 relatively slowly scrolls rightward the enlarged thumbnail list image 60A which is displayed across the second liquid crystal display panel 15A to the first liquid crystal display panel 14A.

That is, if the finger moves close to the left edge section on the first manipulation surface of the first touch panel 14B, the control section 20 scrolls rightward the enlarged thumbnail list image 60A, to thereby sequentially display the left edge side of the enlarged thumbnail list image 60A.

Further, while at least one center position is included in the scroll-right instruction area SA3 (that is, while at least one finger is stationary on the scroll-right instruction area SA3), the control section 20 continues the rightward scrolling of the enlarged thumbnail list image 60A.

Accordingly, the control section 20 can perform the scrolling to a state where the left edges of the first liquid crystal display panel 14A and the second liquid crystal display panel 15A are finally matched with the left edge of the enlarged thumbnail list image 60A for display.

Hereinafter, the state where the left edges of the first liquid crystal display panel 14A and the second liquid crystal display panel 15A are matched with the left edge of the enlarged thumbnail list image 60A is referred to as "final scroll-right display state".

If the enlarged thumbnail list image 60A is scrolled to the state of the final scroll-right display state, even though a finger is stationary on the scroll-right instruction area SA3 thereafter, the control section 20 negates the instruction of the rightward scrolling, to thereby forcibly stop the rightward scrolling.

Accordingly, if the enlarged thumbnail list image 60A is scrolled to the final scroll-right display state, the control section 20 can easily instruct the thumbnail 61A which is arranged in the left edge section of the enlarged thumbnail list image 60A.

Further, for example, if at least one center position is included in the scroll-left instruction area SA4 (that is, if at least one finger covers the scroll-left instruction area SA4), the control section 20 detects that the leftward scrolling for the image is instructed.

Figure 31:
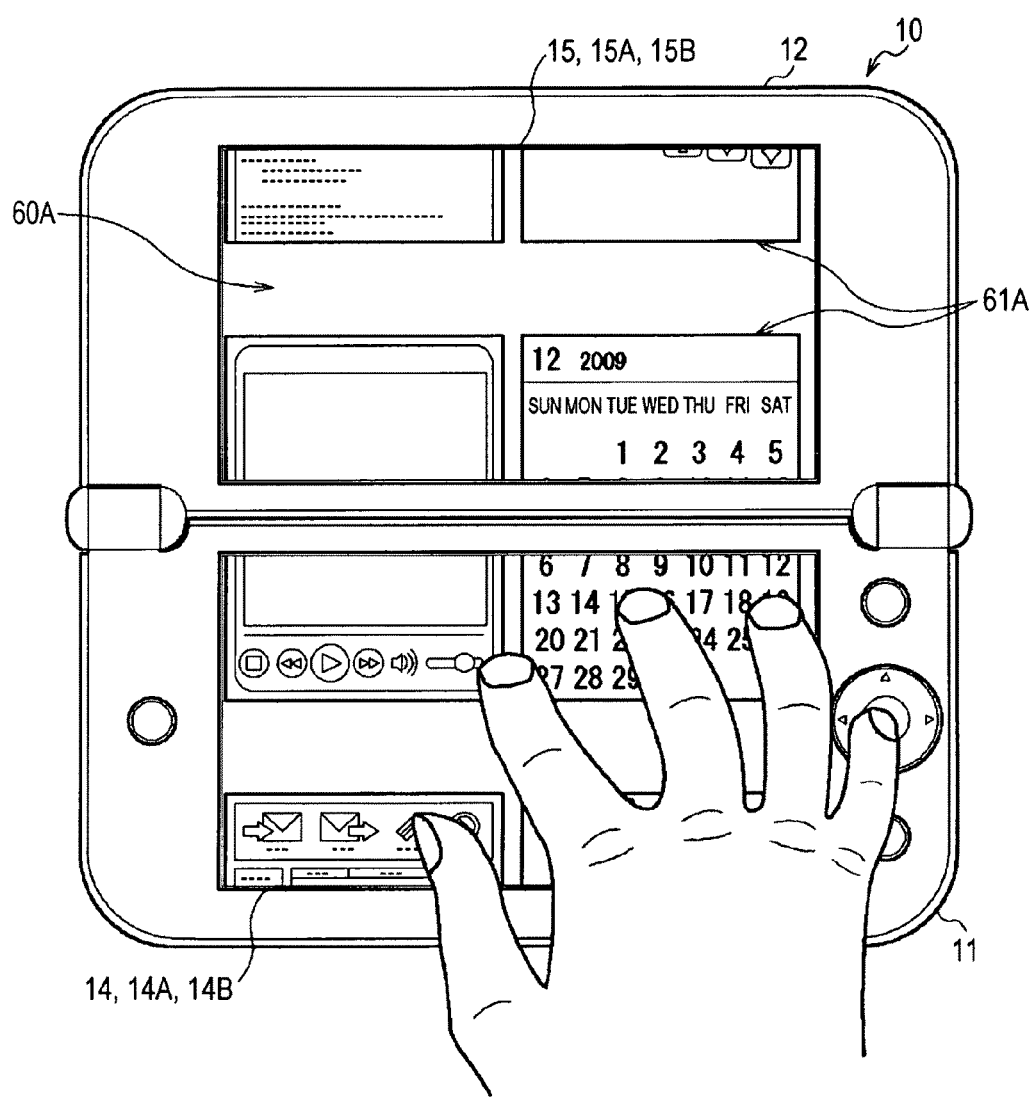
FIG. 31 is a diagram schematically illustrating a leftward scrolling of an enlarged thumbnail list image.

At this time, as shown in FIG. 31, the control section 20 relatively slowly performs the leftward scrolling of the enlarged thumbnail list image 60A which is displayed across the second liquid crystal display panel 15A to the first liquid crystal display panel 14A.

That is, if the finger moves close to the right edge section on the first manipulation surface of the first touch panel 14B, the control section 20 performs the leftward scrolling of the enlarged thumbnail list image 60A, to thereby sequentially display the right edge side of the enlarged thumbnail list image 60A.

Further, while at least one center position is included in the scroll-left instruction area SA4 (that is, while at least one finger is stationary on the scroll-left instruction area SA4), the control section 20 continues the leftward scrolling of the enlarged thumbnail list image 60A.

Accordingly, the control section 20 can perform the scrolling to a state where the right edge of the first liquid crystal display panel 14A and the second liquid crystal display panel 15A is finally matched with the right edge of the enlarged thumbnail list image 60A.

Hereinafter, the state where the right edges of the first liquid crystal display panel 14A and the second liquid crystal display panel 15A are matched with the right end of the enlarged thumbnail list image 60A is referred to as "final scroll-left display state".

If the enlarged thumbnail list image 60A is scrolled to the state of the final scroll-left display state, even though a finger is stationary on the scroll-left instruction area SA4 thereafter, the control section 20 negates the instruction of the leftward scrolling, to thereby forcibly stop the leftward scrolling.

Accordingly, if the enlarged thumbnail list image 60A is scrolled to the final scroll-left display state, the control section 20 can easily instruct the thumbnail 61A which is arranged in the right edge section of the enlarged thumbnail list image 60A.

If the plurality of fingers moves in the desired direction in a state where the enlarged thumbnail list image 60A is displayed, whenever the area detection process is performed, the control section 20 compares the detected center position with the position of the scroll-up instruction area SA1 and the position of the scroll-down instruction area SA2, in each case.

Further, in a similar way to the case described above with reference to FIGS. 21 and 22, if at least one finger covers the scroll-up instruction area SA1, the control section 20 scrolls up the enlarged thumbnail list image 60A.

Further, in a similar way to the case described above with reference to FIGS. 23 and 24, if at least one finger covers the scroll-down instruction area SA2, the control section 20 scrolls down the enlarged thumbnail list image 60A.

In this way, in a case where the entire enlarged thumbnail list image 60A is unable to be displayed across the second liquid crystal display panel 15A to the first liquid crystal display panel 14A, the control section 20 can appropriately scroll up, down, right or left the enlarged thumbnail list image 60A to be completely displayed.

While the finger covers the scroll-right instruction area SA3 and the scroll-left instruction area SA4 (if the proximity area is covered), the control section 20 stops the emphatic display of the thumbnail 61A.

While the finger covers the scroll-up instruction area SA1 and the scroll-down instruction area SA2 (if the proximity area is covered), the control section 20 stops the emphatic display of the thumbnail 61A.

Further, in a case where the enlarged thumbnail list image 60A is scrolled to displace the display area of the thumbnail 61A, in the selection image detection information, the control section 20 changes the display area information matched with the image identification information into the display area information indicating the position of the display area after displacement as the coordinates of the pixel positions.

Further, if the finger moves again and deviates from any one of the scroll-left instruction area SA4, the scroll-right instruction area SA3, the scroll-up instruction area SA1 and the scroll-down instruction area SA2, the control section 20 compares the center position of the attention area with the display area of the thumbnail 61A.

Accordingly, even if the enlarged thumbnail list image 60A is scrolled to change the display range, the control section 20 can accurately detect the thumbnail 61A with which the index finger is overlapped, as described above.

Accordingly, even if the enlarged thumbnail list image 60A is scrolled to change the display range, the control section 20 can emphatically display the thumbnail 61A with which the index finger is overlapped, as described above, and also can enlarge the thumbnail 61A and display it on the second liquid crystal display panel 15A.

Further, as described above, if it is detected that at least one inter-area distance is equal to or shorter than the narrowed interval change detection distance SL2 as one or plural inter-area distances are compared with the corresponding narrowed interval change detection distance SL2, the control section 20 recognizes that the reduction of the image is instructed.

At this time, the control section 20 detects a rectangular area covering all the plurality of proximity areas, as described above with reference to FIGS. 27A and 27B.

Further, the control section 20 detects the pixel position of the first liquid crystal display panel 14A, facing the center position of the area, as a display reference position for alignment of the display areas before and after reducing the thumbnail list image 60.

That is, if it is recognized that the reduction of the image is instructed, the control section 20 detects the display reference position when the reduced thumbnail list image 60 is displayed across the second liquid crystal display panel 15A to the first liquid crystal display panel 14A.

Further, at this time, the control section 20 detects a reference facing position facing the display reference position (hereinafter, referred to as "pre-reduction reference facing position"), in the thumbnail list image 60 which is displayed across the second liquid crystal display panel 15A to the first liquid crystal display panel 14A.

In addition, for example, in the reduced thumbnail list image obtained by reducing the thumbnail list image 60 by a preset reduction ratio, the control section 20 specifies a position (hereinafter, referred to as "post-reduction reference facing position) corresponding to the pre-reduction reference facing position.

Figure 32:
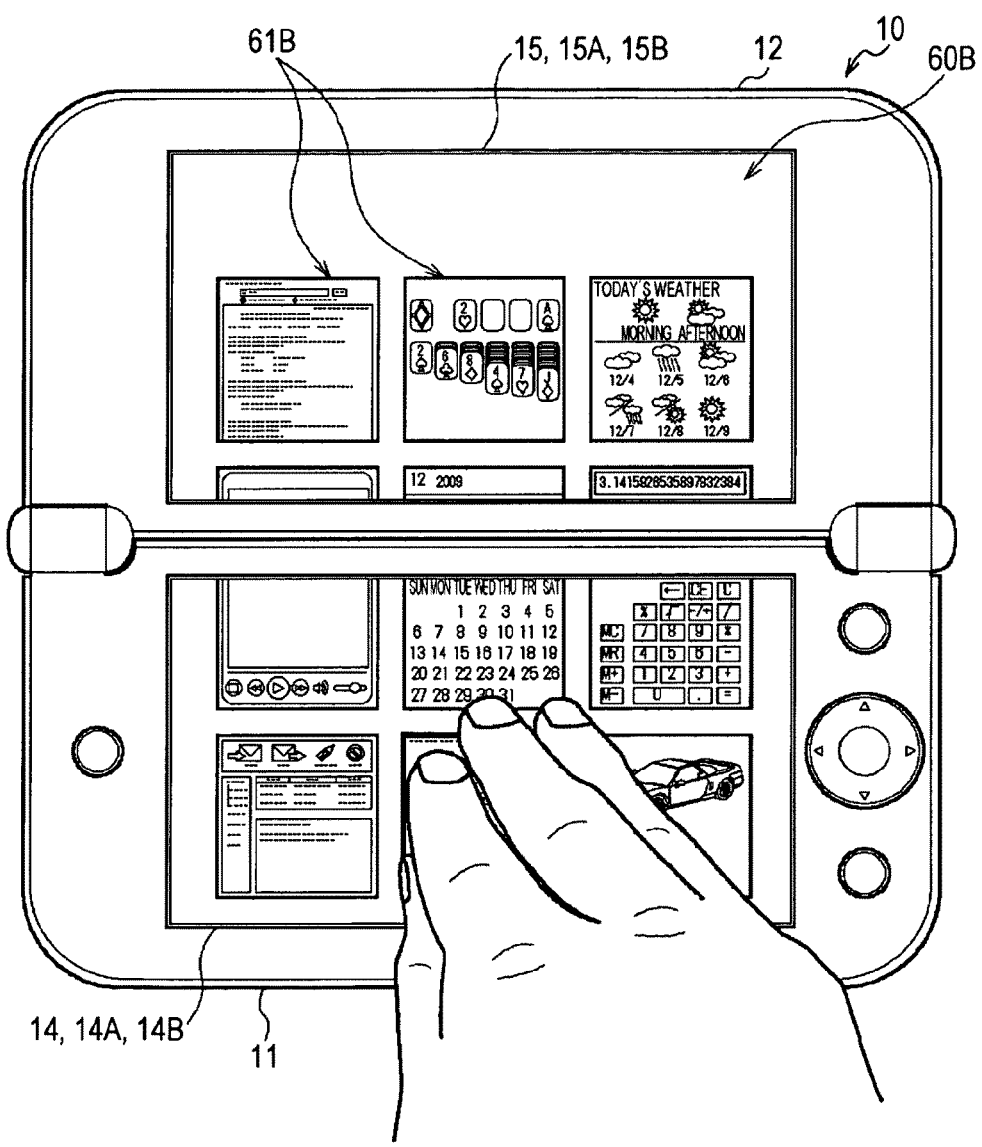
FIG. 32 is a diagram schematically illustrating a reduction of a thumbnail list image.

Further, as shown in FIG. 32, the control section 20 displays a reduced thumbnail list image 60B, instead of the thumbnail list image 60, across the second liquid crystal display panel 15A to the first liquid crystal display panel 14A so that the post-reduction reference facing position is matched with the display reference position.

Accordingly, compared with the case where the thumbnail list image 60 before reduction is displayed across the second liquid crystal display panel 15A to the first liquid crystal display panel 14A, the control section 20 increases the number of the thumbnails 61B which are displayed at a time, to thereby easily perform the comparison of more thumbnails 61B.

Further, at this time, the control section 20 reduces the thumbnail list image 60 as if it is zoomed centering on the proximity portions of the plurality of fingers, by matching the post-reduction reference facing position with the display reference position.

Accordingly, the display portions can be prevented from being significantly deviated immediately before and immediately after the reduction of the thumbnail list image 60, and thus, the control section 20 can also continuously display most of the thumbnail 61 which is displayed immediately before the reduction immediately after the reduction.

The control section 20 emphatically displays, immediately after the reduction, the thumbnail 61 which is emphatically displayed immediately before the reduction when the thumbnail list image 60 is reduced.

Here, in a case where the reduced thumbnail list image 60B is displayed, in the selection image detection information, the control section 20 changes the display area information matched with the image identification information into the display area information indicating the position of the display area of the reduced thumbnail 61B as the coordinates of the pixel positions.

Accordingly, in a case where the plurality of fingers moves in the desired direction in a state where the reduced thumbnail list image 60B is displayed, the control section 20 can detect the thumbnail 61B with which the attention area is overlapped (with which the index finger is overlapped), as described above.

Further, in a similar way to the case described above with reference to FIG. 19, in a state where the thumbnail 61B with which the attention area is overlapped is emphatically displayed, the control section 20 enlarges the thumbnail 61B and displays it on the entire display surface of the second liquid crystal display panel 15A while maintaining the display of the first liquid crystal display panel 14A as it is.

Further, in a state where the thumbnail list reduction image 60B is displayed, even in a case where the movement of the plurality of fingers stops, the control section 20 can detect the thumbnail 61B which is overlapped with (with which the index finger is overlapped) the attention area, as described above.

Further, while displaying the reduced thumbnail list image 60B across the first liquid crystal display panel 14A to the second liquid crystal display panel 15A at this time, the control section 20 emphatically displays the thumbnail 61B with which the attention area is overlapped.

On the other hand, in a similar way to the case described above with reference to FIG. 29, while the reduced thumbnail list image 60B is being displayed, the control section 20 sets the scroll-right instruction area SA3 and the scroll-left instruction area SA4 in the left and right edge sections of the first touch panel 14B.

Accordingly, while the reduced thumbnail list image 60B is being displayed, the control section 20 detects whether the plurality of fingers moves in the desired direction.

Further, if it is detected that the plurality of fingers moves in the desired direction, whenever the area detection process is performed to detect the plurality of center positions while the plurality of fingers are moving, the control section 20 compares the detected plurality of center positions with the position of the scroll-right instruction area SA3.

Further, whenever the area detection process is performed to detect the plurality of center positions while the plurality of fingers is moving, the control section 20 compares the detected plurality of center positions with the position of the scroll-left instruction area SA4.

As a result, if all the plurality of center positions is not included in any of the scroll-right instruction area SA3 and the scroll-left instruction area SA4, the control section 20 does not determine that the rightward scrolling and the leftward scrolling for the image are instructed.

In this respect, for example, if at least one center position is included in the scroll-right instruction area SA3 (that is, if at least one finger covers the scroll-right instruction area SA3), the control section 20 detects that the rightward scrolling for the image is instructed.

At this time, in a similar way to the case described above with reference to FIG. 30, the control section 20 scrolls rightward the reduced thumbnail list image 60B which is displayed across the second liquid crystal display panel 15A to the first liquid crystal display panel 14A.

Accordingly, if the reduced thumbnail list image 60B is scrolled rightward, the control section 20 can easily instruct the thumbnail 61B which is arranged in the left edge section of the reduced thumbnail list image 60B.

Further, for example, if at least one center position is included in the scroll-left instruction area SA4 (that is, if at least one finger covers the scroll-left instruction area SA4), the control section 20 detects that the leftward scrolling for the image is instructed.

At this time, in a similar way to the case described above with reference to FIG. 31, the control section 20 scrolls leftward the reduced thumbnail list image 60B which is displayed across the second liquid crystal display panel 15A to the first liquid crystal display panel 14A.

Accordingly, if the reduced thumbnail list image 60B is scrolled leftward, the control section 20 can easily instruct the thumbnail 61B which is arranged in the right edge section of the reduced thumbnail list image 60B.

Further, if the plurality of fingers moves in the desired direction in a state where the reduced thumbnail list image 60B is displayed, whenever the area detection process is performed, the control section 20 compares the detected center positions with the position of the scroll-up instruction area SA1 and the position of the scroll-down instruction area SA2, in each case.

Further, in a similar way to the case described above with reference to FIGS. 21 and 22, if at least one finger covers the scroll-up instruction area SA1, the control section 20 scrolls upward the reduced thumbnail list image 60B.

Further, in a similar way to the case described above with reference to FIGS. 23 and 24, if at least one finger covers the scroll-down instruction area SA2, the control section 20 scrolls downward the reduced thumbnail list image 60B.

In this way, in a case where the entire reduced thumbnail list image 60B is not displayed across the second liquid crystal display panel 15A to the first liquid crystal display panel 14A, the control section 20 can appropriately scrolling up, down, right or left the reduced thumbnail list image 60B to be completely displayed.

While the finger covers the scroll-right instruction area SA3 and the scroll-left instruction area SA4 (while the proximity area is covered), the control section 20 stops the emphatic display of the thumbnail 61B.

Further, while the finger covers the scroll-up instruction area SA1 and the scroll-down instruction area SA2 (while the proximity area is covered), the control section 20 also stops the emphatic display of the thumbnail 61B.

Further, if the reduced thumbnail list image 60B is scrolled to displace the display area of the thumbnail 61B, in the selection image detection information, the control section 20 changes the display area information matched with the image identification information into the display area information indicating the position of the display area after displacement as the coordinates of the pixel positions.

Further, if the finger moves again and deviates from any of the scroll-left instruction area SA4, the scroll-right instruction area SA3, the scroll-up instruction area SA1 and the scroll-down instruction area SA2, the control section 20 compares the center position of the attention area with the display area of the thumbnail 61B.

Thus, even if the reduced thumbnail list image 60B is scrolled to change the display range, the control section can accurately detect the thumbnail 61B with which the index finger is overlapped as described above.

Accordingly, even if the reduced thumbnail list image 60B is scrolled to change the display range, the control section 20 can emphatically display the thumbnail 61B with which the index finger is overlapped as described above, and can enlarge the thumbnail 61B and display it on the second liquid crystal display panel 15A.

In addition, if the enlarged thumbnail list image 60A is displayed, whenever the area detection process is performed during the display, the control section 20 detects the inter-area distance of two neighboring proximity areas, on the basis of the center position detected together with the plurality of proximity areas.

Further, whenever the area detection process is performed, the control section 20 compares the inter-area distance of two neighboring proximity areas with the corresponding extended interval change detection distance SL1 and narrowed interval change detection distance SL2.

As a result, if it is detected that at least one inter-area distance is longer than the corresponding narrowed interval change detection distance SL2 and is shorter than the corresponding extended interval change detection distance SL1, the control section 20 recognizes that the reduction of the image is instructed.

At this time, in a similar way to the case described above with reference to FIGS. 27A and 27B, the control section 20 detects a rectangular area covering all the plurality of proximity areas.

Further, the control section 20 detects the pixel position of the first liquid crystal display panel 14A, facing the center position of the area as a display reference position for alignment of the display positions before and after reducing the enlarged thumbnail list image 60A.

That is, if it is recognized that the reduction of the image is instructed in a state where the enlarged thumbnail list image 60A is displayed, the control section 20 detects the display reference position when the enlarged thumbnail list image 60A is reduced and displayed across the second liquid crystal display panel 15A to the first liquid crystal display panel 14A.

Further, at this time, the control section 20 detects the pre-reduction reference facing position facing the display reference position, in the enlarged thumbnail list image 60A which is displayed across the second liquid crystal display panel 15A to the first liquid crystal display panel 14A.

In addition, for example, the control section 20 reduces the enlarged thumbnail list image 60A to the original display size, to thereby specify the post-reduction reference facing position corresponding to the pre-reduction reference facing position, in the thumbnail list image 60 which is obtained as a result.

Further, the control section 20 displays the original thumbnail list image 60 (before enlargement), instead of the enlarged thumbnail list image 60A, across the second liquid crystal display panel 15A to the first liquid crystal display panel 14A so that the post-reduction reference facing position is matched with the display reference position.

In this way, even if the thumbnail list image 60 which is displayed across the second liquid crystal display panel 15A to the first liquid crystal display panel 14A is enlarged, the control section 20 can appropriately reduce the enlarged thumbnail list image 60 to the original display size for display.

Furthermore, if the reduced thumbnail list image 60B is displayed, whenever the area detection process is performed during the display, the control section 20 detects the inter-area distance of two neighboring proximity areas, on the basis of the center position detected together with the plurality of proximity areas.

Further, whenever the area detection process is performed, the control section 20 compares the inter-area distance of two neighboring proximity areas with the corresponding extended interval change detection distance SL1 and narrowed interval change detection distance SL2.

As a result, if it is detected that at least one inter-area distance is shorter than the corresponding extended interval change detection distance SL1 and is longer than the corresponding narrowed interval change detection distance SL2, the control section 20 recognizes that the enlargement of the image is instructed.

At this time, in a similar way to the case described above with reference to FIGS. 27A and 27B, the control section 20 detects a rectangular area covering all the plurality of proximity areas.

Further, the control section 20 detects the pixel position of the first liquid crystal display panel 14A, facing the center position of the area, as a display reference position for alignment of the display positions before and after enlarging the reduced thumbnail list image 60B.

That is, if it is recognized that the enlargement of the image is instructed in a state where the reduced thumbnail list image 60B is displayed, the control section 20 detects the display reference position when the reduced thumbnail list image 60B is enlarged and displayed across the second liquid crystal display panel 15A to the first liquid crystal display panel 14A.

Further, at this time, the control section 20 detects the pre-enlargement reference facing position facing the display reference position in the reduced thumbnail list image 60B which is displayed across the second liquid crystal display panel 15A to the first liquid crystal display panel 14A.

In addition, for example, the control section 20 enlarges the reduced thumbnail list image 60B to the original display size, to thereby specify the post-enlargement reference facing position corresponding to the pre-enlargement reference facing position, in the thumbnail list image 60 which is obtained as a result.

Further, the control section 20 displays the original thumbnail list image 60 (before reduction), instead of the reduced thumbnail list image 60B, across the second liquid crystal display panel 15A to the first liquid crystal display panel 14A so that the post-enlargement reference facing position is matched with the display reference position.

Accordingly, even if the thumbnail list image 60 which is displayed across the second liquid crystal display panel 15A to the first liquid crystal display panel 14A is reduced, the control section 20 can appropriately return the reduced thumbnail list image 60 to the original display size for display.

In this way, the control section 20 approximately changes the display state of the thumbnail list image 60 across the second liquid crystal display panel 15A to the first liquid crystal display panel 14A for display, to thereby allow the user to confirm the launch images using the plurality of thumbnails 61 in the thumbnail list image 60.

Figure 33:
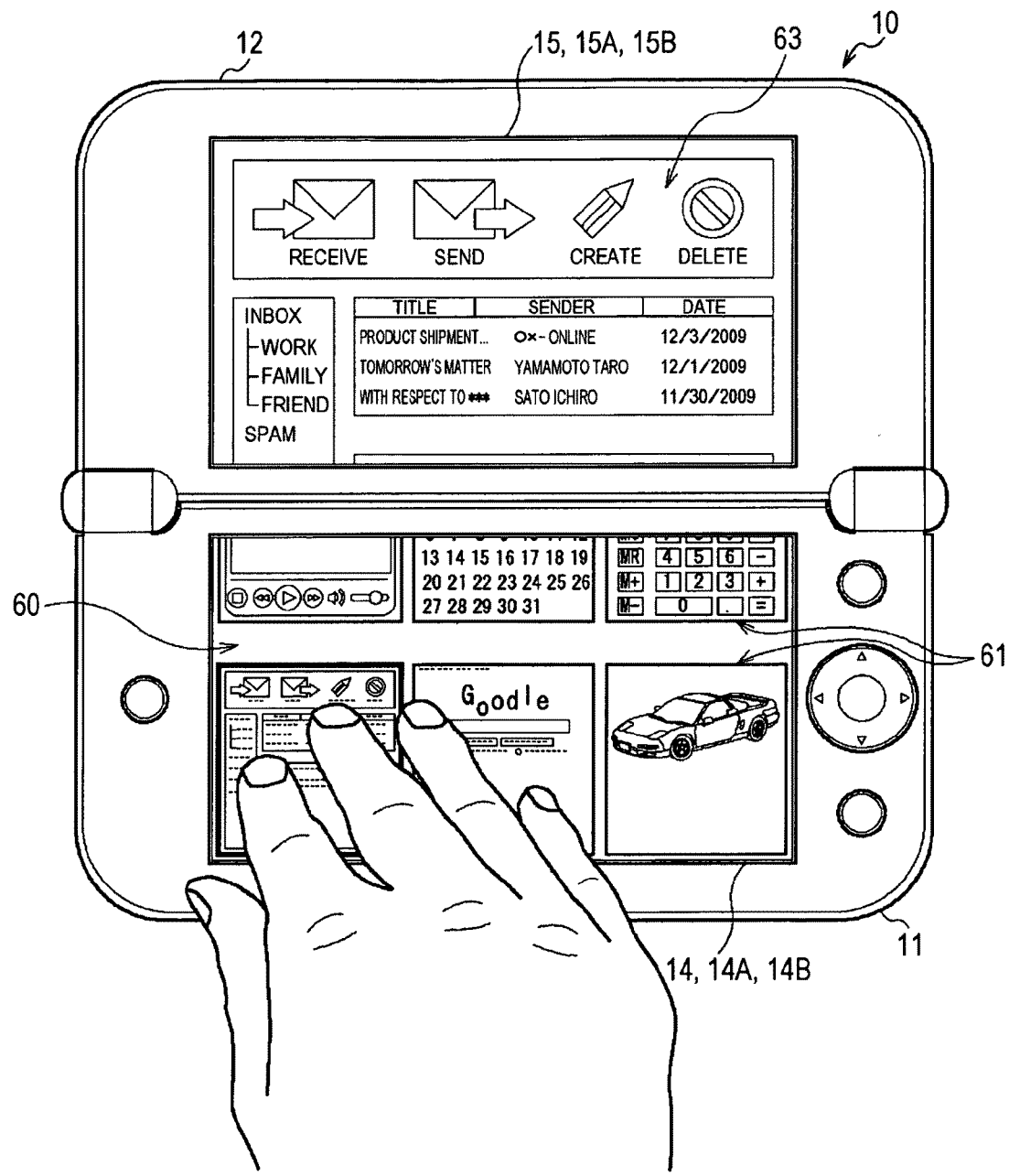
FIG. 33 is a diagram schematically illustrating a first selection of a launch image by means of an instruction of a thumbnail.

Further, as shown in FIG. 33, if the tap manipulation is performed by the index finger subsequent to the proximity manipulation using the plurality of fingers in a state where the thumbnail list image 60 (enlarged thumbnail list image 60A or reduced thumbnail list image 60B) is displayed, the control section 20 detects the tap instruction position.

At this time, by sequentially comparing the tap instruction position with the plurality of display areas included in the above-described selection image detection information, the control section 20 detects the display area including the tap instruction position from the plurality of display areas.

Accordingly, the control section 20 detects a launch image 63 (launch image recognized using image identification information matched with the display area including the tap instruction position) which is selected by the tap manipulation on the thumbnail list image 60 (enlarged thumbnail list image 60A or reduced thumbnail list image 60B).

Figure 34:
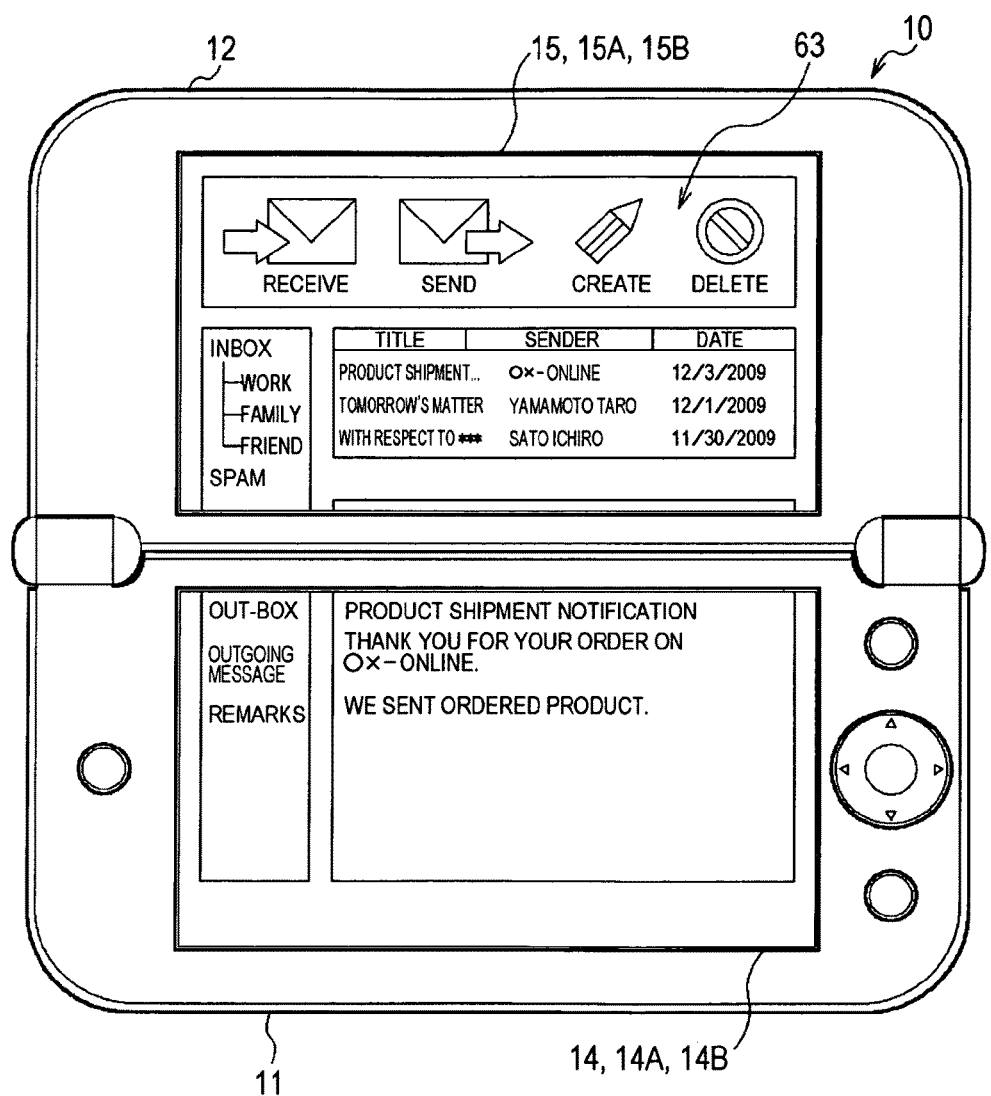
FIG. 34 is a diagram schematically illustrating a display of a launch image selected by an instruction of a thumbnail.

Further, as shown in FIG. 34, if the launch image 63 is detected in this way, the control section 20 terminates the display of the thumbnail list image 60 across the second liquid crystal display panel 15A to the first liquid crystal display panel 14A.

Further, the control section 20 displays the launch image 63 on at least one of the first liquid crystal display panel 14A and the second liquid crystal display panel 15A, according to the display size of the launch image 63.

Figure 35:
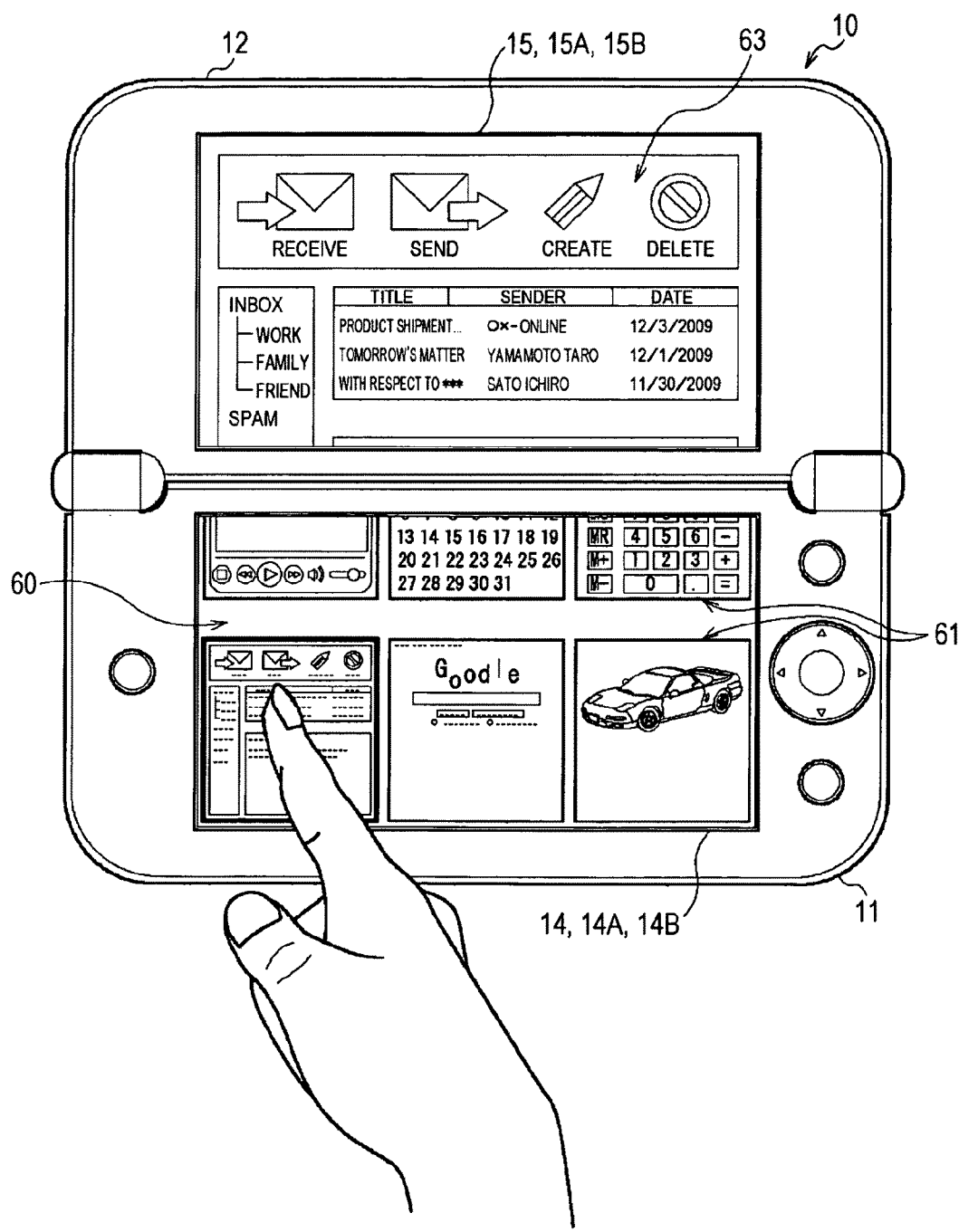
FIG. 35 is a diagram schematically illustrating a second selection of a launch image by means of an instruction of a thumbnail.

Further, as shown in FIG. 35, even if the tap manipulation is performed by one finger subsequent to the proximity manipulation using one finger in a state where the thumbnail list image 60 (enlarged thumbnail list image 60A and reduced thumbnail list image 60B) is displayed, the control section 20 detects the tap instruction position.

At this time, the control section 20 detects the display area including the tap instruction position from the plurality of display areas, by sequentially comparing the tap instruction position with the plurality of display areas included in the above-described selection image detection information.

Accordingly, the control section 20 detects the launch image 63 (launch image recognized using image identification information matched with the display area including the tap instruction position) which is selected by the tap manipulation on the thumbnail list image 60 (enlarged thumbnail list image 60A and reduced thumbnail list image 60B).

Further, in a similar way to the case described above with reference to FIG. 34, the control section 20 terminates the display of the thumbnail list image 60 across the second liquid crystal display panel 15A to the first liquid crystal display panel 14A.

Further, the control section 20 displays the launch image 63 on at least one of the first liquid crystal display panel 14A and the second liquid crystal display panel 15A, according to the display size of the launch image 63.

In this way, if the proximity manipulation is performed, the control section 20 can display the thumbnail list image 60 across the second liquid crystal display panel 15A to the first liquid crystal display panel 14A, and can allow the user to select a desired launch image on the thumbnail list image 60 as the thumbnail 61.

If the tap manipulation is performed by the finger close to the first manipulation surface and the launch image is displayed, subsequent to the proximity manipulation, the control section 20 determines that the proximity manipulation is terminated. Further, even if all the fingers are at a distance beyond the proximity detection distance range from the first manipulation surface, the control section 20 displays the launch image as it is.

That is, if the tap manipulation is performed for the first manipulation surface subsequent to the proximity manipulation, the control section 20 displays the launch image across the second liquid crystal display panel 15A to the first liquid crystal display panel 14A and terminates the proximity manipulation.

On the other hand, even if it is determined that the proximity manipulation is performed as described above, if all the fingers close to the first manipulation surface are at a distance beyond the proximity detection distance range from the first manipulation surface before the desired launch image is selected through the tap manipulation, the control section also determines that the proximity manipulation is terminated at this time.

That is, in a case where the instruction of the launch image is given even if the proximity manipulation is performed to display the thumbnail list image 60, the control section 20 only has to move the finger away from the first manipulation surface without performing any special manipulation, to thereby easily terminate the proximity manipulation.

Further, if it is determined that the finger moves away from the first manipulation surface and the proximity manipulation is terminated, the control section 20 terminates the display of the thumbnail list image 60 across first liquid crystal display panel 14A from the second liquid crystal display panel 15A at this time.

Further, at this time, the control section 20 returns the display across the second liquid crystal display panel 15A to the first liquid crystal display panel 14A to a state immediately before the proximity manipulation is performed.

In addition, for example, even if a certain finger among the plurality of fingers moves outside the first manipulation surface and a part of the proximity area is unable to be detected during the proximity manipulation, if the proximity areas of one or more fingers among the plurality of fingers are continuously detected, the control section 20 determines that the proximity manipulation is continued.

Accordingly, even if a part of the plurality of fingers moves outside the first manipulation surface, for example, when the scrolling is instructed in the proximity manipulation, the control section 20 can prevent the proximity manipulation from being stopped unnecessarily, and thus, can continue the proximity manipulation to thereby select the desired launch image.

On the other hand, if one or plural proximity areas are detected when the proximity is started, in a state where the reproduction image 46 is displayed and the proximity area and the touch area are not detected at all, the control section 20 starts to measure the proximity time by the timer, as described above.

Further, if one or plural proximity areas are detected when the proximity time is started in this way, in this case, the control section 20 also starts the detection of the movement trace of each finger, using the center positions of the proximity areas as starting points of the movement traces, respectively, as described above.

If one or plural proximity areas are additionally detected when the proximity is started using one or plurality of fingers until the proximity time reaches the proximity manipulation detection time, the control section 20 also starts to detect the movement trace of each finger using the center positions of one or plural proximity areas as the starting points of the movement traces, respectively.

Further, if the measurement of the proximity time is started, while the detection is being performed so as to sequentially trace at least one proximity area without detecting the touch area as described above, the control section 20 continues to measure the proximity time.

Here, if before the proximity time reaches the proximity manipulation detection time, the touch area is detected and all the fingers move away beyond the proximity detection distance range from the first manipulation surface to terminate the measurement of the proximity time, the control section 20 also determines that the proximity manipulation is not performed for the first manipulation surface at this time.

In this respect, if the measured proximity time reaches the proximity manipulation detection time, as described above, the control section 20 determines whether all the movement traces detected thus far fall within the proximity manipulation detection range centering on the corresponding starting points (center positions) as described above.

As a result, if all the movement traces detected thus far extend outside the proximity manipulation detection range from the corresponding starting points when the proximity time reaches the proximity manipulation detection time, the control section 20 determines whether the proximity manipulation is not performed for the first manipulation surface, as described above.

Figure 36:
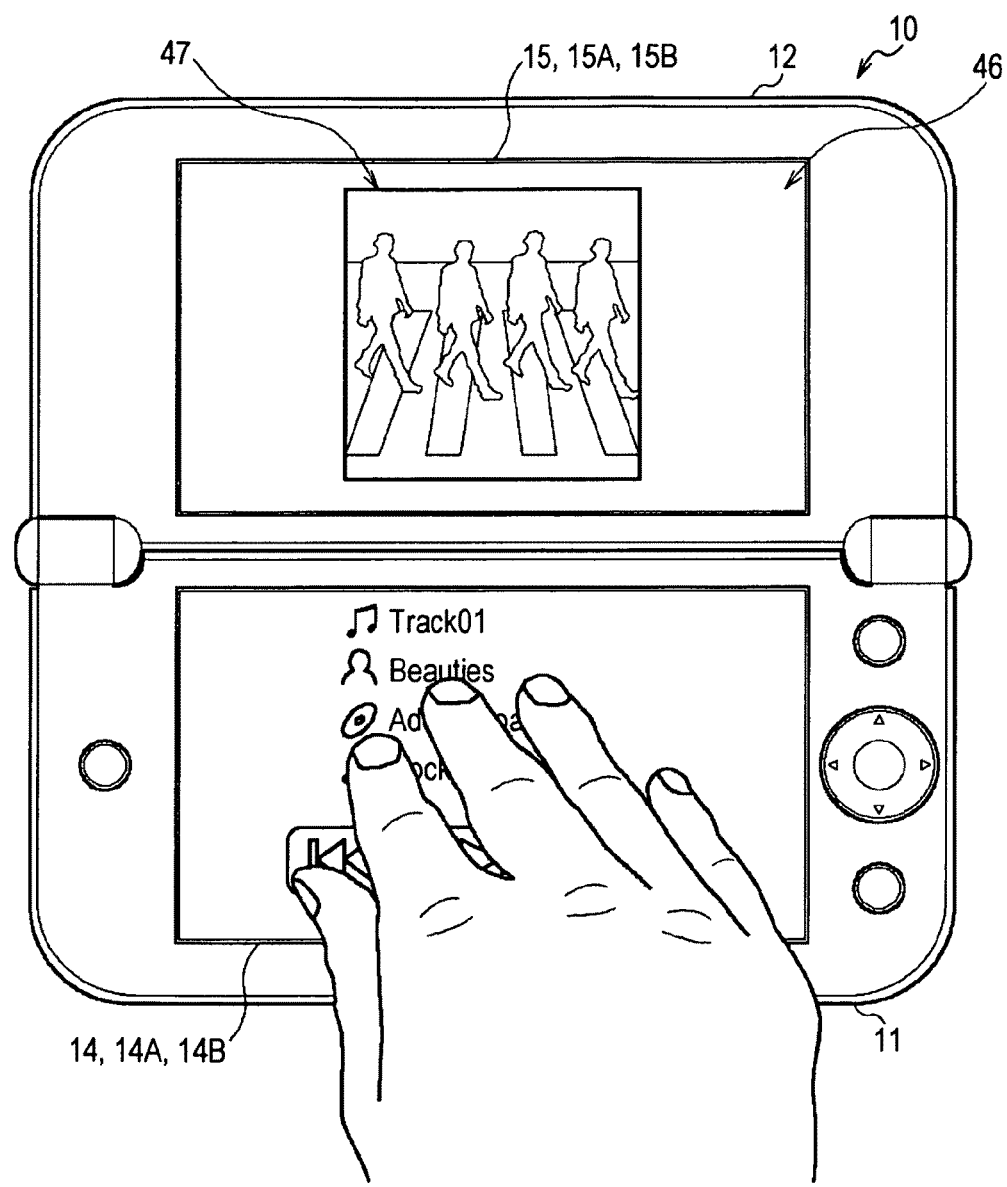
FIG. 36 is a diagram schematically illustrating a proximity manipulation performed when a reproduced image is displayed.

In this respect, as shown in FIG. 36, if at least one movement trace falls within proximity manipulation detection range when the proximity time reaches the proximity manipulation detection time, the control section 20 determines whether the proximity manipulation is performed for the first manipulation surface, as described above.

Accordingly, even in a case where the reproduced image 46 is displayed, the control section 20 can obviously distinguish the proximity manipulation from the touch manipulation such as a tap manipulation or sliding manipulation and can detect that the proximity manipulation is performed for the first manipulation surface.

Further, the control section 20 determines that the proximity areas detected at the proximity manipulation detection time are all based on the current proximity manipulation.

Thus, even though the plurality of proximity areas starts to be detected through the plurality of fingers to be slightly shifted in terms of time until the proximity time reaches the proximity manipulation detection time, the control section 20 can detect the plurality of proximity areas as proximity areas by means of one proximity manipulation at the proximity manipulation detection time.

If it is determined that the proximity manipulation is performed, the control section 20 generates image data on the track list image 44 for presenting the track title of the music data to be currently reproduced (music data to be reproduced indicated by the reproduced image 46 which is being displayed at this time) as the track icon 45.

Hereinafter, the music data to be reproduced at the proximity manipulation detection time is referred to as "detection time reproduction target data".

Figure 37:
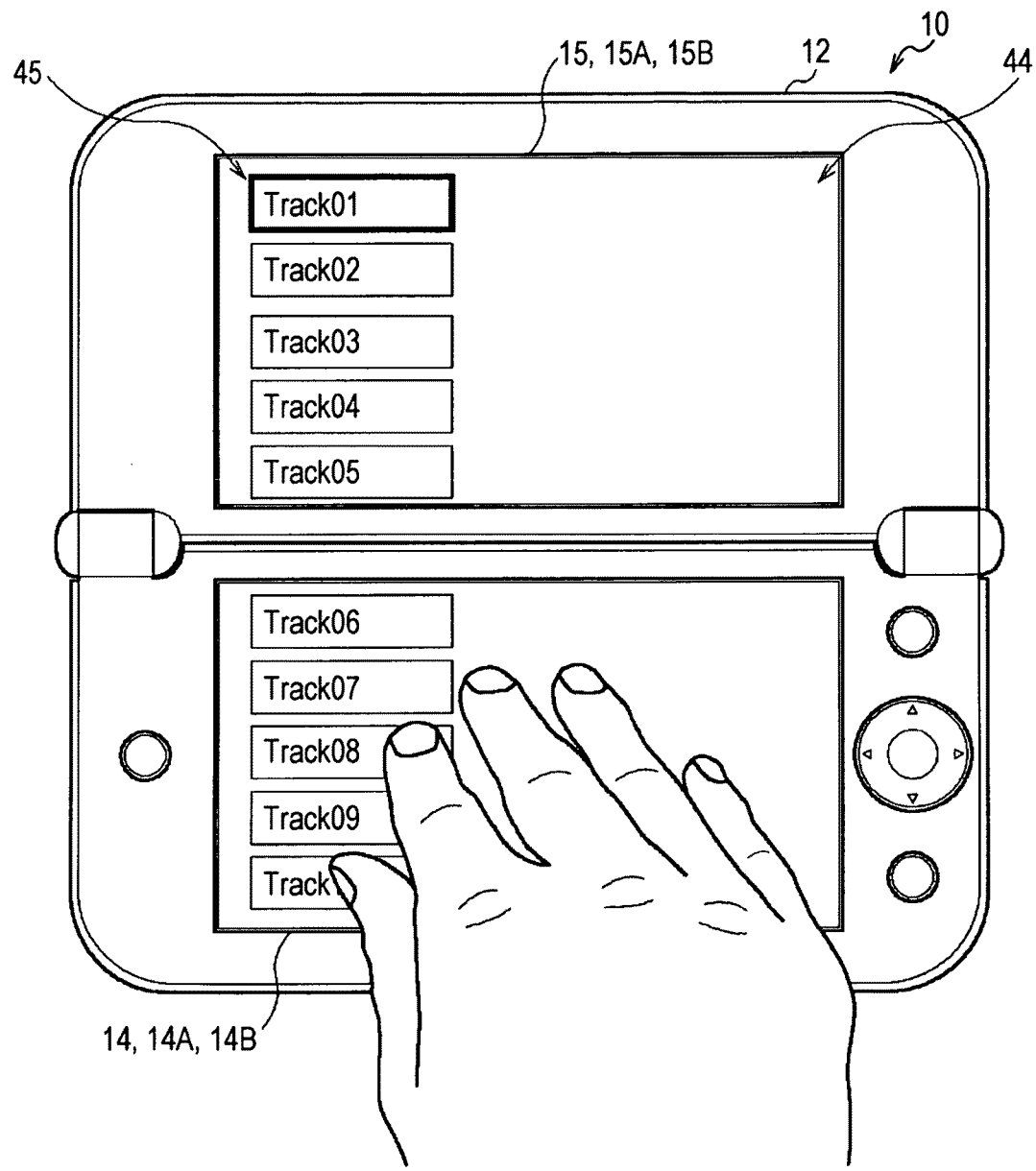
FIG. 37 is a diagram schematically illustrating a display of a track list image according to a proximity manipulation.

Further, as shown in FIG. 37, the control section 20 displays the track list image 44 based on the image data, instead of the reproduced image 46, across the second liquid crystal display panel 15A to the first liquid crystal display panel 14A.

That is, the control section 20 displays the track list image 44 (one layer higher than the reproduced image 46) indicating the music titles of all music data (including the detection time reproduction target data) in an album in which the detection time reproduction target data is recorded.

The reproduced image 46 represents information on the music data when the music data to be reproduced is selected by a user.

Here, with respect to the reproduced image 46, if a reproduction process is performed until the proximity manipulation is performed from the selection of the music data to be reproduced and other music data which is different from the music data to be reproduced is reproduced, its contents are updated so as to represent information on the other music data.

Accordingly, at this time, the control section 20 may display again the track list image 44 which has been already displayed when the music data to be reproduced is selected by the user, instead of the reproduced image 46.

Further, at this time, the control section 20 may display a track list image of the display contents other than the track list image 44 which has been displayed when the music data to be reproduced is selected by the user, instead of the reproduced image 46.

If the track list image 44 is displayed in this way, the control section 20 emphatically displays the track icon 45 indicating the track title of the detection time reproduction target data among the plurality of track icons 45 in the track list image 44, as described above.

Further, at this time, in a similar way to the case described above with reference to FIG. 11, the control section 20 stores the arrangement area information for each track icon 45 and the track information matched with the arrangement area information as the selection track detection information in the RAM 22.

Further, in a similar way to the case where the above-described thumbnail list image 60 is displayed, the control section 20 sets the attention area among one or plural proximity areas which are detected at this time.

Further, at this time, in a similar way to the case where the above-described thumbnail list image 60 is displayed, the control section 20 detects the movement traces of one or plural fingers close to the first manipulation surface, and also determines whether one or plural fingers move in the desired direction, on the basis of the detected movement traces.

As a result, if it is determined that one or plural fingers move in the desired direction, the control section 20 detects the arrangement area with which the attention area (index finger) is overlapped during the movement, and appropriately changes the track icon 45 to be emphatically displayed.

Further, the control section 20 enlarges the track icon 45 which is emphatically displayed and displays it on the second liquid crystal display panel 15A, while maintaining the display of the first liquid crystal display panel 14A as it is.

Further, in a case where the track list image 44 is displayed in this way, in a similar way to the case where the above-described thumbnail list image 60 is displayed, the control section 20 can scroll up or down the track list image 44, according to the movement of the finger.

Furthermore, at this time, if the proximity manipulation is performed by the plurality of fingers, in a similar way to the case where the above-described thumbnail list image 60 is displayed, the control section 20 can enlarge or reduce the track list image 44 for display, according to the change in the interval of the fingers.

Further, when the track list image 44 is enlarged or reduced in this way, in a similar way to the case where the above-described thumbnail list image 60 is displayed, the control section 20 can scroll up, down, right or left the track list image 44, according to the movement of the fingers.

Further, when the track list image 44 is scrolled to be enlarged or reduced, the control section 20 changes the contents of the selection track detection information.

Accordingly, even though the arrangement position of the track icon 45 is displaced and the size thereof is changed, the control section 20 can detect the track icon 45 with which the finger is overlapped, to thereby perform the emphatic display and enlargement display.

In this way, even in a case where the track list image 44 is displayed according to the proximity manipulation, in a similar way to the case where the above-described thumbnail list image 60 is displayed, the control section 20 can change the display state of the track list image 44.

Figure 38:
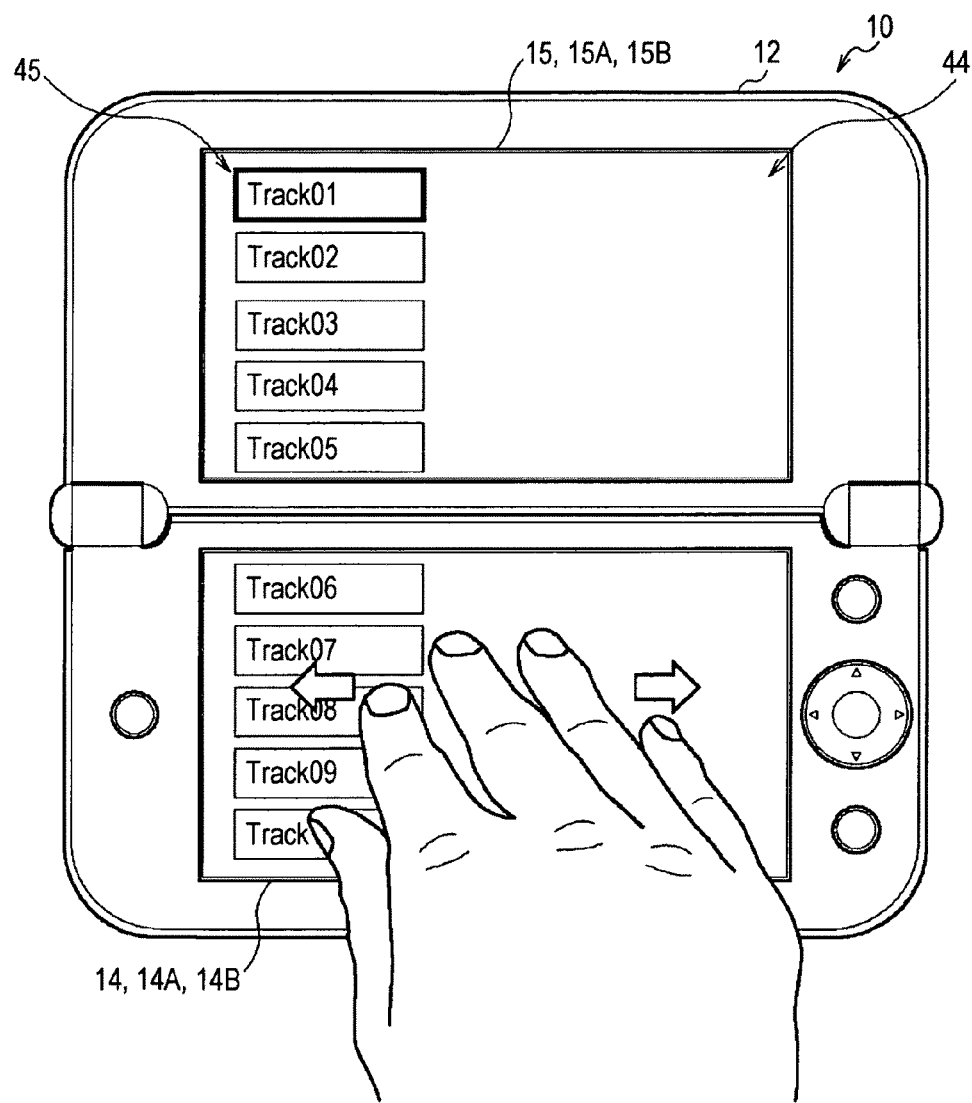
FIG. 38 is a diagram schematically illustrating a proximity manipulation for switching a display in an image of a desired layer.

In addition, as shown in FIG. 38, in a case where one or plural fingers move in the desired direction in the proximity manipulation, in a state where the track list image 44 is displayed in this way, for example, the control section 20 detects the time from the start of the movement to the end thereof and the movement direction, on the basis of the movement trace.

Further, on the basis of the movement time and movement direction, for example, the control section 20 detects whether one or plural fingers alternately move (that is, reciprocate) in one direction in a predetermined instruction detection time which is relatively short, for example, preset 2 to 3 sec and in the other direction opposite thereto.

As a result, if it is detected that one or plural fingers reciprocate, the control section 20 recognizes that a display of any one of the genre list image 35, the artist list image 38 and the album list image 41 is instructed, according to the reciprocation times thereof.

The control section 20 does not particularly define one direction and the other direction for reciprocating the fingers, whereas the control section 20 defines the time from the start of the movement fingers to the end thereof (that is, necessitates the same sense speed as the speed of the flick manipulation in the movement of the fingers), for such a reciprocation movement.

Accordingly, if the movement stops within the instruction detection time from the start of the movement of one or plural fingers, even though one or plural fingers alternately move in any one of the up and down direction, the left and right direction, an inclined direction (right-up direction and left-down direction or the like) and the like, the control section 20 determines that one or plural fingers reciprocate.

Actually, if it is detected that one or plural fingers rapidly reciprocate in one direction and the other direction once, the control section 20 recognizes that the display of the genre list image 35 corresponding to the classification of the first layer of the plurality of pieces of music data is instructed.

Figure 39:
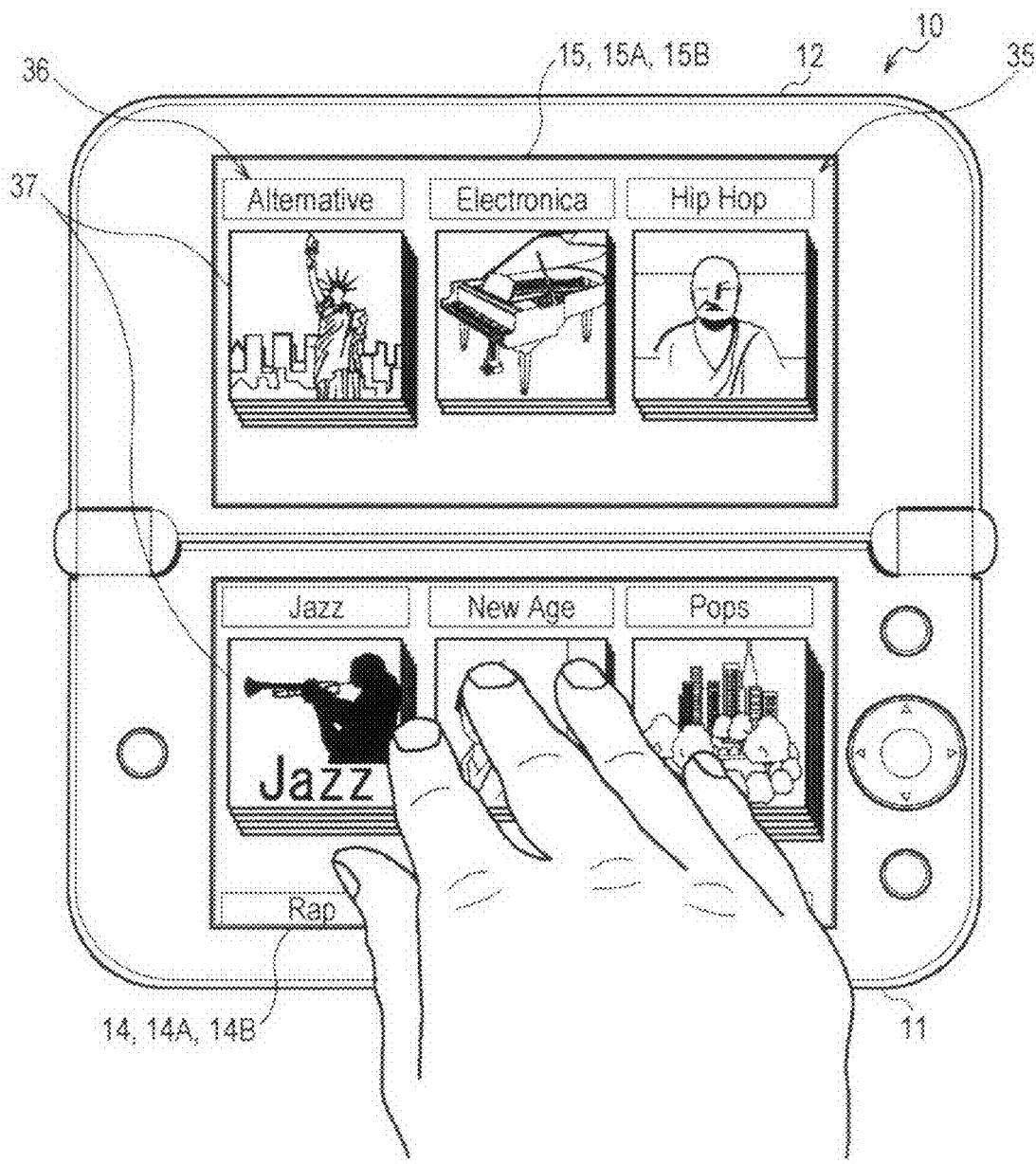
FIG. 39 is a diagram schematically illustrating a display of a genre list image according to a proximity manipulation.

At this time, in a similar way to the case described above with reference to FIG. 8, the control section 20 generates image data of the genre list image 35. Further, as shown in FIG. 39, the control section 20 displays the genre list image 35 based on the image data, instead of the track list image 44, across the second liquid crystal display panel 15A to the first liquid display panel 14A.

That is, at this time, the control section 20 displays the genre list image 35 (in the highest layer which is four layers higher than the reproduced image 46) indicating the classification based on the genre of the plurality of pieces of music data.

Further, if it is detected that one or plural fingers rapidly reciprocate in one direction and the other direction two times, the control section 20 recognizes that the display of the artist list image 38 corresponding to the classification of the second layer of the plurality of pieces of music data is instructed.

At this time, in a similar way to the case described above with reference to FIG. 9, the control section 20 generates image data on the artist list image 38 indicating the classification according to the artist of the plurality of pieces of music data in the genre including the detection time reproduction target data.

Figure 40:
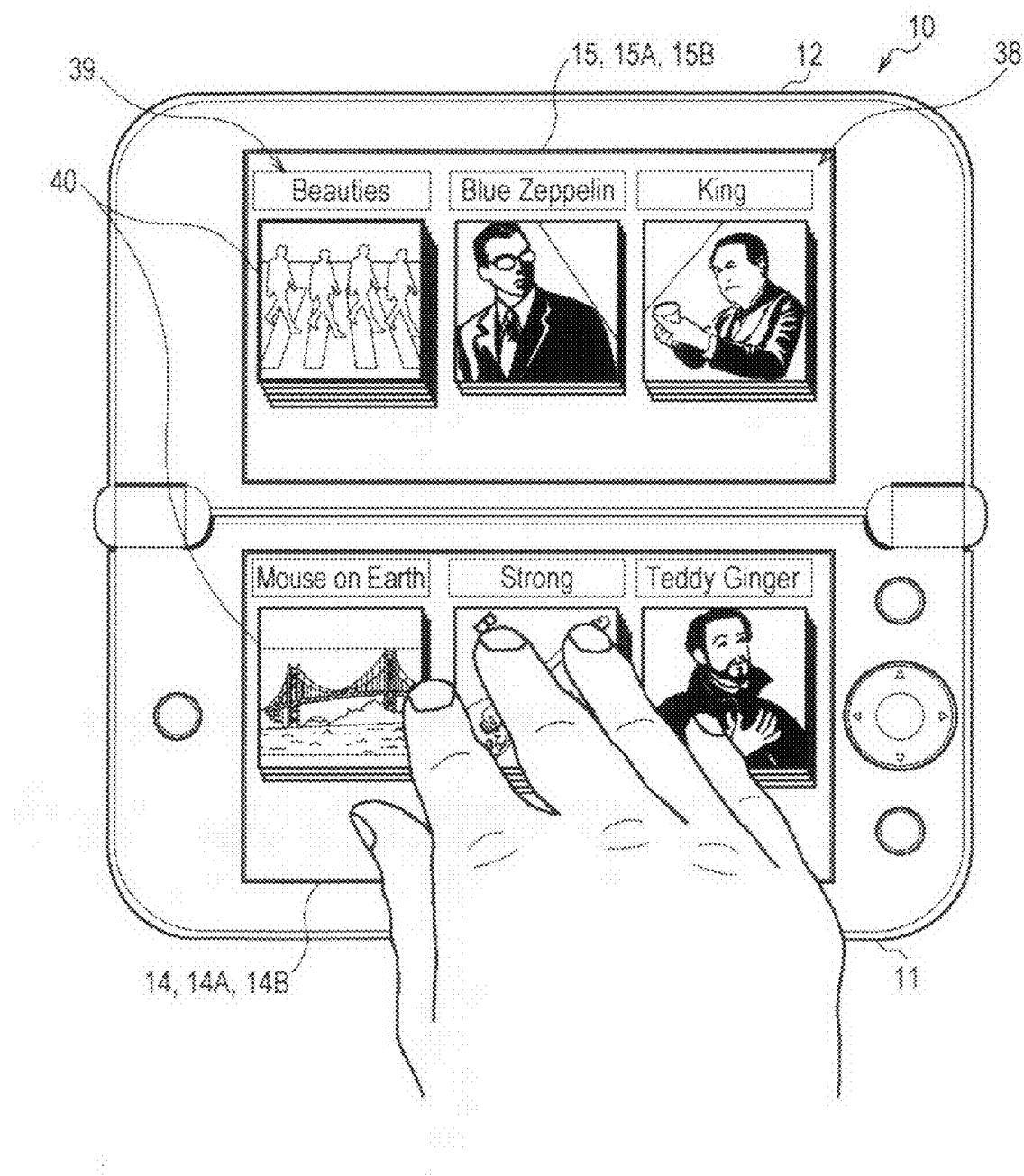
FIG. 40 is a diagram schematically illustrating a display of an artist list image according to a proximity manipulation.

Further, as shown in FIG. 40, the control section 20 displays the artist list image 38 based on the image data, instead of the track list image 44, across the second liquid crystal display panel 15A to the first liquid crystal display panel 14A.

That is, at this time, the control section 20 displays the artist list image 38 (which is three layers higher than the reproduced image 46) indicating all artists (all artists who release music data included in the genre) corresponding to the genre of the detection time reproduction target data.

Further, if it is detected that one or plural fingers rapidly reciprocate in one direction and the other direction three times, the control section 20 recognizes that the display of the album list image 41 corresponding to the classification of the third layer of the plurality of pieces of music data is instructed.

At this time, in a similar way to the case described above with reference to FIG. 10, the control section 20 generates image data on the album list image 41 indicating the classification according to the album of the plurality of pieces of music data released by the artist of the detection time reproduction target data.

Figure 41:
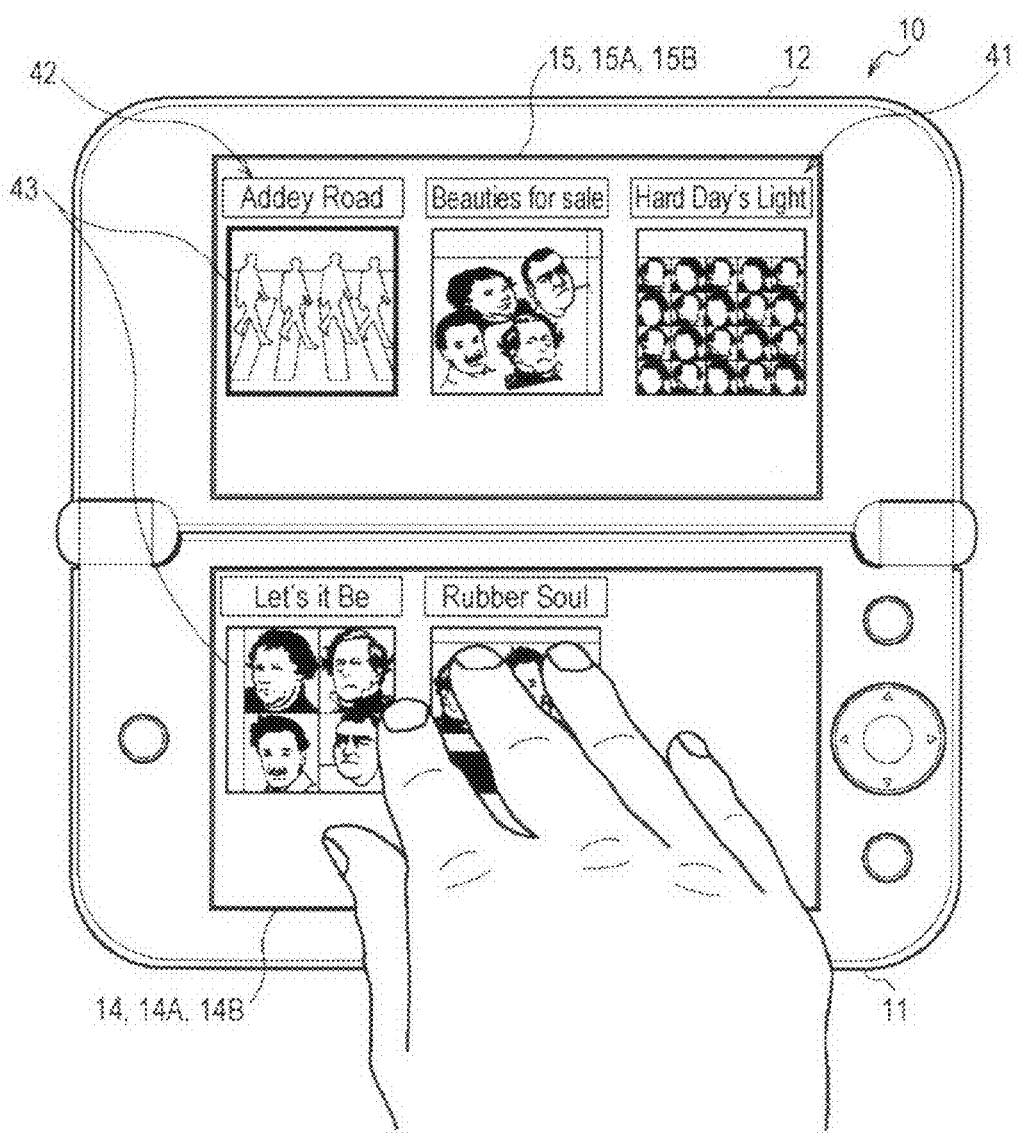
FIG. 41 is a diagram schematically illustrating a display of an album list image according to a proximity manipulation.

Further, as shown in FIG. 41, the control section 20 displays the album list image 41 based on the image data, instead of the track list image 44, across the second liquid crystal display panel 15A to the first liquid display panel 14A.

That is, at this time, the control section 20 displays the album list image 41 (which is two layers higher than the reproduced image 46) indicating all albums released by the artist of the detection time reproduction target data.

In this way, without switching the displays of the display the album list image 41, the artist list image 38 and the genre list image 35 to be sequentially reversed by one layer from the lower layer to the higher layer, the control section 20 can randomly select the display the album list image 41, the artist list image 38 and the genre list image 35 through the reciprocation of the finger in the proximity manipulation, to be displayed.

That is, if the track list image 44 is displayed according to the approximately manipulation, the control section 20 can simply switch the genre list image 35, subsequently, the artist list image 38 and the album list image 41 of a desired layer according to the reciprocation of the finger in the proximity manipulation, to be displayed.

Here, if the genre list image 35 is displayed, the control section 20 emphatically displays the jacket image 37 corresponding to the genre to which the detection time reproduction target data belongs, among the plurality of jacket images 37 in the genre list image 35, as described above.

At this time, in a similar way to the case described above with reference to FIG. 8, the control section 20 stores the selection genre detection information in the RAM 22.

Further, the control section 22 correspondingly stores the arrangement area information indicating the position of the arrangement area of the genre icon 36 as the coordinates of the pixel positions and the reproduction command for sequentially reproducing the plurality of pieces of music data of the genre indicated by the genre icon 36 in the RAM 22, as reproduction track detection information.

Further, in a similar way to the case where the above-described thumbnail list image 60 is displayed, the control section 20 sets the attention area among one or plural proximity areas which are detected at this time.

Further, at this time, in a similar way to the case where the above-described thumbnail list image 60 is displayed, the control section 20 detects the movement traces of one or plural fingers close to the first manipulation surface, and also determines whether one or plural fingers move in the desired direction on the basis of the detected movement traces.

As a result, if it is determined that one or plural fingers move in the desired direction, the control section 20 detects the display area of the jacket image 37 with which the attention area (index finger) is overlapped or the arrangement area of the genre icon 36 during the movement.

Further, if the attention area (index finger) is overlapped with the display area of the jacket image 37, the control section 20 emphatically displays the jacket image 37.

At this time, the control section 20 enlarges the jacket image 37 which is emphatically displayed and displays it on the second liquid crystal display panel 15A, while maintaining the display of the first liquid crystal display panel 14A as it is.

Further, in a case where the attention area (index finger) is overlapped with the arrangement area of the genre icon 36, the control section 20 emphatically displays the genre icon 36.

At this time, the control section 20 enlarges the genre icon 36 which is emphatically displayed and displays it on the second liquid crystal display panel 15A, while maintaining the display of the first liquid crystal display panel 14A as it is.

In this way, while the finger is being moved, the control section 20 appropriately changes the jacket image 37 or the genre icon 36 to be emphatically displayed.

If the finger is stopped, the control section 20 terminates the enlargement display of the jacket image 37 or the genre icon 36 on the second liquid crystal display panel 15A, and then returns the display state to the original display (display of the genre list image 35).

Further, if the finger is stopped, the control section 20 does not change the jacket image 37 or the genre icon 36 to be emphatically displayed, and continues the emphatic display of the jacket image 37 or the emphatic display of the genre icon 36 as it is.

Further, in a case where the genre list image 35 is displayed, in a similar way to the case where the above-described thumbnail list image 60 is displayed, the control section 20 can scroll up or down the genre list image 35, according to the movement of the finger.

Furthermore, at this time, if the proximity manipulation is performed by the plurality of fingers, in a similar way to the case where the above-described thumbnail list image 60 is displayed, the control section 20 can enlarge or reduce the genre list image 35 and display it, according to the change in the interval of the fingers.

Further, when the genre list image 35 is enlarged or reduced in this way, in a similar way to the case where the above-described thumbnail list image 60 is displayed, the control section 20 can scroll up, down, right or left the genre list image 35, according to the movement of the fingers.

Further, when the genre list image 35 is scrolled to be enlarged or reduced, the control section 20 changes the contents of the selection genre detection information and the reproduction track detection information.

Accordingly, even though the arrangement position of the jacket image 37 or the genre icon 36 is displaced and the size thereof is changed, the control section 20 can detect the jacket image 37 or the genre icon 36 with which the finger is overlapped, to thereby perform the emphatic display and enlargement display.

In this way, even in a case where the genre list image 35 is displayed according to the proximity manipulation, in a similar way to the case where the above-described thumbnail list image 60 is displayed, the control section 20 can change the display state of the genre list image 35.

In addition, if the artist list image 38 is displayed, the control section 20 emphatically displays the jacket image 40 corresponding to the artist of the detection time reproduction target data among the plurality of jacket images 40 in the artist list image 38, as described above.

At this time, in a similar way to the case described above with reference to FIG. 9, the control section 20 stores the selection artist detection information in the RAM 22.

Further, the control section 22 correspondingly stores the arrangement area information indicating the position of the arrangement area of the artist icon 39 as the coordinates of the pixel positions and the reproduction command for sequentially reproducing the plurality of pieces of music data of the artist indicated by the artist icon 39 in the RAM 22, as the reproduction track detection information.

Further, in a similar way to the case where the above-described thumbnail list image 60 is displayed, the control section 20 sets the attention area among one or plural proximity areas which are detected at this time.

Further, at this time, in a similar way to the case where the above-described thumbnail list image 60 is displayed, the control section 20 detects the movement traces of one or plural fingers close to the first manipulation surface, and also determines whether one or plural fingers move in the desired direction, on the basis of the detected movement traces.

As a result, if it is determined that one or plural fingers move in the desired direction, the control section 20 detects the display area of the jacket image 40 with which the attention area (index finger) is overlapped or the arrangement area of the artist icon 39 during the movement.

Further, if the attention area (index finger) is overlapped with the display area of the jacket image 40, the control section 20 emphatically displays the jacket image 40.

At this time, the control section 20 enlarges the jacket image 40 which is emphatically displayed and displays it on the second liquid crystal display panel 15A, while maintaining the display of the first liquid crystal display panel 14A as it is.

Further, in a case where the attention area (index finger) is overlapped with the arrangement area of the artist icon 39, the control section 20 emphatically displays the artist icon 39.

At this time, the control section 20 enlarges the artist icon 39 which is emphatically displayed and displays it on the second liquid crystal display panel 15A, while maintaining the display of the first liquid crystal display panel 14A as it is.

In this way, while the finger is being moved, the control section 20 appropriately changes the jacket image 40 or the artist icon 39 to be emphatically displayed.

If the finger is stopped, the control section 20 terminates the enlargement display of the jacket image 40 or the artist icon 39 on the second liquid crystal display panel 15A, and then returns the display state to the original display (display of the artist list image 38).

Further, if the finger is stopped, the control section 20 does not change the jacket image 40 or the artist icon 39 to be emphatically displayed, and continues the emphatic display of the jacket image 40 or the emphatic display of the artist icon 39 as it is.

Further, in a case where the artist list image 38 is displayed in this way, in a similar way to the case where the above-described thumbnail list image 60 is displayed, the control section 20 can scroll up or down the artist list image 38, according to the movement of the finger.

Furthermore, at this time, if the proximity manipulation is performed by the plurality of fingers, in a similar way to the case where the above-described thumbnail list image 60 is displayed, the control section 20 can enlarge or reduce the artist list image 38 and display it, according to the change in the interval of the fingers.

Further, when the artist list image 38 is enlarged or reduced in this way, in a similar way to the case where the above-described thumbnail list image 60 is displayed, the control section 20 can scroll up, down, right or left the artist list image 38, according to the movement of the fingers.

Further, when the artist list image 38 is scrolled to be enlarged or reduced, the control section 20 changes the contents of the selection artist detection information and the reproduction track detection information.

Accordingly, even though the arrangement position of the jacket image 40 or the artist icon 39 is displaced and the size thereof is changed, the control section 20 can detect the jacket image 40 or the artist icon 39 with which the finger is overlapped, to thereby perform the emphatic display and enlargement display.

In this way, even in a case where the artist list image 38 is displayed according to the proximity manipulation, in a similar way to the case where the above-described thumbnail list image 60 is displayed, the control section 20 can similarly change the display state of the artist list image 38.

Further, if the album list image 41 is displayed, the control section 20 emphatically displays the jacket image of the album in which the detection time reproduction target data is recorded, among the plurality of jacket images 43 in the album list image 41, as described above.

At this time, in a similar way to the case described above with reference to FIG. 10, the control section 20 stores the selection album detection information in the RAM 22.

Further, the control section 22 correspondingly stores the arrangement area information indicating the position of the arrangement area of the album icon 42 as the coordinates of the pixel positions and the reproduction command for sequentially reproducing the plurality of pieces of music data of the album indicated by the album icon 42 in the RAM 22, as the reproduction track detection information.

Further, in a similar way to the case where the above-described thumbnail list image 60 is displayed, the control section 20 sets the attention area among one or plural proximity areas which are detected at this time.

Further, at this time, in a similar way to the case where the above-described thumbnail list image 60 is displayed, the control section 20 detects the movement traces of one or plural fingers close to the first manipulation surface, and also determines whether one or plural fingers move in the desired direction on the basis of the detected movement traces.

As a result, if it is determined that one or plural fingers move in the desired direction, the control section 20 detects the display area of the jacket image 43 with which the attention area (index finger) is overlapped or the arrangement area of the album icon 42 during the movement.

Further, if the attention area (index finger) is overlapped with the display area of the jacket image 43, the control section 20 emphatically displays the jacket image 43.

At this time, the control section 20 enlarges the jacket image 43 which is emphatically displayed and displays it on the second liquid crystal display panel 15A, while maintaining the display of the first liquid crystal display panel 14A as it is.

Further, in a case where the attention area (index finger) is overlapped with the arrangement area of the album icon 42, the control section 20 emphatically displays the album icon 42.

At this time, the control section 20 enlarges the album icon 42 which is emphatically displayed and displays it on the second liquid crystal display panel 15A, while maintaining the display of the first liquid crystal display panel 14A as it is.

In this way, while the finger is being moved, the control section 20 appropriately changes the jacket image 43 or the album icon 42 to be emphatically displayed.

If the finger is stopped, the control section 20 terminates the enlargement display of the jacket image 43 or the album icon 42 on the second liquid crystal display panel 15A, and then returns the display state to the original display (display of the album list image 41).

Further, if the finger is stopped, the control section 20 does not change the jacket image 43 or the album icon 42 to be emphatically displayed, and continues the emphatic display of the jacket image 43 or the emphatic display of the album icon 42 as it is.

Further, in a case where the album list image 41 is displayed in this way, in a similar way to the case where the above-described thumbnail list image 60 is displayed, the control section 20 can scroll up or down the album list image 41, according to the movement of the finger.

Furthermore, at this time, if the proximity manipulation is performed by the plurality of fingers, in a similar way to the case where the above-described thumbnail list image 60 is displayed, the control section 20 can enlarge or reduce the album list image 41 and display it, according to the change in the interval of the fingers.

Further, when the album list image 41 is enlarged or reduced in this way, in a similar way to the case where the above-described thumbnail list image 60 is displayed, the control section 20 can scroll up, down, right or left the album list image 41, according to the movement of the fingers.

Further, when the album list image 41 is scrolled to be enlarged or reduced, the control section 20 changes the contents of the selection album detection information and the reproduction track detection information.

Accordingly, even though the arrangement position of the jacket image 43 or the album icon 42 is displaced and the size thereof is changed, the control section 20 can detect the jacket image 43 or the album icon 42 with which the finger is overlapped, to thereby perform the emphatic display and enlargement display.

In this way, even in a case where the album list image 41 is displayed according to the proximity manipulation, in a similar way to the case where the above-described thumbnail list image 60 is displayed, the control section 20 can change the display state of the album list image 41.

On the other hand, even in a case where the genre list image 35, the artist list image 38 or the album list image 41 is displayed, in a similar way to the case where the above-described track list image 44 is displayed, the control section 20 detects whether one or plural fingers reciprocate on the basis of the movement traces.

As a result, for example, if it is detected that one or plural fingers reciprocate two or three times in a state where the genre list image 35 is displayed, the control section 20 switches the display of the artist list image 38 or the album list image 41 corresponding to the reciprocation times, as described above.

Further, for example, if it is detected that one or plural fingers reciprocate one or three times in a state where the artist list image 38 is displayed, the control section 20 switches the display of the genre list image 35 or the album list image 41 corresponding to the reciprocation times, as described above.

Further, for example, if it is detected that one or plural fingers reciprocate one or two times in a state where the album list image 41 is displayed, the control section 20 switches the display of the genre list image 35 or the artist list image 38 corresponding to the reciprocation times, as described above.

Here, in a case where the genre list image 35 is displayed, for example, if it is detected that one or plural fingers rapidly reciprocate four times, the control section 20 recognizes that the display of the track list image 44 is instructed.

Further, even in a case where the artist list image 38 is displayed, for example, if it is detected that one or plural fingers rapidly reciprocate four times, the control section 20 recognizes that the display of the track list image 44 is instructed.

Further, even in a case where the album list image 41 is displayed, for example, if it is detected that one or plural fingers rapidly reciprocate four times, the control section 20 recognizes that the display of the track list image 44 is instructed.

Further, if it is recognized that the display of the track list image 44 is instructed in this way, the control section 20 displays the track list image 44 again instead of the genre list image 35, the artist list image 38 or the album list image 41, across the second liquid crystal display panel 15A to the first liquid crystal display panel 14A.

In this way, even if the album list image 41, the artist list image 38 or the genre list image 35 is displayed, the control section 20 can allow the user to randomly select the genre list image 35, the artist list image 38, the album list image 41 or the track list image 44, to thereby switch the display thereof.

Further, even in a case where any one of the genre list image 35, the artist list image 38, the album list image 41, and the track list image 44 is displayed (including the enlargement display or reduction display thereof), if the tap manipulation is performed subsequent to the proximity manipulation, the control section 20 detects the tap instruction position.

At this time, for example, if the genre list image 35 is displayed, the control section 20 sequentially compares the tap instruction position with the display areas of the plurality of jacket images 37 and the arrangement areas of the plurality of genre icons 36.

As a result, if the display area including the tap instruction position from the plurality of display areas is detected, in a similar way to the case described above with reference to FIG. 8, the control section 20 detects the genre name and the jacket image 37 which are selected by the tap manipulation, on the basis of the detected display area.

Further, in a similar way to the case described above with reference to FIG. 8, the control section 20 generates image data on a new artist list image, on the basis of the detected genre name and jacket image 37.

Further, if the display of the genre list image 35 is terminated across the second liquid crystal display panel 15A to the first liquid crystal display panel 14A, the control section 20 displays the new artist list image based on the image data across the first liquid crystal display panel 14A to the second liquid crystal display panel 15A.

In this way, in a case where the proximity manipulation is performed and the genre list image 35 is displayed across the second liquid crystal display panel 15A to the first liquid crystal display panel 14A, the control section 20 can allow the user to select a desired genre in the genre list image 35 as the jacket image 37.

Further, if the new artist list image is displayed according to the tap manipulation subsequent to the proximity manipulation, the control section 20 determines that the proximity manipulation is terminated and maintains the display of the artist list image as it is even though all the fingers move away from the first manipulation surface beyond the proximity detection distance range.

In this respect, if the arrangement area including the tap instruction position is detected from the plurality of arrangement areas in a state where the genre list image 35 is displayed, the control section 20 detects the genre icon 36 which is instructed by the tap manipulation on the basis of the detected arrangement area, as described above.

Further, the control section 20 sequentially reads out the plurality of pieces of music data of the genre indicated by the instructed genre icon 36 from the non-volatile memory 21, and reproduces it by the reproducing section 24.

In addition, the control section 20 terminates the display of the genre list image 35 across the second liquid crystal display panel 15A to the first liquid crystal display panel 14A, and also displays the reproduced image indicating the piece of music data during reproduction across the first liquid crystal display panel 14A to the second liquid crystal display panel 15A.

In this way, if the genre list image 35 is displayed according to the proximity manipulation, the control section 20 can also allow the user to select a desired genre on the genre list image 35 as the genre icon 36 through which the reproduction of the music data can be instructed.

Further, if a new reproduced image is displayed according to the tap manipulation subsequent to the proximity manipulation, the control section 20 determines that the proximity manipulation is terminated and maintains the display of the reproduced image as it is even though all the fingers move away from the first manipulation surface beyond the proximity detection distance range.

Further, for example, if the artist list image 38 is displayed, the control section 20 sequentially compares the tap instruction position with the display areas of the plurality of jacket images 40 and the arrangement areas of the plurality of artist icons 39.

As a result, if the display area including the tap instruction position from the plurality of display areas is detected, in a similar way to the case described above with reference to FIG. 9, the control section 20 detects the artist name and the jacket image 40 which are selected by the tap manipulation, on the basis of the detected display area.

Further, in a similar way to the case described above with reference to FIG. 9, the control section 20 generates image data on a new album list image on the basis of the detected artist name and jacket image 40.

Further, the control section 20 terminates the display of the artist list image 38 across the second liquid crystal display panel 15A to the first liquid crystal display panel 14A, and also displays the new album list image based on the image data across the first liquid crystal display panel 14A to the second liquid crystal display panel 15A.

In this way, in a case where the proximity manipulation is performed and the artist list image 38 is displayed across the second liquid crystal display panel 15A to the first liquid crystal display panel 14A, the control section 20 can allow the user to select a desired artist on the artist list image 38 as the jacket image 40.

Further, if the new album list image is displayed according to the tap manipulation subsequent to the proximity manipulation, the control section 20 determines that the proximity manipulation is terminated and maintains the display of the album list image as it is even though all the fingers move away from the first manipulation surface beyond the proximity detection distance range.

In this respect, if the arrangement area including the tap instruction position is detected from the plurality of arrangement areas in a state where the artist list image 38 is displayed, the control section 20 detects the artist icon 39 which is instructed by the tap manipulation on the basis of the detected arrangement area, as described above.

Further, the control section 20 sequentially reads out the plurality of pieces of music data of the artist indicated by the instructed artist icon 39 from the non-volatile memory 21, and reproduces it by the reproducing section 24.

In addition, the control section 20 terminates the display of the artist list image 38 across the second liquid crystal display panel 15A to the first liquid crystal display panel 14A, and also displays the reproduced image indicating the music data during reproduction across the first liquid crystal display panel 14A to the second liquid crystal display panel 15A.

In this way, if the artist list image 38 is displayed according to the proximity manipulation, the control section 20 can allow the user to select a desired artist on the artist list image 38 as the artist icon 39 through which the reproduction of the music data can be instructed.

Further, if the new reproduced image is displayed according to the tap manipulation subsequent to the proximity manipulation, the control section 20 determines that the proximity manipulation is terminated and maintains the display of the reproduced image as it is even though all the fingers move away from the first manipulation surface beyond the proximity detection distance range.

Further, for example, if the album list image 41 is displayed, the control section 20 sequentially compares the tap instruction position with the display areas of the plurality of jacket images 43 and the arrangement areas of the plurality of album icons 42.

As a result, if the display area including the tap instruction position from the plurality of display areas is detected, in a similar way to the case described above with reference to FIG. 10, the control section 20 detects the album title and the jacket image 43 which are selected by the tap manipulation on the basis of the detected display area.

Further, in a similar way to the case described above with reference to FIG. 10, the control section 20 generates image data on a new track list image, on the basis of the detected album title and jacket image 43.

Further, the control section 20 terminates the display of the album list image 41 across the second liquid crystal display panel 15A to the first liquid crystal display panel 14A, and displays the new track list image based on the image data across the first liquid crystal display panel 14A to the second liquid crystal display panel 15A.

In this way, in a case where the proximity manipulation is performed and the album list image 41 is displayed across the second liquid crystal display panel 15A to the first liquid crystal display panel 14A, the control section 20 can allow the user to select a desired album in the album list image 41 as the jacket image 43.

Further, if the new track list image is displayed according to the tap manipulation subsequent to the proximity manipulation, the control section 20 determines that the proximity manipulation is terminated and maintains the display of the track list image as it is even though all the fingers move away from the first manipulation surface beyond the proximity detection distance range.

In this respect, if the arrangement area including the tap instruction position is detected from the plurality of arrangement areas in a state where the album list image 41 is displayed, the control section 20 detects the album icon 42 which is instructed by the tap manipulation on the basis of the detected arrangement area, as described above.

Further, the control section 20 sequentially reads out the plurality of pieces of music data of the album indicated by the instructed album icon 42 from the non-volatile memory 21, and reproduces it by the reproducing section 24.

In addition, the control section 20 terminates the display of the album list image 41 across the second liquid crystal display panel 15A to the first liquid crystal display panel 14A, and displays the reproduced image indicating the music data during reproduction across the first liquid crystal display panel 14A to the second liquid crystal display panel 15A.

In this way, if the album list image 41 is displayed according to the proximity manipulation, the control section 20 can allow the user to select a desired album on the album list image 41, as the album icon 42 through which the reproduction of the music data can be instructed.

Further, if the new reproduced image is displayed according to the tap manipulation subsequent to the proximity manipulation, the control section 20 determines that the proximity manipulation is terminated and maintains the display of the reproduced image as it is even though all the fingers move away from the first manipulation surface beyond the proximity detection distance range.

Further, for example, if the track list image 44 is displayed, the control section 20 sequentially compares the tap instruction position with the arrangement areas of the plurality of track icons 45.

As a result, if the arrangement area including the tap instruction position from the plurality of arrangement areas is detected, as described above, the control section 20 detects the track icon 45 instructed by the tap manipulation on the basis of the detected arrangement area.

Further, the control section 20 reads out the music data on the track title indicated by the instructed track icon 45 from the non-volatile memory 21, and reproduces it by the reproducing section 24.

In addition, the control section 20 terminates the display of the track list image 44 across the second liquid crystal display panel 15A to the first liquid crystal display panel 14A, and displays the reproduced image indicating the music data during reproduction across the first liquid crystal display panel 14A to the second liquid crystal display panel 15A.

In this way, if the track list image 44 is displayed across the second liquid crystal display panel 15A to the first liquid crystal display panel 14A according to the proximity manipulation, the control section 20 can allow the user to select a desired music (track) in the track list image 44, as the track icon 45 through which the reproduction of the music data can be instructed.

Further, if the new reproduced image is displayed according to the tap manipulation subsequent to the proximity manipulation, the control section 20 determines that the proximity manipulation is terminated and maintains the display of the track list image as it is even though all the fingers move away from the first manipulation surface beyond the proximity detection distance range.

In this way, if the tap manipulation is performed for the first manipulation surface subsequent to the proximity manipulation, the control section 20 displays the new artist list image, album list image, track list image or reproduced image across the second liquid crystal display panel 15A to the first liquid crystal display panel 14A, and terminates the proximity manipulation.

On the other hand, even though the proximity manipulation is performed, if all the fingers in proximity to the first manipulation surface move away beyond the proximity detection distance range from the first manipulation surface, before a desired jacket image 37, 40 or 43 is selected by the tap manipulation, the control section 20 determines that the proximity manipulation is terminated.

Further, even though the proximity manipulation is performed, if all the fingers in proximity to the first manipulation surface move away beyond the proximity detection distance range from the first manipulation surface, before a desired genre icon 36 or a desired artist icon 39 is selected by the tap manipulation, the control section 20 determines that the proximity manipulation is terminated.

Further, even though the proximity manipulation is performed, if all the fingers in proximity to the first manipulation surface move away beyond the proximity detection distance range from the first manipulation surface, before a desired album icon 42 or a desired track icon 45 is selected by the tap manipulation, the control section 20 determines that the proximity manipulation is terminated.

That is, even though the genre list image 35 or the artist list image 38 is displayed according to the proximity manipulation, if the instruction of the jacket image 37, 40 or 43, or the track icon 45 or the like is given, the control section 20 can terminate the proximity manipulation only by moving the finger away from the first manipulation surface.

Further, if it is determined that the finger moves away from the first manipulation surface and the proximity manipulation is terminated, at this time, the control section terminates the display of the genre list image 35, the artist list image 38, the album list image 41 or the track list image 44 across the second liquid crystal display panel 15A to the first liquid crystal display panel 14A.

Further, at this time, the control section 20 displays again the reproduced image 46 which has been displayed immediately before the proximity manipulation is performed across the second liquid crystal display panel 15A to the first liquid crystal display panel 14A.

That is, if it is determined that the finger moves away from the first manipulation surface and the proximity manipulation is terminated in this way, at this time, the control section 20 returns the display across the second liquid crystal display panel 15A to the first liquid crystal display panel 14A to the display (original display) before the proximity manipulation is performed.

In addition, for example, even though a certain finger among the plurality of fingers moves outside the first manipulation surface during the proximity manipulation and a part of the proximity area is unable to be detected, if the proximity area of at least one finger among the plurality of fingers is continuously detected, the control section 20 determined that the proximity manipulation is continuously performed.

Accordingly, for example, even if a part of the plurality of fingers moves outside the first manipulation surface, for example, when the scrolling is instructed in the proximity manipulation, the control section 20 can prevent the proximity manipulation from being stopped unnecessarily, and can continue the proximity manipulation to thereby allow the user to select the desired launch image.

On the other hand, even when the panel output signal is obtained from the second touch panel 15B and the proximity area and the center position thereof are detected in the area detection process, the control section 20 detect whether the proximity manipulation is performed for the second manipulation surface in a similar way to the case where the proximity manipulation is performed for the first manipulation surface.

Accordingly, if it is detected that the proximity manipulation is performed for the second manipulation surface, the control section 20 displays the thumbnail list image 60 as described above, and appropriately displays the genre list image 35, the artist list image 38, the album list image 41 or the track list image 44.

Further, the control section 20 appropriately changes the display state of the thumbnail list image 60, the genre list image 35, the artist list image 38, the album list image 41 or the track list image 44, according to the proximity manipulation performed for the second manipulation surface.

In a case where the proximity manipulation is performed for the second manipulation surface, the control section 20 enlarges the thumbnail 61, or the jacket image 37, 40, 43 or the like which is emphatically displayed according to the movement of the finger and displays it on the first liquid crystal display panel 14A.

Further, if the tap manipulation is performed on the second manipulation surface subsequent to the proximity manipulation, the control section 20 detects the tap instruction position. At this time, the control section 20 displays the launch image indicated by the thumbnail 61 instructed by the tap manipulation across the second liquid crystal display panel 15A to the first liquid crystal display panel 14A according to the tap instruction position, as described above.

Further, the control section 20 displays a new artist list image, album list image or track list image corresponding to the jacket image 37, 40 or 43 instructed by the tap manipulation, across the second liquid crystal display panel 15A to the first liquid crystal display panel 14A, as described above.

Further, the control section 20 displays a new reproduced image corresponding to the genre icon 36, the artist icon 39, the album icon 42 or the track icon 45 instructed by the tap manipulation across the second liquid crystal display panel 15A to the first liquid crystal display panel 14A, as described above.

In this way, if the tap manipulation is performed by the finger in proximity to the second manipulation surface subsequent to the proximity manipulation and the launch image or the new artist list image, album list image, track list image or reproduced image is displayed, the control section 20 determines that the proximity manipulation is terminated.

Further, if it is determined that the proximity manipulation is terminated, even though all the fingers move away from the second manipulation surface beyond the proximity detection distance range, the control section 20 maintains the display of the launch image or the new artist list image, album list image, track list image or reproduced image as it is.

That is, if the tap manipulation is performed subsequent to the proximity manipulation for the second manipulation surface, the control section 20 displays the launch image or the new artist list image, album list image, track list image or reproduced image across the second liquid crystal display panel 15A to the first liquid crystal display panel 14A, and then terminates the proximity manipulation.

On the other hand, even though the proximity manipulation is performed, if all the fingers move away beyond the proximity detection distance range from the second manipulation surface before the desired thumbnail 61 or the jacket image 37, 40, 43 or the like is selected by the tap manipulation, the control section 20 also determines that the proximity manipulation is terminated at this time.

That is, even in a case where the proximity manipulation is performed for the second manipulation surface, the instruction of the thumbnail 61 or the jacket image 37, 40, 43 or the like is given, the control section 20 can easily terminate the proximity manipulation only by moving the finger away from the second manipulation surface.

Further, if it is determined that the finger moves away from the second manipulation surface and the proximity manipulation is terminated, at this time, the control section 20 terminates the display of the thumbnail list image 60 or the genre list image 35, the artist list image 38 or the like across the second liquid crystal display panel 15A to the first liquid crystal display panel 14A.

Further, at this time, the control section 20 returns the display across the second liquid crystal display panel 15A to the first liquid crystal display panel 14A to the state before the proximity manipulation is performed.

In addition, for example, even though a certain finger among the plurality of fingers moves outside the second manipulation surface during the proximity manipulation and a part of the proximity area is unable to be detected, if the proximity area of at least one finger among the plurality of fingers is continuously detected, the control section 20 determined that the proximity manipulation is continuously performed.

Accordingly, for example, even if a part of the plurality of fingers moves outside the second manipulation surface, for example, when the scrolling is instructed in the proximity manipulation, the control section 20 can prevent the proximity manipulation from being stopped unnecessarily, and can continue the proximity manipulation to thereby allow the user to select the desired launch image.

1-2-4. Display Control Process Routine

Next, a first display control process routine RT1 which is performed by the control section 20 in a case where the display of at least one launch image is held in the standby mode will be described above with reference to FIGS. 42 and 43.

Further, a second display control process routine RT2 which is performed by the control section 20 in a case where the reproduced image 46 is displayed will be described above with reference to FIGS. 44 and 45.

Figure 42:
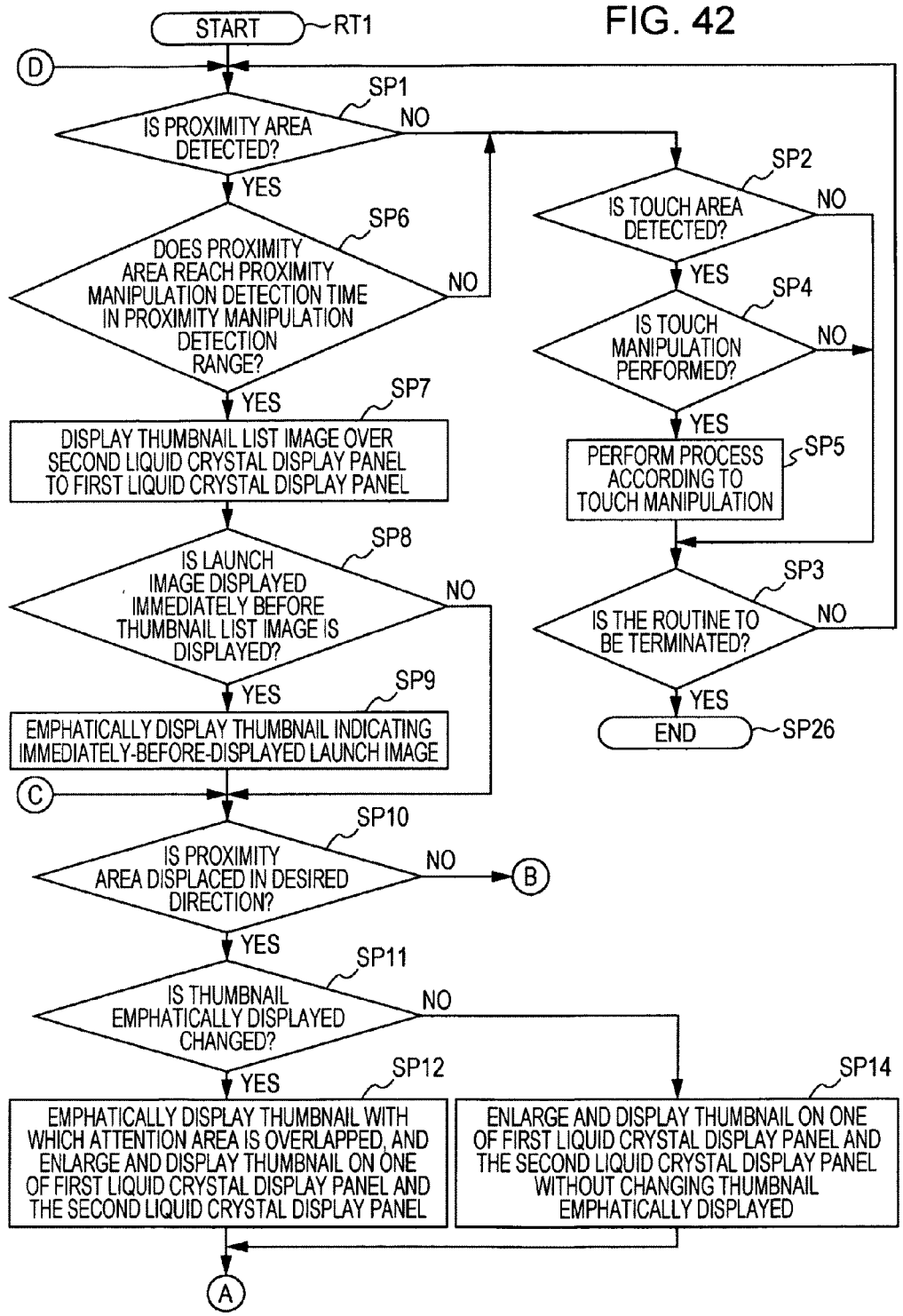
FIG. 42 is a flowchart illustrating a first display control process routine (1)
Figure 43:
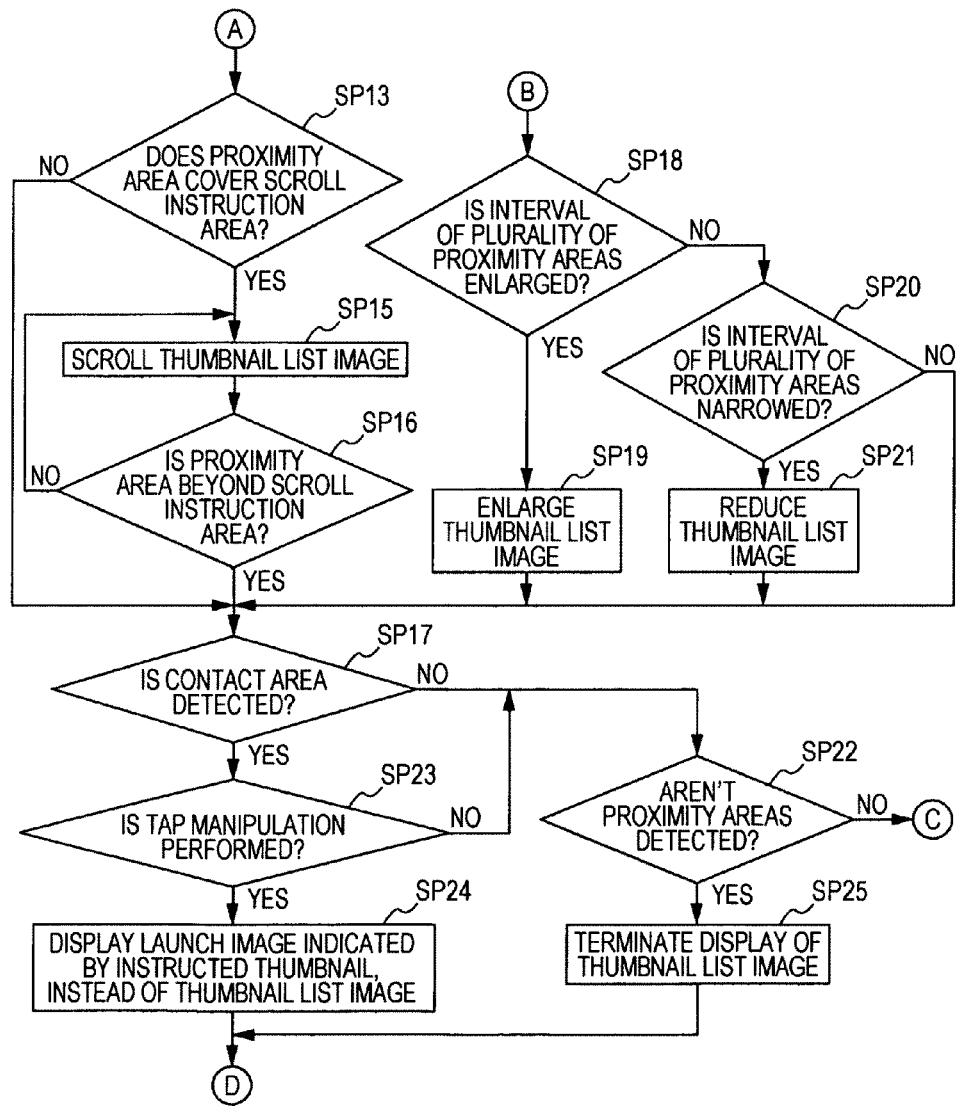
FIG. 43 is a flowchart illustrating a first display control process routine (2)

Firstly, for example, if the display of at least one launch image is held in the standby mode, the control section 20 starts the first display control process routine RT1 shown in FIGS. 42 and 43 according to a display control program which is stored in advance in the non-volatile memory 21.

If the first display control process routine RT1 is started, the control section 20 determines in step SP1 whether the proximity area is detected on the first manipulation surface of the first touch panel 14B or the second manipulation surface of the second touch panel 15B while performing a regular area detection process.

If a negative result is obtained in step SP1, this means that the finger does not move close to any one of the first manipulation surface and the second manipulation surface. If such a negative result is obtained in step SP1, the control section 20 moves the routine to the next step SP2.

In step SP2, the control section 20 determines whether the touch area is detected on the first manipulation surface of the first touch panel 14B or the second manipulation surface of the second touch panel 15B.

If a negative result is obtained in step SP2, this means that the finger is not in touch with any one of the first manipulation surface and the second manipulation surface. If such a negative result is obtained in step SP2, the control section 20 moves the routine to the next step SP3.

In step SP3, the control section 20 determines whether the first display control process routine RT1 is to be terminated. If a negative result is obtained in step SP3, this means, for example, that an instruction is not given for closing all the launch images (that is, for deleting the image data on the launch images from the RAM 22), but there is still a possibility that the launch image is to be displayed. If such a negative result is obtained in step SP3, the control section 20 returns the routine to step SP1.

Then, the control section 20 repeatedly performs the processes of steps SP1 to SP3 until a positive result is obtained in any one of steps SP1 to SP3.

Thus, the control section 20 waits for the proximity or touch of the finger on the first manipulation surface of the first touch panel 14B or the second manipulation surface of the second touch panel 15B and the instruction for closing all the launch images.

On the other hand, if a positive result is obtained in step SP2, this means that the finger is in touch with the first manipulation surface of the first touch panel 14B or the second manipulation surface of the second touch panel 15B and there is a possibility that the touch manipulation is performed. If such a positive result is obtained in step SP2, the control section 20 moves the routine to the next step SP4.

In step SP4, the control section 20 determines whether the touch manipulation is performed on the first manipulation surface or the second manipulation surface.

If a negative result is obtained in step SP4, this means, for example, that the fingers are in touch with a plurality of locations of the first manipulation surface or the second manipulation surface and any one of the tap manipulation, the flick manipulation and the sliding manipulation is not performed as the touch manipulation. If such a negative result is obtained in step SP4, the control section 20 returns the routine to step SP3.

On the other hand, if a positive result is obtained in step SP4, this means that the finger is in touch with one location of the first manipulation surface or the second manipulation surface and the touch manipulation (any one of the tap manipulation, the flick manipulation and the sliding manipulation) is performed. If such a positive result is obtained in step SP4, the control section 20 moves the routine to the next step SP5.

Thus, in step SP5, the control section 20 performs a process such as a display of a new image, a scrolling of an image being displayed, a display standby of all the launch images or the like, as a process instructed by the touch manipulation, and then returns the routine to step SP3.

On the other hand, if a positive result is obtained in the above-described step SP1, this means that the finger moves close to one of the first manipulation surface of the first touch panel 14B and the second manipulation surface of the second touch panel 15B.

If such a positive result is obtained in step SP1, the control section 20 starts the measurement of the proximity time and sets the proximity manipulation detection range on the basis of the center position of the proximity area, and then moves the routine to the next step SP6.

In step SP6, the control section 20 determines whether the proximity time reaches the proximity manipulation detection time in a state where the center position of the proximity area is within the proximity manipulation detection range.

If a negative result is obtained in step SP6, this means that the finger mistakenly moves close to the first manipulation surface or the second manipulation surface, or that the finger moves close to the first manipulation surface or the second manipulation surface for touch therewith, at this time. If such a negative result is obtained in step SP6, the control section 20 returns the routine to step SP2.

On the other hand, if a positive result is obtained in step SP6, this means that one or plural fingers move close to the first manipulation surface or the second manipulation surface for the proximity manipulation, at this time. If such a positive result is obtained in step SP6, the control section 20 moves the routine to the next step SP7.

Thus, in step SP7, the control section 20 generates the thumbnail list image 60 in which the thumbnails 61 indicating the launch images are arranged in a matrix format and are displayed as a list, on the basis of all the launch images launched at this time.

Further, the control section 20 displays the thumbnail list image 60 across the first liquid crystal display panel 14A to the second liquid crystal display panel 15A, and then moves the routine to the next step SP8.

In step SP8, the control section 20 determines whether the launch image is displayed on at least one of the first liquid crystal display panel 14A and the second liquid crystal display panel 15A immediately before the thumbnail list image 60 is displayed on the first liquid crystal display panel 14A and the second liquid crystal display panel 15A.

If a positive result is obtained in step SP8, this means that the proximity manipulation is performed at this time in a state where the launch image is displayed on at least one of the first liquid crystal display panel 14A and the second liquid crystal display panel 15A. If such a positive result is obtained in step SP8, the control section 20 moves the routine to the next step SP9.

In step SP9, the control section 20 emphatically displays a thumbnail 61 indicating the immediately-before-displayed launch image (launch image displayed immediately before the thumbnail list image 60 is displayed) among the plurality of thumbnails 61 in the thumbnail list image 60 being displayed, and then moves the routine to the next step SP10.

On the other hand, if a negative result is obtained in step SP8, this means that the proximity manipulation is performed at this time in a state where all the launch images are held in the standby mode (in a state where any launch image is not displayed on the first liquid crystal display panel 14A and the second liquid crystal display panel 15A).

If such a negative result is obtained in step SP8, the control section 20 skips the process of step SP9 (does not perform the process of step SP9), and then moves the routine to step SP10.

In step SP10, the control section 20 determines whether one or plural proximity areas are displaced in a desired direction. If a positive result is obtained in step SP10, this means that one or plural fingers move in a desired direction. If such a positive result is obtained in step SP10, the control section 20 moves the routine to the next step SP11.

In step SP11, the control section 20 determines whether the thumbnail 61 emphatically displayed is changed. If a positive result is obtained in step SP11, this means that the finger is overlapped with the thumbnail 61 which is not yet emphatically displayed, according to the movement of the finger. If such a positive result is obtained in step SP11, the control section 20 moves the routine to the next step SP12.

In step SP12, the control section 20 emphatically displays a thumbnail 61 in the thumbnail list image 60 with which the attention area is overlapped.

Further, at this time, the control section 20 enlarges the emphatically displayed thumbnail 61 and displays at least a part thereof on one of the first liquid crystal display panel 14A and the second liquid crystal display panel 15A, and then moves the routine to the next step SP13.

On the other hand, if a negative result is obtained in step SP11, this means that even if the finger is moved, the finger is still overlapped with the thumbnail 61 emphatically displayed thus far. If such a negative result is obtained in step SP11, the control section 20 moves the routine to step SP14.

In step SP14, the control section 20 enlarges the thumbnail 61 emphatically displayed thus far and displays at least a part thereof on one of the first liquid crystal display panel 14A and the second liquid crystal display panel 15A, and then moves the routine to the next step SP13.

In step SP13, the control section 20 determines whether the proximity area covers the scroll-up instruction area SA1 and the scroll-down instruction area SA2.

If a positive result is obtained in step SP13, this means that the finger covers the scroll-up instruction area SA1 or the scroll-down instruction area SA2 and an upward or downward scrolling is instructed. If such a positive result is obtained in step SP13, the control section 20 moves the routine to the next step SP15.

In step SP15, the control section 20 scrolls up or down the thumbnail list image 60 according to the instruction, and then moves the routine to the next step SP16.

In step SP16, the control section 20 determines whether the proximity area is beyond the scroll-up instruction area SA1 and the scroll-down instruction area SA2.

If a negative result is obtained in step SP16, this means that the finger still covers the scroll-up instruction area SA1 or the scroll-down instruction area SA2 and the upward or downward scrolling is continuously instructed. If such a negative result is obtained in step SP16, the control section 20 returns the routine to step SP15.

Then, the control section 20 sequentially and repeatedly performs the processes of steps SP15 and SP16 until a positive result is obtained in step SP16.

Thus, while the finger is overlapped with the scroll-up instruction area SA1 or the scroll-down instruction area SA2, the control section 20 continues to scroll up or down the thumbnail list image 60.

On the other hand, if the positive result is obtained in step SP16, this means that the finger is beyond the scroll-up instruction area SA1 and the scroll-down instruction area SA2 and the instruction for the upward and downward scrolling is terminated. If such a positive result is obtained in step SP16, the control section 20 moves the routine to the next step SP17.

Further, if a negative result is obtained in step SP13, this means that the finger does not cover any one of the scroll-up instruction area SA1 and the scroll-down instruction area SA2 and thus the upward and downward scrolling is not instructed.

If such a negative result is obtained in step SP13, the control section 20 skips the processes of steps SP15 and SP16, and moves the routine to step SP17.

On the other hand, if a negative result is obtained in the above-described step SP10, this means that one or plural fingers barely move, or that the plurality of fingers moves in different directions. If such a negative result is obtained in step SP10, the control section 20 moves the routine to step SP18.

In step SP18, the control section 20 determines whether the interval of the plurality of proximity areas is increased. If a positive result is obtained in step SP18, this means that the interval of the plurality of fingers is increased and the enlargement of the thumbnail list image 60 is instructed. If such a positive result is obtained in step SP18, the control section 20 moves the routine to the next step SP19.

Thus, in step SP19, the control section 20 enlarges the thumbnail list image 60 and displays it across the second liquid crystal display panel 15A to the first liquid crystal display panel 14A, and then moves the routine to the next step SP17.

At this time, even though the thumbnail list image 60 is enlarged, the control section 20 emphatically displays the thumbnail 61, which has been emphatically displayed immediately before the enlargement, as it is immediately after the enlargement.

On the other hand, if a negative result is obtained in step SP18, this means that one or plural fingers barely move, or that the plurality of fingers moves so that their interval decreases. If such a negative result is obtained in step SP18, the control section 20 moves the routine to step SP20.

In step SP20, the control section 20 determines whether the interval of the plurality of proximity areas has decreased. If a positive result is obtained in step SP20, this means that the interval of the plurality of fingers has decreased and the reduction of the thumbnail list image 60 is instructed. If such a positive result is obtained in step SP20, the control section 20 moves the routine to the next step SP21.

Thus, in step SP21, the control section 20 reduces the thumbnail list image 60 and displays it across the second liquid crystal display panel 15A to the first liquid crystal display panel 14A, and then moves the routine to the next step SP17.

At this time, even though the thumbnail list image is reduced, the control section 20 emphatically displays the thumbnail 61, which has been emphatically displayed immediately before the reduction, as it is immediately after the reduction.

On the other hand, if a negative result is obtained in step SP20, this means that one or plural fingers barely move. If such a negative result is obtained in step SP20, the control section 20 moves the routine to step SP17.

In step SP17, the control section 20 determines whether the touch area is detected. If a negative result is obtained in step SP17, this means that the plurality of thumbnails 61 is still seen in the thumbnail list image 60. If such a negative result is obtained in step SP17, the control section 20 moves the routine to step SP22.

In step SP22, the control section 20 determines whether all the proximity areas are not detected. If a negative result is obtained in step SP22, this means that one or plural fingers are still in proximity to the first manipulation surface or the second manipulation surface. If such a negative result is obtained in step SP22, the control section 20 returns the routine to step SP10.

Thereafter, the control section 20 repeatedly performs the processes of steps SP10 to SP22 until a positive result is obtained in steps SP17 to SP22.

Thus, the control section 20 appropriately changes the display state of the thumbnail list image 60 according to a variety of instructions through the proximity manipulation while the proximity manipulation is being continuously performed for the first manipulation surface or the second manipulation surface.

Further, if the routine moves to step SP13 in a state where the thumbnail list image 60 is enlarged or reduced compared with the original display size to be displayed, the control section 20 determines whether the proximity area covers the scroll-up instruction area SA1 and the scroll-down instruction area SA2 as described above.

Here, at this time, the control section 20 also determines whether the proximity area covers the scroll-right instruction area SA3 and the scroll-left instruction area SA4.

As a result, if the finger covers the scroll-up instruction SA1, the scroll-down instruction area SA2, the scroll-right instruction area SA3 or the scroll-left instruction area SA4 and the upward, downward, rightward or leftward scrolling is instructed, the control section 20 moves the routine to step SP15.

Thus, in step SP15, the control section 20 scrolls up, down, right or left the thumbnail list image 60 according to the instruction, and then moves the routine to the next step SP16.

In step SP16, the control section 20 determines whether the proximity area is beyond all of the scroll-up instruction area SA1, the scroll-down instruction area SA2, the scroll-right instruction area SA3 and the scroll-left instruction area SA4.

Further, if the finger still covers the scroll-up instruction area SA1, the scroll-down instruction area SA2, the scroll-right instruction area SA3 or the scroll-left instruction area SA4 and the upward, downward, rightward or leftward scrolling is instructed, the control section 20 returns the routine to step SP15.

Then, the control section 20 sequentially and repeatedly performs the processes of steps SP15 and SP16 until a positive result is obtained in step SP16.

Thus, the control section 20 continues to scroll up, down, right or left the thumbnail list image 60 while the fingers covers the scroll-up instruction area SA1, the scroll-down instruction area SA2, the scroll-right instruction area SA3 or the scroll-left instruction area SA4.

Further, if the finger is beyond all of the scroll-up instruction area SA1, the scroll-down instruction area SA2, the scroll-right instruction area SA3 and the scroll-left instruction area SA4, the control section 20 moves the routine to step SP17.

That is, if the instruction for the upward, downward, rightward and leftward scrolling is terminated, the control section 20 moves the routine to step SP17.

On the other hand, if a negative result is obtained in step SP13, this means that the finger does not cover any one of the scroll-up instruction area SA1 and the scroll-down instruction area SA2 and thus the upward and downward scrollings are not instructed.

Further, if the negative result is obtained in step SP13, this means that the finger does not cover any one of the scroll-right instruction area SA3 and the scroll-left instruction area SA4 and thus the rightward and leftward scrollings are not instructed.

If such a negative result is obtained in step SP13, the control section 20 skips the processes of steps SP15 and SP16 and moves the routine to step SP17.

On the other hand, if a positive result is obtained in the above-described step SP17, this means that the finger is in touch with one of the first manipulation surface and the second manipulation surface to detect the touch area. If such a positive result is obtained in step SP17, the control section 20 moves the routine to the next step SP23.

In step SP23, the control section 20 determines whether the tap manipulation is performed at this time. If a positive result is obtained in step SP23, this means that the tap manipulation subsequent to the proximity manipulation is performed for one of the first manipulation surface and the second manipulation surface and any thumbnail 61 in the thumbnail list image 60 is instructed. If such a positive result is obtained in step SP23, the control section 20 moves the routine to the next step SP24.

In step SP24, the control section 20 terminates the display of the thumbnail list image 60 across the first liquid crystal display panel 14A and the second liquid crystal display panel 15A.

Further, at this time, according to the display size of the launch image indicated by the thumbnail 61 instructed through the tap manipulation, the control section 20 displays the launch image indicated by the thumbnail 61 on at least one of the first liquid crystal display panel 14A and the second liquid crystal display panel 15A. Further, the control section 20 determines that the proximity manipulation performed at this time is terminated, and then returns the routine to step SP1.

On the other hand, if a negative result is obtained in step SP23, this means, for example, that the finger is mistakenly in touch with a plurality of locations in one of the first manipulation surface and the second manipulation surface, or that the finger is in touch with one location therein for the manipulation detection time or longer. If such a negative result is obtained in step SP23, the control section 20 returns the routine to step SP22.

If a positive result is obtained in step SP22, this means, for example, that all the fingers are away beyond the proximity detection distance range from the first manipulation surface and the second manipulation surface in a state where the touch area is not detected at all, and all the proximity areas are not detected. If such a positive result is obtained in step SP22, the control section 20 moves the routine to the next step SP25.

In step SP25, the control section 20 terminates the display of the thumbnail list image 60 across the second liquid crystal display panel 15A to the first liquid crystal display panel 14A, and returns the display of the first liquid crystal display panel 14A and the second liquid crystal display panel 15A to the state immediately before the proximity manipulation is performed. Further, the control section 20 determines that the proximity manipulation performed is terminated at this time, and then returns the routine to step SP1.

In this respect, for example, as described above, even if one or plural fingers are mistakenly in touch with one of the first manipulation surface and the second manipulation surface for which the proximity manipulation is performed, if at least one proximity area is detected at this time, the control section 20 does not determine that the proximity manipulation is terminated.

Here, for example, if one or plural fingers are mistakenly in touch with one of the first manipulation surface and the second manipulation surface for which the proximity manipulation is performed and thus the proximity area is not detected at all, accordingly, the control section 20 determines that the proximity manipulation is terminated at this time.

Thus, in the above-described step SP22, the control section 20 determines whether the proximity manipulation is terminated, in determination of such a setting.

In this way, by repeatedly performing the processes of steps SP1 to SP25 while the display of at least one launch image is held in the standby mode, the control section 20 can appropriately display the thumbnail list image 60 and can allow the user to select the launch image to be displayed.

On the other hand, if a positive result is obtained in the above-described step SP3, this means, for example, that an instruction for closing all the launch images (for deleting the image data on the launch images from the RAM 22) is given.

If such a positive result is obtained in step SP3, the control section 20 deletes the image data on all the launch images from the RAM 22, and then moves the routine to step SP26. Thus, in step SP26, the control section 20 terminates the first display control process routine RT1.

Figure 44:
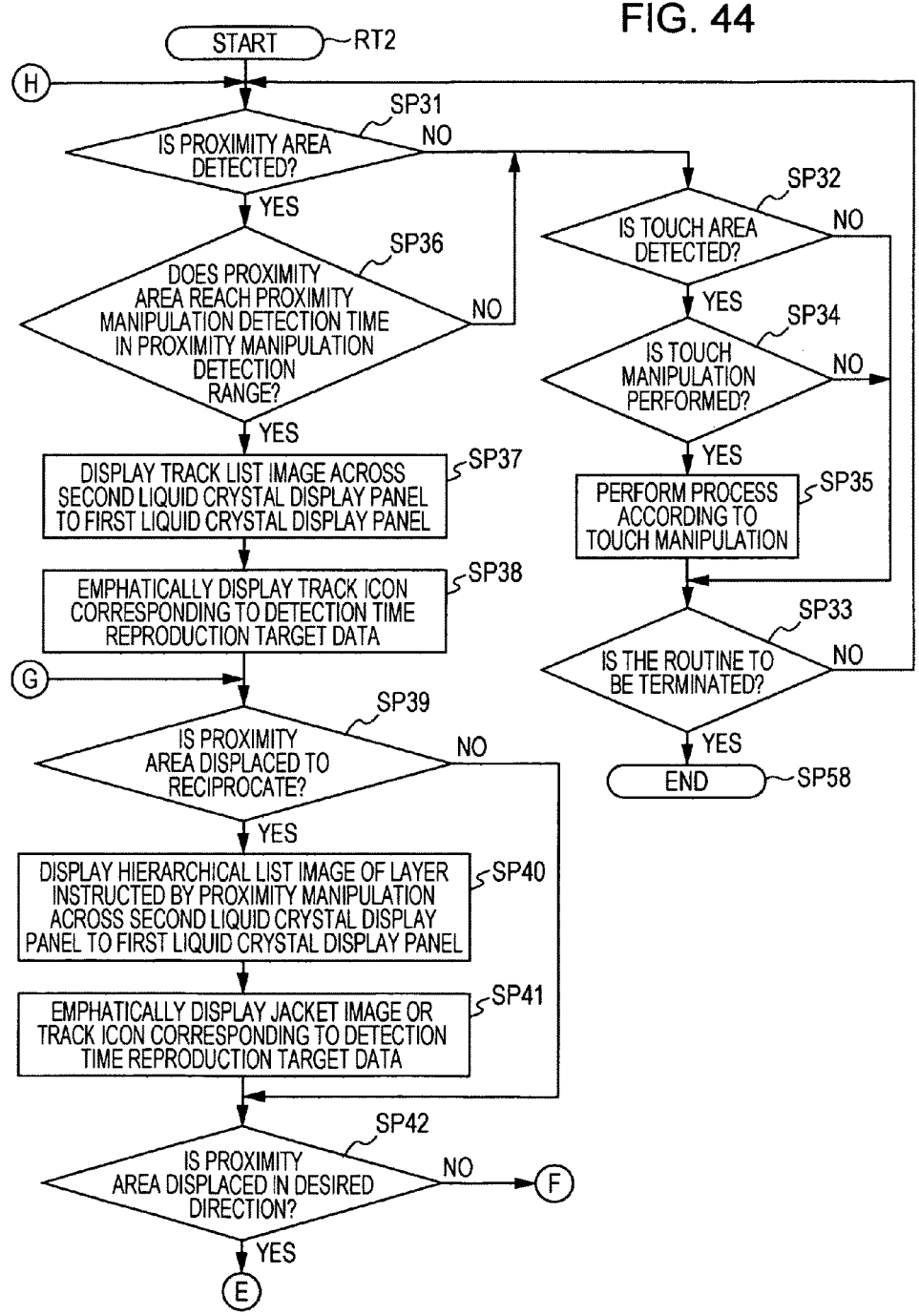
FIG. 44 is a flowchart illustrating a second display control process routine (1)
Figure 45:
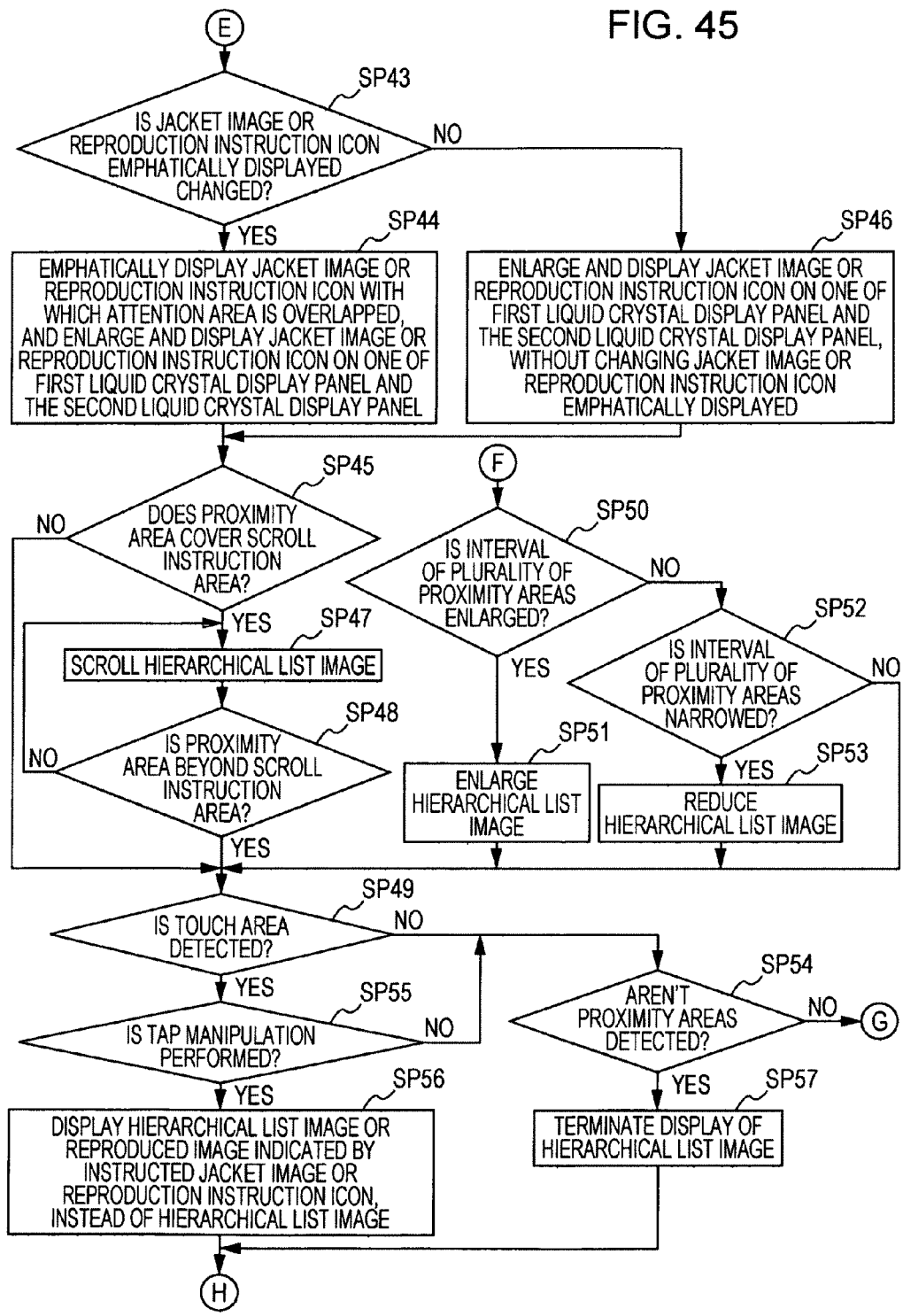
FIG. 45 is a flowchart illustrating a second display control process routine (2)

On the other hand, for example, if the reproduced image 46 is displayed, the control section 20 starts the second display control process routine RT2 shown in FIGS. 44 and 45 according to the display control program which is stored in advance in the non-volatile memory 21.

If the second display control process routine RT2 is started, the control section 20 determines in step SP31 whether the proximity area is detected on the first manipulation surface of the first touch panel 14B or the second manipulation surface of the second touch panel 15B, while performing the regular area detection process.

If a negative result is obtained in step SP31, this means that the finger does not move close to any one of the first manipulation surface and the second manipulation surface. If such a negative result is obtained in step SP31, the control section 20 moves the routine to the next step SP32.

In step SP32, the control section 20 determines whether the touch area is detected on the first manipulation surface of the first touch panel 14B or the second manipulation surface of the second touch panel 15B.

If a negative result is obtained in step SP32, this means that the finger is not in touch with any one of the first manipulation surface and the second manipulation surface. If such a negative result is obtained in step SP32, the control section 20 moves the routine to the next step SP33.

In step SP33, the control section 20 determines whether the second display control process routine RT2 is to be terminated. If a negative result is obtained in step SP33, this means, for example, that an instruction for terminating the reproduction of music data is not yet given and there is a possibility that the music data to be reproduced is selected again. If such a negative result is obtained in step SP33, the control section 20 returns the routine to step SP31.

Then, the control section 20 repeatedly performs the processes of steps SP31 to SP33 until a positive result is obtained in any one of steps SP31 to SP33.

Thus, the control section 20 waits for the proximity or touch of the finger on the first manipulation surface of the first touch panel 14B or the second manipulation surface of the second touch panel 15B and the instruction for terminating the reproduction of the music data.

On the other hand, if a positive result is obtained in step SP32, this means that the finger is in touch with the first manipulation surface of the first touch panel 14B or the second manipulation surface of the second touch panel 15B and there is a possibility that the touch manipulation is performed. If such a positive result is obtained in step SP32, the control section 20 moves the routine to the next step SP34.

In step SP34, the control section 20 determines whether the touch manipulation is performed on the first manipulation surface or the second manipulation surface.

If a negative result is obtained in step SP34, this means, for example, that the fingers are in touch with a plurality of locations of the first manipulation surface or the second manipulation surface and the touch manipulation (for example, tap manipulation) is not performed. If such a negative result obtained in step SP34, the control section 20 returns the routine to step SP33.

On the other hand, if a positive result is obtained in step SP34, this means that the finger is in touch with one location of the first manipulation surface or the second manipulation surface and the touch manipulation (for example, tap manipulation) is performed. If such a positive result is obtained in step SP34, the control section 20 moves the routine to the next step SP35.

Thus, in step SP35, the control section 20 performs a process such as a reproduction start or stop of the music data, or a switch of the music data being reproduced, as a process instructed by the touch manipulation (for example, tap manipulation), and then returns the routine to step SP33.

On the other hand, if a positive result is obtained in the above-described step SP31, this means that the finger is in proximity to one of the first manipulation surface of the first touch panel 14B and the second manipulation surface of the second touch panel 15B.

If such a positive result is obtained in step SP31, the control section 20 starts the measurement of the proximity time and sets the proximity manipulation detection range on the basis of the center position of the proximity area, and then moves the routine to the next step SP36.

In step SP36, the control section 20 determines whether the proximity time reaches the proximity manipulation detection time in a state where the center position of the proximity area is within the proximity manipulation detection range.

If a negative result is obtained in step SP36, this means that the finger mistakenly moves close to the first manipulation surface or the second manipulation surface, or that the finger moves close to the first manipulation surface or the second manipulation surface for touch therewith, at this time. If such a negative result is obtained in step SP36, the control section 20 returns the routine to step SP32.

On the other hand, if a positive result is obtained in step SP36, this means that one or plural fingers move close to the first manipulation surface or the second manipulation surface for the proximity manipulation at this time. If such a positive result is obtained in step SP36, the control section 20 moves the routine to the next step SP37.

Thus, in step SP37, the control section 20 displays the track list image 44 which is one layer higher than the reproduced image 46, instead of reproduced image 46, across the first liquid crystal display panel 14A to the second liquid crystal display panel 15A, and then moves the routine the next step SP38.

In step SP38, the control section 20 emphatically displays a track icon 45 indicating the track title of the detection time reproduction target data among the plurality of track icons 45 in the track list image 44 being displayed, and then moves the routine to the next step SP39.

In step SP39, the control section 20 determines whether one or plural proximity areas are displaced to reciprocate. If a positive result is obtained in step SP39, this means that an instruction is given for switching the display of the track list image 44 into the display of the genre list image 35, the artist list image 38 or the album list image 41 of a desired layer.

On the other hand, while a series of processes is performed in the second display control process routine RT2, the control section 20 can appropriately return the routine to step SP39 to perform the process of step SP39, as described later.

Further, when the process of step SP39 is performed two times or more, if the positive result is obtained, this means, for example, that the display state of the genre list image 35 is instructed to be switched into the display of any one of the artist list image 38, the album list image 41 and the track list image 44.

Further, such a positive result also means, for example, that the display state of the artist list image 38 is instructed to be switched into the display of any one of the genre list image 35, the album list image 41 and the track list image 44.

Further, such a positive result also means, for example, that the display state of the album list image 41 is instructed to be switched into the display of any one of the genre list image 35, the artist list image 38 and the track list image 44. If such a positive result is obtained in step SP39, the control section 20 moves the routine to the next step SP40.

Hereinafter, for the convenience of description, the hierarchical genre list image 35, artist list image 38, album list image 41 and track list image 44 which are used for selecting the music data to be reproduced are appropriately referred to as "hierarchical list image" without distinction.

Further, hereinafter, for the convenience of description, the jacket images 37, 40 and 43 in the genre list image 35, the artist list image 38 and the album list image 41 are appropriately and simply referred to as "jacket image" without distinction by removing reference numerals.

Further, hereinafter, for the convenience of description, the genre icon 36, the artist icon 39, the album icon 42 and the track icon 45 used for instructing the reproduction of the music data are appropriately referred to as "reproduction instruction icons" without distinction.

In step SP40, the control section 20 displays a hierarchical list image of a layer instructed by the proximity manipulation across the first liquid crystal display panel 14A to the second liquid crystal display panel 15A, instead of a hierarchical list image of a predetermined layer displayed thus far, and then moves the routine to the next step SP41.

In step SP41, the control section 20 emphatically displays a jacket image or a track icon corresponding to the detection time reproduction target data among the plurality of jacket images or the plurality of track icons in the hierarchical list image after the display switching.

That is, at this time, if the display is switched into the genre list image 35 from the hierarchical list image other than the genre list image 35, the control section 20 emphatically displays the jacket image 37 corresponding to a genre of the detection time reproduction target data among the plurality of jacket images 37.

Further, at this time, if the display is switched into the artist list image 38 from the hierarchical list image other than the artist list image 38, the control section 20 emphatically displays the jacket image 40 of an artist of the detection time reproduction target data among the plurality of jacket images 40.

Further, at this time, if the display is switched into the album list image 41 from the hierarchical list image other than the album list image 41, the control section 20 emphatically displays the jacket image 43 of an album in which the detection time reproduction target data is recorded, among the plurality of jacket images 43.

Further, at this time, if the display is switched back into the track list image 44 from the hierarchical list image other than the track list image 44, the control section emphatically displays again the same track icon 45 as described above.

If the jacket image or the track icon 45 is emphatically displayed in this way in step SP41, the control section 20 moves the routine to the next step SP42.

On the other hand, if a negative result is obtained in step SP39, this means that the instruction for switching the display of the hierarchical list image is not given.

If such a negative result is obtained in step SP39, the control section 20 skips the processes of steps SP40 and SP41, and moves the routine to step SP42.

In step SP42, the control section 20 determines whether one or plural proximity areas are displaced in a desired direction, in a similar way to the case described in step SP10.

As one or plural proximity areas are displayed in a desired direction, if a positive result is obtained in step SP42, the control section 20 moves the routine to the next step SP43.

In step SP43, the control section 20 determines whether the reproduction instruction icon such as a track icon 45 or the jacket image which is emphatically displayed is changed.

If a positive result is obtained in step SP43, this means that the finger is overlapped with the jacket image or the reproduction instruction icon which is not yet emphatically displayed, according to the movement of the finger. If such a positive result is obtained in step SP43, the control section 20 moves the routine to the next step SP44.

In step SP44, the control section 20 emphatically displays the jacket image or the reproduction instruction icon in the hierarchical list image with which the attention area is overlapped.

Further, at this time, the control section 20 enlarges the emphatically displayed jacket image or reproduction instruction icon and displays at least a part thereof on one of the first liquid crystal display panel 14A and the second liquid crystal display panel 15A, and then moves the routine to the next step SP45.

On the other hand, if a negative result is obtained in step SP43, this means that even if the finger is moved, the finger is still overlapped with the jacket image or the reproduction instruction icon emphatically displayed thus far. If such a negative result is obtained in step SP43, the control section 20 moves the routine to step SP46.

In step SP46, the control section 20 enlarges the jacket image or the reproduction instruction icon emphatically displayed thus far and displays at least a part thereof on one of the first liquid crystal display panel 14A and the second liquid crystal display panel 15A, and then moves the routine to the next step SP45.

In step SP45, the control section 20 determines whether the proximity area covers the scroll-up instruction area SA1 and the scroll-down instruction area SA2.

If a positive result is obtained in step SP45, this means that the finger covers the scroll-up instruction area SA1 or the scroll-down instruction area SA2 and an upward or downward scrolling is instructed. If such a positive result is obtained in step SP45, the control section 20 moves the routine to the next step SP47.

In step SP47, the control section 20 scrolls up or down the hierarchical list image according to the instruction, and then moves the routine to the next step SP48.

In step SP48, the control section 20 determines whether the proximity area is beyond the scroll-up instruction area SA1 and the scroll-down instruction area SA2.

If a negative result is obtained in step SP48, this means that the finger still covers the scroll-up instruction area SA1 or the scroll-down instruction area SA2 and the upward or downward scrolling is continuously instructed. If such a negative result is obtained in step SP48, the control section 20 returns the routine to step SP47.

Then, the control section 20 sequentially and repeatedly performs the processes of steps SP47 and SP48 until a positive result is obtained in step SP48.

Thus, while the finger covers the scroll-up instruction area SA1 or the scroll-down instruction area SA2, the control section 20 continues to scroll up or down the hierarchical list image.

On the other hand, if the positive result is obtained in step SP48, this means that the finger is beyond the scroll-up instruction area SA1 and the scroll-down instruction area SA2 and the instruction for the upward and downward scrolling is terminated. If such a positive result is obtained in step SP48, the control section 20 moves the routine to the next step SP49.

Further, if a negative result is obtained in step SP45, this means that the finger does not cover any one of the scroll-up instruction area SA1 and the scroll-down instruction area SA2 and thus the upward and downward scrolling is not instructed.

If such a negative result is obtained in step SP45, the control section 20 skips the processes of steps SP47 and SP48 and moves the routine to step SP49.

On the other hand, if a negative result is obtained in the above-described step SP42, this means that one or plural fingers barely move, or that the plurality of fingers moves in different directions. If such a negative result is obtained in step SP42, the control section 20 moves the routine to step SP50.

In step SP50, the control section 20 determines whether the interval of the plurality of proximity areas is increased. If a positive result is obtained in step SP50, this means that the interval of the plurality of fingers is increased and the enlargement of the hierarchical list image is instructed. If such a positive result is obtained in step SP50, the control section 20 moves the routine to the next step SP51.

In step SP51, the control section 20 enlarges the hierarchical list image and displays it across the second liquid crystal display panel 15A to the first liquid crystal display panel 14A, and then moves the routine to the next step SP49.

At this time, even though the hierarchical list image is enlarged, the control section 20 emphatically displays the jacket image or the reproduction instruction icon, which has been emphatically displayed immediately before the enlargement, as it is immediately after the enlargement.

On the other hand, if a negative result is obtained in step SP50, this means that one or plural fingers barely move, or that the plurality of fingers moves so that their interval decreases. If such a negative result is obtained in step SP50, the control section 20 moves to step SP52.

In step SP52, the control section 20 determines whether the interval of the plurality of proximity areas has decreased. If a positive result is obtained in step SP52, this means that the interval of the plurality of fingers has decreased and the reduction of the hierarchical list image is instructed. If such a positive result is obtained in step SP52, the control section 20 moves the routine to the next step SP53.

In step SP53, the control section 20 reduces the hierarchical list image and displays it across the second liquid crystal display panel 15A to the first liquid crystal display panel 14A, and then moves the routine to the next step SP49.

At this time, even though the hierarchical list image is reduced, the control section 20 emphatically displays the jacket image or the reproduction instruction icon, which has been emphatically displayed immediately before the reduction, as it is immediately after the reduction.

On the other hand, if a negative result is obtained in step SP52, this means that one or plural fingers barely move. If such a negative result is obtained in step SP52, the control section 20 moves the routine to step SP49.

In step SP49, the control section 20 determines whether the touch area is detected. If a negative result is obtained in step SP49, this means that the plurality of jacket images or reproduction instruction icons is still seen in the hierarchical list image. If such a negative result is obtained in step SP49, the control section 20 moves the routine to step SP54.

In step SP54, the control section 20 determines whether all the proximity areas are not detected. If a negative result is obtained in step SP54, this means that one or plural fingers are still in proximity to the first manipulation surface or the second manipulation surface. If such a negative result is obtained in step SP54, the control section 20 returns the routine to step SP39.

Thereafter, the control section 20 repeatedly performs the processes of steps SP39 to SP54 until a positive result is obtained in steps SP49 to SP54.

Thus, while the proximity manipulation is being continuously performed for the first manipulation surface or the second manipulation surface, the control section 20 appropriately changes the display state of the hierarchical list image according to a variety of instructions through the proximity manipulation.

Further, if the routine moves to step SP45 in a state where the hierarchical list image is enlarged or reduced compared with the original display size to be displayed, the control section 20 determines whether the proximity area covers the scroll-up instruction area SA1 and the scroll-down instruction area SA2 as described above.

Here, at this time, the control section 20 also determines whether the proximity area covers the scroll-right instruction area SA3 and the scroll-left instruction area SA4.

As a result, if the finger covers the scroll-up instruction area SA1, the scroll-down instruction area SA2, the scroll-right instruction area SA3 or the scroll-left instruction area SA4 and the upward, downward, rightward or leftward scrolling is instructed, the control section 20 moves the routine to step SP47.

Thus, in step SP47, the control section 20 scrolls up, down, right or left the hierarchical list image according to the instruction, and then moves the routine to the next step SP48.

In step SP48, the control section 20 determines whether the proximity area is beyond all of the scroll-up instruction area SA1, the scroll-down instruction area SA2, the scroll-right instruction area SA3 and the scroll-left instruction area SA4.

Further, if the finger still covers the scroll-up instruction area SA1, the scroll-down instruction area SA2, the scroll-right instruction area SA3 or the scroll-left instruction area SA4 and the upward, downward, rightward or leftward scrolling is instructed, the control section 20 returns the routine to step SP47.

Then, the control section 20 sequentially and repeatedly performs the processes of steps SP47 and SP48 until a positive result is obtained in step SP48.

Thus, the control section 20 continues to scroll up, down, right or left the hierarchical list image while the fingers are overlapped with the scroll-up instruction area SA1, the scroll-down instruction area SA2, the scroll-right instruction area SA3 or the scroll-left instruction area SA4.

Further, if the finger is beyond all of the scroll-up instruction area SA1, the scroll-down instruction area SA2, the scroll-right instruction area SA3 and the scroll-left instruction area SA4, the control section 20 moves the routine to step SP49.

That is, if the instruction for the upward, downward, rightward and leftward scrollings are terminated, the control section 20 moves the routine to step SP49.

On the other hand, if a negative result is obtained in step SP45, this means that the finger does not cover any one of the scroll-up instruction area SA1 and the scroll-down instruction area SA2 and thus the upward and downward scrollings are not instructed.

Further, if the negative result is obtained in step SP45, this also means that the finger does not cover any one of the scroll-right instruction area SA3 and the scroll-left instruction area SA4 and thus the rightward and leftward scrolls are not instructed.

If such a negative result is obtained in step SP45, the control section 20 skips the processes of steps SP47 and SP48 and moves the routine to step SP49.

On the other hand, if a positive result is obtained in step SP49, this means that the finger is in touch with the first manipulation surface or the second manipulation surface to detect the touch area. If such a positive result is obtained in step SP49, the control section 20 moves the routine to the next step SP55.

In step SP55, the control section 20 determines whether the tap manipulation is performed at this time. If a positive result is obtained in step SP55, this means that the tap manipulation subsequent to the proximity manipulation is performed for one of the first manipulation surface and the second manipulation surface and any jacket image or reproduction instruction icon in the hierarchical list image is instructed. If such a positive result is obtained in step SP55, the control section 20 moves the routine to the next step SP56.

In step SP56, the control section 20 terminates the display of the hierarchical list image across the first liquid crystal display panel 14A and the second liquid crystal display panel 15A.

Further, at this time, according to the jacket image or the reproduction instruction icon instructed by the tap manipulation, the control section 20 generates a new hierarchical list image or reproduced image.

Further, the control section 20 displays the new hierarchical list image or reproduced image across the second liquid crystal display panel 15A to the first liquid crystal display panel 14A. Further, at this time, the control section 20 determines that the proximity manipulation which has been performed is terminated, and then returns the routine to step SP31.

On the other hand, if a negative result is obtained in the above-described step SP55, this means, for example, that the finger is mistakenly in touch with a plurality of locations in one of the first manipulation surface and the second manipulation surface, or that the finger is in touch with one location therein for the manipulation detection time or longer. If such a negative result is obtained in step SP55, the control section 20 returns the routine to step SP54.

If a positive result is obtained in step SP54, this means, for example, that all the fingers move away beyond the proximity detection distance range from the first manipulation surface and the second manipulation surface in a state where the touch area is not detected at all, and all the proximity areas are not detected.

Further, in step SP54, in a similar way to the case described in step SP22, the control section 20 determines whether the proximity manipulation is terminated according to both of the presence or absence of the detection of the touch area and the presence or absence of the detection of the proximity area. If such a positive result is obtained in step SP54, the control section 20 moves the routine to the next step SP57.

In step SP57, the control section 20 terminates the display of the hierarchical list image across the second liquid crystal display panel 15A to the first liquid crystal display panel 14A, and returns the display across the second liquid crystal display panel 15A to the first liquid crystal display panel 14A to the state (display of the reproduced image 46) immediately before the proximity manipulation is performed. Further, the control section 20 determines that the proximity manipulation performed is terminated at this time, and then returns the routine to step SP31.

In this way, by repeatedly performing the processes of steps SP31 to SP57 while the reproduced image is being displayed, the control section 20 can appropriately display the hierarchical list image and can allow the user to re-select the music data to be reproduced.

On the other hand, if a positive result is obtained in the above-described step SP33, this means, for example, that an instruction for terminating the reproduction of the music data (for terminating the reproduction function) is given.

If such a positive result is obtained in step SP33, the control section 20 deletes the reproduced image displayed across the second liquid crystal display panel 15A to the first liquid crystal display panel 14A, and then moves the routine to step SP58. Thus, in step SP58, the control section 20 terminates the second display control process routine RT2.

1-2-5. Operation and Effect of Embodiment

In the above description, if a display of a plurality of launch images is held in the standby mode, the control section 20 of the mobile terminal 10 detects whether the proximity manipulation is performed for one surface (first manipulation surface or second manipulation surface) of the first touch screen 14 and the second touch screen 15.

As a result, if it is detected that the proximity manipulation is performed, the control section 20 displays the thumbnail list image 60 in which the plurality of thumbnails 61 indicating different launch images is arranged in a matrix format, across the second touch screen 15 to the first touch screen 14.

In this state, if any thumbnail 61 is instructed by the tap manipulation subsequent to the proximity manipulation, the control section 20 displays the launch image indicated by the instructed thumbnail 61, instead of the thumbnail list image 60, on the second touch screen 15 and the first touch screen 14.

Further, if the reproduced image 46 is displayed across the second touch screen 15 to the first touch screen 14, the control section 20 detects whether the proximity manipulation is performed for one surface of the first touch screen 14 and the second touch screen 15.

As a result, if it is detected that the proximity manipulation is performed, the control section 20 displays the track list image 44 which is one layer higher than the reproduced image 46, instead of the reproduced image 46, across the second touch screen 15 to the first touch screen 14.

In this state, if the finger reciprocates in the proximity manipulation and switching of the display is instructed, the control section 20 switches and displays the hierarchical list image of any layer of the genre list image 35, the artist list image 38 or the like across the second touch screen 15 to the first touch screen 14.

In this state, when any jacket image is instructed by the tap manipulation subsequent to the proximity manipulation, the control section 20 displays a new hierarchical list image indicated by the instructed jacket image, instead of the hierarchical list image, on the second touch screen 15 and the first touch screen 14.

Further, when any reproduction instruction icon is instructed by the tap manipulation subsequent to the proximity manipulation, the control section 20 displays a new reproduced image indicated by the instructed reproduction instruction icon, instead of the hierarchical list image, on the second touch screen 15 and the first touch screen 14.

Accordingly, the control section 20 can display the plurality of thumbnails 61 as a list only by moving the finger close to one surface of the first touch screen 14 and the second touch screen 15, without particularly manipulating the manipulation key.

Further, at this time, the control section 20 can select and display a desired launch image as the thumbnail 61 only by bringing the finger in touch with one surface of the first touch screen 14 and the second touch screen 15, subsequent to the proximity, without particularly manipulating the manipulation key.

Further, the control section 20 can display the plurality of jacket images or reproduction instruction icons as a list only by moving the finger close to one surface of the first touch screen 14 and the second touch screen 15, without particularly manipulating the manipulation key.

Further, the control section 20 can select and display a desired hierarchical list image as a jacket image only by bringing the finger in touch with one surface of the first touch screen 14 and the second touch screen 15, subsequent to the proximity, without particularly manipulating the manipulation key.

Further, the control section 20 can select and display a desired reproduced image as a reproduction instruction icon only by bringing the finger in touch with one surface of the first touch screen 14 and the second touch screen 15, subsequent to the proximity, without particularly manipulating the manipulation key.

According to the above-described configuration, the control section 20 of the mobile terminal 10 displays the plurality of thumbnails 61 indicating different launch images as the thumbnail list image 60 if the proximity manipulation is performed by the finger for one surface of the first touch screen 14 and the second touch screen 15. Further, if a thumbnail 61 is instructed by the tap manipulation by the finger in this state, the control section 20 displays the launch image indicated by the instructed thumbnail 61, instead of the thumbnail list image 60, on the first touch screen 14 and the second touch screen 15.

Accordingly, the control section 20 of the mobile terminal 10 can display the plurality of thumbnails 61 as a list and select and display a desired launch image as the thumbnail 61, using a simple manipulation of sequentially performing the proximity manipulation and the tap manipulation on one surface of the first touch screen 14 and the second touch screen 15 so as to move the finger close to and then bring the finger in touch with one surface of the first touch screen 14 and the second touch screen 15, subsequent to the proximity, without particularly manipulating the manipulation key. Thus, the control section 20 of the mobile terminal 10 can significantly enhance the usability of the mobile terminal 10.

According to the above-described configuration, if the proximity manipulation is performed by the finger for one surface of the first touch screen 14 and the second touch screen 15, the control section 20 of the mobile terminal 10 displays different hierarchical list images or the plurality of jacket images or reproduction instruction icons indicating reproduced images as the hierarchical list image. Further, if a specific jacket image or reproduction instruction icon is instructed by the tap manipulation by the finger in this state, the control section 20 displays a new hierarchical list image or reproduced image indicated by the instructed jacket image or reproduction instruction icon, instead of the hierarchical list image, on the first touch screen 14 and the second touch screen 15.

Accordingly, the control section 20 of the mobile terminal 10 can display the plurality of jacket images or reproduction instruction icons as a list and can select and display the desired hierarchical list image or reproduced image as the jacket image or reproduction instruction icon, using a simple manipulation of sequentially performing the proximity manipulation and the tap manipulation on one surface of the first touch screen 14 and the second touch screen 15 so as to move the finger close to and then bring the finger in touch with one surface of the first touch screen 14 and the second touch screen 15, subsequent to the proximity, without particularly manipulating the manipulation key. Thus, the control section 20 of the mobile terminal 10 can significantly enhance the usability of the mobile terminal 10.

In addition, even though the proximity manipulation is performed for one surface of the first touch screen 14 and the second touch screen 15, if the finger moves away from the surface before the thumbnail 61 or the jacket image or the like is instructed, the control section 20 of the mobile terminal 10 determines that the proximity manipulation is terminated.

Accordingly, even in a case where the selection of the desired launch image, hierarchical list image or the like on the thumbnail list image 60 or the hierarchical list image displayed across the second touch screen 15 to the first touch screen 14 is stopped, the control section 20 of the mobile terminal 10 can easily stop the selection only by moving the finger away from the surfaces of the first touch screen 14 and the second touch screen 15, without particularly manipulating the manipulation key.

Further, if it is determined that the finger moves away from the surfaces of the first touch screen 14 and the second touch screen 15 and the proximity manipulation is terminated in this way, the control section 20 of the mobile terminal 10 returns the display of the first touch screen 14 and the second touch screen 15 to the state before the proximity manipulation is performed.

Accordingly, when the selection of the desired launch image, hierarchical list image or the like on the thumbnail list image 60 or the hierarchical list image displayed across the second touch screen 15 to the first touch screen 14 is stopped, the control section 20 of the mobile terminal 10 can easily return the display for the first touch screen 14 and the second touch screen 15 to the original state, without particularly manipulating the manipulation key.

Further, in a case where the proximity manipulation is performed, the control section 20 of the mobile terminal 10 specifies the proximity area of the index finger as the attention area, and emphatically displays the thumbnail 61, the jacket image or the like with which the attention area is overlapped.

Accordingly, for example, in a case where the user performs the tap manipulation by the index finger, the control section 20 of the mobile terminal 10 can easily allow the user to confirm whether the index finger is overlapped with the thumbnail 61, the jacket image or the like to be instructed.

Accordingly, when the desired thumbnail 61, the jacket image or the like is instructed by the tap manipulation, the control section 20 of the mobile terminal 10 can prevent any other thumbnail 61, jacket image or the like neighboring the thumbnail 61, jacket image or the like from being mistakenly instructed.

Further, while the finger moves in a desired direction by the proximity manipulation, the control section of the mobile terminal 10 emphatically displays the thumbnail 61, the jacket image or the like with which the attention area is overlapped, and also enlarges the emphatically displayed thumbnail 61, jacket image or the like and displays it on one of the first touch screen 14 and the second touch screen 15.

Accordingly, in a case where the finger moves in the desired direction by the proximity manipulation and the thumbnail 61, jacket image or the like to be instructed is searched, the control section 20 of the mobile terminal 10 can easily confirm the contents of the thumbnail 61, the jacket image or the like through one of the first touch screen 14 and the second touch screen 15.

Further, if the interval of the plurality of fingers is increased in the proximity manipulation, the control section 20 of the mobile terminal 10 enlarges the thumbnail list image 60 or the hierarchical list image displayed across the second touch screen 15 to the first touch screen 14.

Accordingly, the control section 20 of the mobile terminal 10 can easily confirm the contents of the thumbnail 61, the jacket image or the like in the thumbnail list image 60 or the hierarchical list image.

In this respect, if the interval of the plurality of fingers has decreased in the proximity manipulation, the control section 20 of the mobile terminal 10 reduces the thumbnail list image 60 or the hierarchical list image displayed across the second touch screen 15 to the first touch screen 14.

Accordingly, the control section 20 of the mobile terminal 10 can enlarge the display range which can be displayed at a time in the thumbnail list image 60 or the hierarchical list image, to thereby increase the number of the thumbnails 61, the jacket images or the like which can be displayed at a time.

As a result, the control section 20 of the mobile terminal 10 can easily compare the plurality of thumbnails 61 with the plurality of jacket images or the like.

2. MODIFIED EXAMPLES

First Modified Example

In the above-described embodiment, if the proximity manipulation is performed in a state where the display of the plurality of launch images is held in the standby mode, the thumbnail list image 60 is displayed in which the thumbnails 61 having a uniform display size are arranged with a uniform row number in parallel with the vertical direction of the image.

However, the present invention is not limited thereto. If the proximity manipulation is performed in a state where the display of the plurality of launch images is held in the standby mode, a thumbnail list image may be displayed in which thumbnails having display sizes according to the number of the launch images are arranged with a row number according to the display sizes.

For example, in the present invention, with respect to the number of the launch images, a lower limit number for setting the display size to a predetermined maximum size, and an upper limit number for setting the display size to a predetermined minimum size are selected.

Further, in the present invention, the display size of the thumbnail may be changed to be enlarged as the number of the launch images decreases, and then, the display size may be fixed to the maximum size in a number which is equal to or smaller than the lower limit number and the display size may be fixed to the minimum size in a number which is equal to or larger than the upper limit number.

Figure 46:
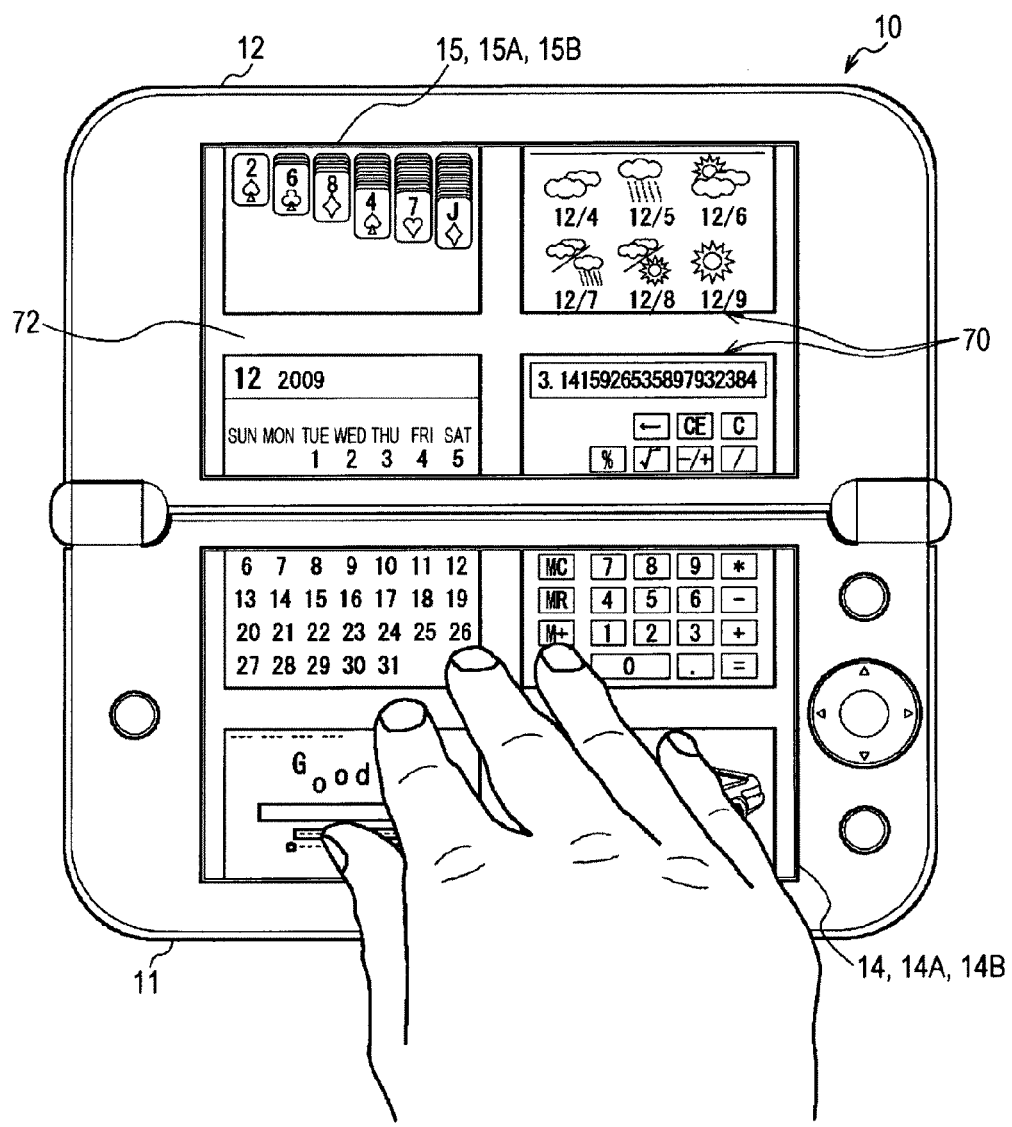
FIG. 46 is a diagram schematically illustrating a first modified example of an arrangement according to a display size of a thumbnail.
Figure 47:
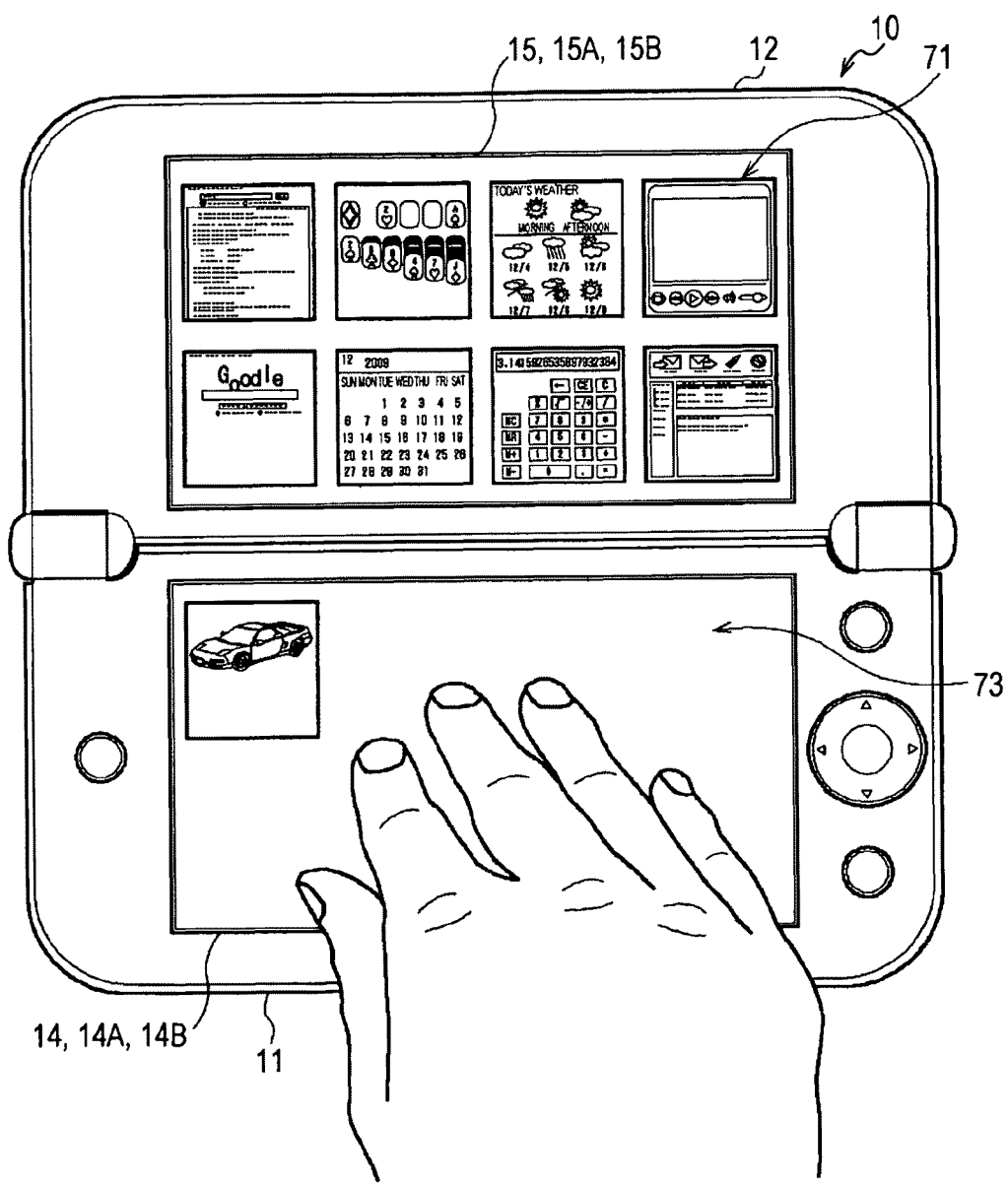
FIG. 47 is a diagram schematically illustrating a second modified example of an arrangement according to a display size of a thumbnail.

Further, as shown in FIGS. 46 and 47, in the present invention, a plurality of thumbnails 70 and 71 may fall in a range from the right edge of the first touch screen 14 and the second touch screen 15 to the left edge thereof according to their display sizes, and may be arranged and displayed with a row number which can be displayed without scrolling a thumbnail list image 72 or 73 right or left.

Further, in the present invention, the plurality of thumbnails may be arranged with a uniform row number while the display sizes thereof are changed according to the number of the launch images.

According to such a configuration, in the present invention, in a case where the thumbnail list image is displayed, the number of the launch images can be intuitively recognized according to the display size of the thumbnail.

Further, in the present invention, with respect to the hierarchical list image, the display sizes of the jacket images and reproduction instruction icons or the arrangement row number thereof may be similarly changed according to the number of genres, artists, albums and tracks in the album when the plurality of pieces of music data is classified.

Second Modified Example

Further, in the above-described embodiment, if the finger interval is increased in the proximity manipulation, the thumbnail list image or the hierarchical list image is enlarged with a uniform enlargement ratio.

However, the present invention is not limited thereto. If the finger interval is increased in the proximity manipulation, the thumbnail list image or the hierarchical list image may be enlarged with the enlargement ratio according to the width of the interval so that the enlargement ratio increases as the interval widens.

Further, in the present invention, if the enlargement ratio is changed according to the width of the finger interval in this way, the thumbnail, the jacket image or the like is enlarged with the enlargement ratio according to the width of the finger interval, without changing the display size of the thumbnail list image or the hierarchical list image in the horizontal direction.

Further, in the present invention, the thumbnail, jacket image or the like may be re-arranged and displayed so that rows in parallel with the vertical direction of the image are decreased according to the display size after enlargement and columns in parallel with the horizontal direction are increased.

According to such a configuration, in the present invention, it is possible to enlarge the thumbnail, jacket image or the like according to a user's desired size and to display it.

Further, with such a configuration, in the present invention, it is not necessary to instruct the rightward or leftward scrolling in a case where the thumbnail, jacket image or the like is enlarged, to thereby simplify the manipulation.

2-3. Third Modified Example

Further, in the above-described embodiment, if the finger interval has decreased in the proximity area, the thumbnail list image or the hierarchical list image is reduced by a uniform reduction ratio.

However, the present invention is not limited thereto. If the finger interval has decreased in the proximity manipulation, the thumbnail list image or the hierarchical list image may be reduced by the reduction ratio according to the width of the interval so that the reduction ratio increases (the display size is reduced) as the interval narrows.

Further, in the present invention, if the reduction ratio is changed according to the width of the finger interval in this way, the thumbnail, the jacket image or the like is reduced by the reduction ratio according to the width of the finger interval, without changing the display size of the thumbnail list image or the hierarchical list image in the horizontal direction.

Further, in the present invention, the thumbnail, jacket image or the like may be re-arranged and displayed so that rows in parallel with the vertical direction of the image are increased according to the display size after reduction, and columns in parallel with the horizontal direction are decreased.

According to such a configuration, in the present invention, it is possible to reduce the thumbnail, jacket image or the like according to a user's desired size and to display it.

Further, with such a configuration, in the present invention, it is not necessary to instruct the rightward or leftward scrolling in a case where the thumbnail, jacket image or the like is reduced, to thereby simplify the manipulation.

2-4. Fourth Modified Example

Further, in the above-described embodiment, two first touch screen 14 and second touch screen 15 are installed in the mobile terminal 10.

However, the present invention is not limited thereto. For example, the proximity manipulation or the touch manipulation may be performed only for the surface of the first touch screen of the first casing so that the touch screen is installed in the first casing and the liquid crystal display panel is installed in the second casing.

Further, in the present invention, the mobile terminal may be configured by one casing, for example, one touch screen having the same configuration as the above-described first touch screen 14 or second touch screen 15 may be installed.

Further, in the present invention, if the proximity manipulation is performed for the surface of the touch screen in the mobile terminal, the thumbnail list image or the hierarchical list image may be displayed on the touch screen.

Further, in the present invention, in the mobile terminal having such a configuration, if the finger by which the proximity manipulation is performed moves in a desired direction, the thumbnail, jacket image or the like to be emphatically displayed may be enlarged and overlapped with a part of the thumbnail list image or the hierarchical list image.

2-5. Fifth Modified Example

Further, in the above-described embodiment, the hierarchical list image for selecting the music data to be reproduced is displayed according to the proximity manipulation.

However, the present invention is not limited thereto. For example, content data such as image data, text data, or a game program is hierarchically classified, and a hierarchical list image indicating the hierarchical classification of the content data may be displayed to select the content data.

2-6. Sixth Modified Example

Further, in the above-described embodiment, the desired thumbnail 61, jacket image or the like is instructed by the tap manipulation for bringing the finger in touch with the first manipulation surface or the second manipulation surface once, subsequent to the proximity manipulation.

However, the present invention is not limited thereto. For example, the desired thumbnail 61, jacket image or the like may be instructed by a double tap manipulation for continuously bringing the finger in touch with the first manipulation surface or the second manipulation surface two times, subsequent to the proximity manipulation.

2-7. Seventh Modified Example

Further, in the above-described embodiment, in a case where the thumbnail list image 60 or the hierarchical list image is displayed, the finger moves up to the scroll-up instruction area SA1, the scroll-down instruction area SA2, the scroll-right instruction area SA3 and the scroll-left instruction area SA4 to instruct the scrolling.

However, the present invention is not limited thereto. For example, in a case where the thumbnail list image 60 or the hierarchical list image is displayed, the instruction may be given to scroll the image in the movement direction, by rapidly moving the finger in a desired direction as in the flick manipulation, while moving the finger close to the first manipulation surface or the second manipulation surface.

2-8. Eighth Modified Example

Further, in the above-described embodiment, in a state where the touch manipulation is not performed (the touch area is not detected at all), if one touch area is detected as the touch area at the touch start time, it is determined that the touch manipulation has started. In addition, in the above-described embodiment, it is detected which touch manipulation is being performed.

However, the present invention is not limited thereto. For example, in a state where the touch area is not detected, if one touch area is detected as the touch area at the touch start time, it may be detected whether the touch manipulation is being performed according to a detection situation of the touch area thereafter, without determining the start of the touch manipulation.

Hereinafter, a method of detecting whether such a touch manipulation is performed will be described by exemplifying a case where the finger is in touch with the first manipulation surface of the first touch panel 14B.

That is, in a state where the touch manipulation is not performed for the first manipulation surface (the touch area is not detected at all), if one touch area is detected as the touch area at the touch start time, the control section 20 starts measurement of the touch time by the timer.

The control section 20 measures the touch time until the touch area of the finger at the touch end time is detected after detecting the touch area of the finger at the touch start time (until the finger is disengaged (to the touch end) after being in touch with the first manipulation surface (from the touch start)).

Further, if one touch area of the finger at the touch start time is detected in this way, the control section also starts the detection of the movement trace of the finger using the center position of the one touch area at the touch start time as the starting point.

If the detection of the movement trace of the finger is started, whenever the area detection process is thereafter performed to detect the touch area of the finger and the center position thereof for trace, the control section 20 sequentially traces the detected center position from the starting point, to thereby detect the movement trace of the finger.

In this state, the control section 20 compares the touch time with the type detection time. Further, if the finger is disengaged from the first manipulation surface before the touch time reaches the type detection time and the measurement of the touch time is terminated, the control section 20 determines whether the movement trace detected thus far falls in the touch manipulation detection circle centering on the starting point (center position).

As a result, if the movement trace of the finger from the touch start of the finger for the first manipulation surface to the touch end thereof falls within the touch manipulation detection circle, the control section 20 determines that the tap manipulation is being performed as the touch manipulation for the first manipulation surface at this time.

At this time, the control section 20 uses the center position (that is, the center position indicated as the coordinates of the pixel positions) of the touch area at the time when the touch of the finger through the tap manipulation is terminated, as a tap instruction position instructed by the tap manipulation on the display surface of the first liquid crystal display panel 14A at this time.

In this respect, at this time, for example, if the movement trace of the finger from the touch start of the finger for the first manipulation surface to the touch end thereof extends outside the touch manipulation detection circle from the starting point, the control section 20 determines that the flick manipulation is performed as the touch manipulation for the first manipulation surface at this time.

At this time, the control section 20 refers to a direction leading to the center position of the touch area at the touch end time of the finger from the center position (starting point) of the touch area at the touch start time of the finger through the flick manipulation, as a movement direction of the finger through the flick manipulation.

Further, the control section 20 uses the movement direction of the finger through the flick manipulation for image scrolling, for example.

Further, if the touch time measured by the timer exceeds the type detection time, the control section 20 determines whether the movement trace of the finger extends outside the touch manipulation detection circle.

As a result, if it is detected that the movement trace of the finger which is in touch with the first manipulation surface beyond the type detection time extends outside the touch manipulation detection circle, the control section 20 determines that the sliding manipulation is performed as the touch manipulation for the first manipulation surface at this time.

In this case, until the sliding manipulation is terminated after the sliding manipulation detection time, the control section 20 sequentially updates the movement trace of the finger according to the detection of the center position. Further, the control section 20 uses the movement trace of the finger through the sliding manipulation for image scrolling, for example.

If the finger is disengaged from the first manipulation surface in a state where the movement trace of the finger which is in touch with the first manipulation surface beyond the type detection time falls within the touch manipulation detection circle, the control section 20 determines that the finger is mistakenly in touch with the first manipulation surface at this time and the touch manipulation is not performed.

In this way, the control section 20 can also detect that the tap manipulation is performed using one finger, for example, on the first manipulation surface of the first touch panel 14B, using such a detection method.

Further, the control section 20 can detect that the flick manipulation is performed using one finger, for example, on the first manipulation surface of the first touch panel 14B.

Furthermore, the control section 20 can detect that the sliding manipulation is performed using one finger, for example, on the first manipulation surface of the first touch panel 14B.

2-9. Ninth Modified Example

Further, in the above-described embodiment, the display control apparatus according to the present invention is applied to the above-described mobile terminal 10 described with reference to FIGS. 1 to 47.

However, the present invention is not limited thereto. For example, the display control apparatus can be applied to a computer in which a touch panel and a display section such as a liquid crystal display panel are installed, or to an information processing apparatus such as a mobile phone, PDA (personal digital assistance), or portable game player.

Further, the present invention can be widely applied to a display control apparatus having a variety of configurations, for example, a photographing apparatus such as a digital still camera or digital video camera, a portable reproduction apparatus or the like.

2-10. Tenth Modified Example

Further, in the above-described embodiment, a display control program according to the present invention is applied to the display control program stored in advance in the nonvolatile memory 21 described with respect to FIGS. 1 to 47.

Further, the control section 20 performs the first display control process routine RT1 and the second display control process routine RT2 described with reference to FIGS. 42 to 45 according to the display control program.

However, the present invention is not limited thereto. For example, the mobile terminal 10 may be installed with the display control program by a computer-readable storage medium in which the display control program is stored.

Further, the control section 20 may perform the first display control process routine RT1 and the second display control process routine RT2 according to the installed display control program.

Further, the mobile terminal 10 may be installed with the display control program from the outside using a wired or wireless communication medium such as a local area network, the internet, or digital satellite broadcasting.

Further, the computer-readable storage medium for installing the display control program in the mobile terminal 10 to be in a performable state may be realized as a package media such as a flexible disc.

Further, the computer-readable storage medium for installing the display control program in the mobile terminal 10 to be in a performable state may be realized as a package media such as a CD-ROM (compact disc-read only memory).

Furthermore, the computer-readable storage medium for installing the display control program in the mobile terminal 10 to be in a performable state may be realized as a package media such as a DVD (digital versatile disc).

Further, the computer-readable storage medium may be realized as a semiconductor memory, a magnetic disc, a non-transitory storage medium or the like in which a variety of programs is temporarily or permanently stored, in addition to the package media.

Further, as a means for storing the display control program in the computer-readable storage medium, a wired or wireless communication medium such as a local area network, the internet, digital satellite broadcasting may be used.

Further, the display control program may be stored in the computer-readable storage medium through a variety of communication interfaces such as a router, or modem.

2-11. Eleventh Modified Example

Further, in the above-described embodiment, as the proximity detecting section for detecting the proximity of the indicator to the display surface, the first touch screen 14 including the first liquid crystal display panel 14A and the first touch panel 14B and the second touch screen 15 including the second liquid crystal display panel 15A and the second touch panel 15B, described with reference to FIGS. 1 to 47, are used.

However, the present invention is not limited thereto. For example, as the proximity detecting section, one or plural manipulation screens including a display section such as an organic EL (electro luminescence) display or a cathode-ray tube, and a touch panel of an electrostatic capacitance type or a pressure-sensitive type, may be used.

Further, in the present invention, as the proximity detecting section, one or plural touch screens formed by arranging an infrared emitting element and infrared sensing element in the pixel positions of each liquid crystal display panel may be used.

Further, in the present invention, as the proximity detecting section, a proximity detecting section having a variety of configurations such as a touch panel of an electrostatic capacitance type or a pressure-sensitive type may be widely used.

2-12. Twelfth Modified Example

Further, in the above-described embodiment, as the touch detecting section for detecting the touch of the indicator to the display surface, the first touch screen 14 including the first liquid crystal display panel 14A and the first touch panel 14B and the second touch screen 15 including the second liquid crystal display panel 15A and the second touch panel 15B, described with reference to FIGS. 1 to 47, are used.

However, the present invention is not limited thereto. For example, as the touch detecting section, one or plural manipulation screens including a display section such as an organic EL display or a cathode-ray tube, and a touch panel of an electrostatic capacitance type or a pressure-sensitive type may be used.

Further, in the present invention, as the touch detecting section, one or plural touch screens formed by arranging an infrared emitting element and infrared sensing element in the pixel positions of each liquid crystal display panel may be used.

Further, in the present invention, as the touch detecting section, a touch detecting section having a variety of configurations such as a touch panel of an electrostatic capacitance type or a pressure-sensitive type may be widely used.

2-13. Thirteenth Modified Example

Further, in the above-described embodiment, as a control section for displaying the plurality of indicants on the display surface if the proximity detecting section detects the proximity of the indicator to the display surface, and displaying, if it is determined that one indicant is selected from the plurality of indicants on the basis of the touch of the indicator on the display surface detected by the touch detecting section, the image corresponding to the one indicant on the display surface, the control section 20 including the CPU described with reference to FIGS. 1 to 47, is used.

However, the present invention is not limited thereto. For example, as the control section, a microprocessor or a DSP (digital signal processor) may be used.

Further, in the present invention, as the control section, a control section having a variety of configurations such as a control circuit of a hardware circuit configuration for displaying the plurality of indicants on the display surface if the proximity detecting section detects the proximity of the indicator to the display surface, and displaying, if it is determined that one indicant is selected from the plurality of indicants on the basis of the touch of the indicator on the display surface detected by the touch detecting section, the image corresponding to the one indicant on the display surface, may be widely used.

It should be understood by those skilled in the art that various modifications, combinations, sub-combinations and alterations may occur depending on design requirements and other factors insofar as they are within the scope of the appended claims or the equivalents thereof.

The invention claimed is:

1. A display control apparatus comprising:
a proximity detector to detect proximity of an indicator to a display surface;
a touch detector to detect touch of the indicator against the display surface; and
a control unit to control display of an indicant on the display surface when the proximity detector detects that the indicator is in proximity to the display surface and to determine whether the indicant is selected based on detection of the touch of the indicator against the display surface by the touch detector,
wherein, when a display of at least one launch image is held in a standby mode and a proximity area corresponding to the indicator is detected on the display surface for a predetermined detection time, the control unit controls display of a plurality of indicants indicating a launch image as selectable information on the display surface as a list image displaying the plurality of indicants as a list, in which only a first indicant of the plurality of indicants is displayed with emphasis based on a result of a determination whether the first indicant is displayed on the display surface immediately before the display of the list image, wherein each of the indicants corresponds to an image which is expanded to be launched in a displayable state as the launch image upon selection of the indicant and has a same display contents as the launch image reduced relative to display size of the display contents in the launch image, and wherein the list image is displayed enlarged or reduced with only the first indicant displayed with emphasis same as the emphasis before enlargement or reduction of the list image in accordance with a result of a determination whether an interval of a plurality of indicants is changed when one or a plurality of proximity areas are determined not to be displaced in a predetermined direction.

2. The display control apparatus of claim 1, wherein the control unit is to control display of the plurality of indicants on the display surface when the proximity detector detects that the indicator is in proximity to the display surface and to determine whether the first indicant among the plurality of indicants is selected based on detection of the touch of the indicator against the display surface by the touch detector.

3. The apparatus of claim 1, wherein the control unit is to control size of the indicant displayed on the display surface when the proximity detector detects displacement of a plurality of indicators in proximity to the display surface.

4. The apparatus of claim 3, wherein the size of the indicant is controlled to be enlarged.

5. The apparatus of claim 3, wherein the size of the indicant is controlled to be reduced.

6. The apparatus of claim 1, wherein the control unit is to control size of the indicant displayed on the display surface based on detecting at least three areas on the display surface corresponding, respectively, to at least three indicators detected by the proximity detector to be in proximity to the display surface.

7. The apparatus of claim 6, wherein the control unit is to control the size of the indicant displayed on the display surface based on detecting a center position of each of the at least three areas.

8. The apparatus of claim 7, wherein the control unit is to control the size of the indicant displayed on the display surface based on detecting a distance between the center positions of two areas of the at least three areas that are neighboring.

9. The apparatus of claim 1, wherein the control unit is to control scrolling of the indicant displayed on the display surface when the proximity detector detects that the indicator is in proximity to a predetermined area of the display surface.

10. The apparatus of claim 9, wherein, when the proximity detector detects that the indicator is in proximity to a first predetermined area of the display surface, the control unit is to control scrolling of the indicant in a first direction across the display surface and, when the proximity detector detects that the indicator is in proximity to a second predetermined area of the display surface, the control unit is to control scrolling of the indicant in a second direction across the display surface, wherein the first direction is other than the second direction, and the first predetermined area is other than the second predetermined area.

11. The apparatus of claim 9, wherein a first direction of the scrolling is opposite to a second direction of the scrolling, wherein the display surface includes opposing first and second edges and wherein the first and second predetermined areas extend substantially parallel to the respective first and second edges.

12. The apparatus of claim 1, wherein the control unit is to control display of a second indicant on the display surface when the touch of the indicator against an area of the display surface, on which the indicant is displayed when the proximity detector detects that the indicator is in proximity to the display surface, is detected by the touch detector.

13. The apparatus of claim 12, wherein the second indicant is related to the indicant displayed on the display surface when the proximity detector detects that the indicator is in proximity to the display surface.

14. The apparatus of claim 12, wherein, when the control unit controls the second indicant to be displayed on the display surface, the control unit controls the display on the display surface to be without the indicant displayed on the display surface when the proximity detector detects that the indicator is in proximity to the display surface.

15. The apparatus of claim 12, wherein, when the touch of the indicator against the area of the display surface on which the indicant is displayed when the proximity detector detects that the indicator is in proximity to the display surface is detected by the touch detector, the control unit controls the display on the display surface to switch from the display of the indicant on the display surface when the proximity detector detects that the indicator is in proximity to the display surface to the display of the second indicant on the display surface.

16. The apparatus of claim 1, wherein, when the proximity detector does not detect at each detected proximity area on the display surface, the control unit switches display on the display surface to a prior state.

17. A method for display control comprising:
   detecting proximity of an indicator to a display surface;
   detecting touch of the indicator against the display surface;
   controlling display of an indicant on the display surface when the indicator is detected to be in proximity to the display surface;
   determining whether the indicant is selected based on detection of the touch of the indicator against the display surface; and
   when a display of at least one launch image is held in a standby mode and a proximity area corresponding to the indicator is detected on the display surface for a predetermined detection time in a state, controlling display of a plurality of indicants indicating a launch image as selectable information on the display surface as a list image displaying the plurality of indicants as a list, in which only a first indicant of the plurality of indicants is displayed with emphasis based on a result of a determination whether the first indicant is displayed on the display surface immediately before the display of the list image, wherein each of the indicants corresponds to an image which is expanded to be launched in a displayable state as the launch image upon selection of the indicant and has a same display contents as the launch image reduced relative to display size of the display contents in the launch image, and wherein the list image is displayed enlarged or reduced with only the first indicant displayed with emphasis same as the emphasis before enlargement or reduction of the list image in accordance with a result of a determination whether an interval of a plurality of indicators is changed when one or a plurality of proximity areas are determined not to be displaced in a predetermined direction.

18. A non-transitory recording medium recorded with a computer-readable program executable by a computer for enabling the computer to perform display control, the program comprising the steps of:
   detecting proximity of an indicator to a display surface;
   detecting touch of the indicator against the display surface;
   controlling display of an indicant on the display surface when the indicator is detected to be in proximity to the display surface;
   determining whether the indicant is selected based on detection of the touch of the indicator against the display surface; and
   when a display of at least one launch image is held in a standby mode and a proximity area corresponding to the indicator is detected on the display surface for a predetermined detection time, controlling display of a plurality of indicants indicating a launch image as selectable information on the display surface as a list image displaying the plurality of indicants as a list, in which only a first indicant of the plurality of indicants is displayed with emphasis based on a result of a determination whether the first indicant is displayed on the display surface immediately before the display of the list image, wherein each of the indicants corresponds to an image which is expanded to be launched in a displayable state as the launch image upon selection of the indicant and has a same display contents as the launch image reduced relative to display size of the display contents in the launch image, and wherein the list image is displayed enlarged or reduced with only the first indicant displayed with emphasis same as the emphasis before enlargement or reduction of the list image in accordance with a result of a determination whether an interval of a plurality of indicators is changed when one or a plurality of proximity areas are determined not to be displaced in a predetermined direction.

* * * * *